(12) United States Patent
Bader

(10) Patent No.: US 10,577,269 B1
(45) Date of Patent: *Mar. 3, 2020

(54) DE-SCALING: THE CRITICAL KEY TO EFFECTIVE DESALINATION

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/501,510

(22) Filed: Apr. 20, 2019

Related U.S. Application Data

(63) Continuation-in-part of application No. 15/731,999, filed on Sep. 7, 2017, now Pat. No. 10,322,952, and
(Continued)

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/004* (2013.01); *B01D 15/00* (2013.01); *C02F 1/20* (2013.01); *C02F 1/441* (2013.01); *C02F 1/442* (2013.01); *C02F 1/444* (2013.01); *C02F 1/5236* (2013.01); *C02F 1/54* (2013.01); *C02F 1/72* (2013.01); *C02F 2103/18* (2013.01); *C02F 2303/20* (2013.01); *C02F 2303/22* (2013.01)

(58) Field of Classification Search
USPC ......... 203/10, 21, 85–88, DIG. 17; 210/633, 210/639–642
See application file for complete search history.

(56) References Cited

U.S. PATENT DOCUMENTS

| | | |
|---|---|---|
| 3,489,652 A | 1/1970 | Williamson |
| 3,595,757 A | 7/1971 | Izumi |

(Continued)

FOREIGN PATENT DOCUMENTS

GB 1174423 12/1969

OTHER PUBLICATIONS

U.S. Appl. No. 15/731,999, filed Sep. 7, 2017, Bader.
(Continued)

*Primary Examiner* — Nina Bhat

(57) ABSTRACT

A system and method for effectively desalinating a feed stream is provided. In one embodiment, a feed stream is desalinated by a Brine Forward (BF) desalination system comprising an enabling de-scaling step combined with a plurality of trains arranged in series and alternated in pairs of opposing feed evaporation modes, wherein each pair comprises a leading backward fed multi-effect train and a following forward fed multi-effect train. This system is structured on the grounds of simplicity and homogeneity, without using scale inhibitors and restricting top brine temperature. This system is a close approximation of efficient regenerative heating and brine cascading; the energy extracted to heat the feed is only slightly hotter than the feed it is heating without complex feed heating setups; and the brine extracted after evaporating vapor in the train is used to evaporate vapor in the next train, yet reject brine is readily reusable in other applications.

20 Claims, 31 Drawing Sheets

Related U.S. Application Data a continuation-in-part of application No. 15/731,626, filed on Jul. 10, 2017, now Pat. No. 10,336,638, which is a continuation of application No. 13/999,309, filed on Feb. 8, 2014, now Pat. No. 9,701,558.

(51) Int. Cl.

| | |
|---|---|
| C02F 1/44 | (2006.01) |
| C02F 103/18 | (2006.01) |
| C02F 1/54 | (2006.01) |
| C02F 1/52 | (2006.01) |
| C02F 1/20 | (2006.01) |
| C02F 1/72 | (2006.01) |
| B01D 15/00 | (2006.01) |

(56) References Cited

U.S. PATENT DOCUMENTS

| | | | |
|---|---|---|---|
| 4,723,603 A | 2/1988 | Plummer | |
| 5,102,550 A * | 4/1992 | Pizzino | B01D 61/364 |
| | | | 210/640 |
| 5,592,690 A * | 1/1997 | Wu | A41B 11/00 |
| | | | 2/67 |
| 6,508,936 B1 | 1/2003 | Hassan | |
| 6,905,604 B2 * | 6/2005 | Taber | B01D 61/025 |
| | | | 210/652 |
| 6,998,053 B2 | 2/2006 | Awerbuch | |
| 8,915,301 B1 * | 12/2014 | Bader | C02F 9/00 |
| | | | 166/371 |
| 9,539,522 B1 | 1/2017 | El-Sayed | |
| 9,701,558 B1 * | 7/2017 | Bader | C02F 9/00 |
| 9,751,047 B2 * | 9/2017 | Lienhard | B01D 69/02 |
| 9,784,489 B2 * | 10/2017 | Ma | E03B 3/28 |
| 10,258,920 B1 | 4/2019 | Bader | |
| 10,259,734 B1 * | 4/2019 | Bader | C02F 9/00 |
| 10,259,735 B1 * | 4/2019 | Bader | C02F 1/06 |
| 10,280,103 B1 * | 5/2019 | Bader | C02F 9/00 |
| 10,322,952 B1 * | 6/2019 | Bader | C02F 1/447 |
| 10,336,638 B1 * | 7/2019 | Bader | C02F 9/00 |
| 2016/0244349 A1 * | 8/2016 | St. John | C02F 9/00 |

OTHER PUBLICATIONS

U.S. Appl. No. 15/731,626, filed Jul. 10, 2017, Bader.

Eriksson, P.E., "Nanofiltration Extends the Range of Membrane Filtration", Environmental Progress, 1988, vol. 7, No. 1, pp. 58-62.

Seland, A., et al., "Membrane Filtration of Seawater for Oil Reservoir Injection", Society of Petroleum Engineers; SPE 24805; Oct. 4, 1992, pp. 407-418.

Hardy, J.A. and Simm, I.; "Low Sulfate Seawater Mitigates Barite Scale", Oil & Gas J., Dec. 9, 1996, Issue. 50, pp. 64-67.

* cited by examiner

DE-SCALING: THE CRITICAL KEY TO EFFECTIVE DESALINATION

RELATED APPLICATIONS

This application is a continuation-in-part of my allowed patent application Ser. No. 15/731,999 filed on Sep. 7, 2017; which is a continuation-in-part of my allowed patent application Ser. No. 15/731,626 filed on Jul. 10, 2017; which is a continuation-in-part of my Patent application Ser. No. 13/999,309 filed on Feb. 8, 2014, now U.S. Pat. No. 9,701,558.

This application is also related to my allowed patent application Ser. No. 14/998,774 filed on Feb. 13, 2016; which a continuation-in-part of my Patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application Ser. No. 13/066,841 filed on Apr. 26, 2011, now U.S. Pat. No. 8,915,301.

BACKGROUND OF THE INVENTION

The terms "a desalination plant" and "independent trains" mean that the desalination plant comprises a plurality of independent trains, wherein each train is operated independently by having its own steam supply, a seawater feed stream, a distillate stream, a reject brine stream, a reject cooling seawater stream, a heat rejection condenser or a heat rejection section, and recycle brine (when applicable). However, it should be understood that the terminology used herein is for the purpose of description; thereby it should not be considered as limiting.

If the future is determined by the past and present, we should be able to see clearer patterns in the sequence of events that have shaped the history of the desalination field so far. It is thus our understanding of this history, or lack of it, which determines whether we further ritualize and then hold indefinitely the on-going practice, or draw a line between what has been practiced and what has to be pursued to achieve real advancement.

Potable water may be produced from a saline stream by any suitable desalination concept, but the concept more likely uses either thermal energy as a major input or work energy as a sole input. As such, power and water production is mostly jointed in a co-generation plant. A considerable amount of thermal energy must be rejected from a power generation cycle in the form of exhausted steam before it can be returned to the cycle. In order to return exhausted steam from the lower end temperature to the higher end temperature of the cycle, exhausted steam may be re-heated through a heat pump (e.g., a compressor), which may be considered inefficient since it requires medium pressure stream (M.P. steam) thereby it withdraws work energy from the cycle, or de-heated in a condenser to convert it into liquid by rejecting a significant amount of heat so that it can be returned to the cycle by a liquid pump. The latter is considered more efficient compared to re-heating since efficiency, according to the Carnot cycle, increases if heat is supplied at higher temperatures and rejected at lower temperatures.

Distillation, even though it can be operated independently by a standalone thermal energy input, lends itself in its most economic way when it acts in a way as a heating condenser, wherein a secondary thermal input (exhausted steam) from a power generation cycle is exchanged to heat a feed stream for distillation and to condense exhausted steam for the power generation cycle. Thus, distillation can be a part of the power generation cycle with some design modification, wherein at least it does not require the use of fuel at its full cost. However, this modification may not be as easy as it would seem since it largely depends on effectively matching water-power load.

Distillation is also one of the most viable separation concepts since it relies on the gravity force to separate vapor from liquid. In addition, the produced distillate is essentially de-ionized water. These endow distillation with startup advantages that no other separation concept may entail.

Further, vapor can be generated from liquid, wherein the vapor is at its saturated temperature, by a continuum ranging from adding further heat (boiling) to reducing pressure (flashing) and anywhere in between these two end points (boiling-flashing). Thus, from boiling to flashing and anywhere in between, a design freedom for generating vapor may be attained, if the design is not complex, not prohibitively expensive, and/or not environmentally destructive.

Distillation has been historically based on the multi-effect concept. It was adopted from the chemical industry and practiced for seawater desalination near the end of the $19^{th}$ century, particularly in marine installations. Vapor was produced essentially by boiling brine in an effect, condensed by being used to boil brine in another effect at lower pressure, and this theme continued until the last effect wherein vapor from the last effect is condensed in a heat rejection condenser. Pool boiling (submerged coils or tubes) type multi-effect distillation (MED) was standard for the first half of the $20^{th}$ century.

The well recognized problem with pool boiling was inefficient vapor generation due to a non-uniform boiling and a low heat transfer coefficient due to excessive scale deposition on heat surfaces, thereby diminishing thermal efficiency and erupting continuous operation. When the application of pool boiling was extended from smaller marine installations to larger land-based installations, it was not only difficult to attain a higher performance ratio (PR) but also very expensive. The PR is identified with the energy consumption, which may be defined as follows:

$$PR = \frac{\text{Distillate (kg)} \cdot \Delta H_{vap}\text{(kJ/kg)}}{\text{Thermal Input (kJ)}} \quad (1a)$$

where $\Delta H_{vap}$ is the enthalpy (latent heat) of vaporization in the region around atmospheric pressure and 100° C. Within strictly this specific region, the definition of PR may be proper. Here, it should be noted that, as many concepts in the desalination field, the PR has been composed on its behalf because its essential dependence on convention (the region around atmospheric pressure and 100° C.) is often forgotten. Since $\Delta H_{vap}$ varies outside this region, the gain output ratio (GOR) may simplify the approximation of the overall steam economy, which is expressed as follows:

$$GOR = \frac{\text{Distillate (kg)}}{\text{Steam Comsumption (kg)}} \quad (1b)$$

PR and GOR have essentially the same order of magnitude within about atmospheric pressure and 100° C., each is approximate of the other, but GOR is always slightly higher than PR.

The early 1950s was coincided with explosive growths in emerging arid countries that struck oil but water was very scarce. Thus, the desalination field in the early 1950s was essentially shaped by the thirst of such arid regions. Nothing stimulates development (an improved or new process) as much as such a niche active market. Kuwait was largely the initial active market, which, in turn, the head start not only to win the race but also to shape the vast seawater desalination market.

In 1953, a seawater desalination plant comprising 10 independent trains, wherein each train comprised triple-effect submerged-tubes MED, was commissioned in Kuwait (Plant A). Each independent train produced about 120,000 U.S. gallons per day (GPD), and thus the installed plant's capacity was about 1.2 million GPD. Scale was frequently extraneously removed from tubes' surfaces by halting operation almost every 7-10 days.

In 1955, a similar seawater desalination plant in both design and capacity was commissioned in Kuwait (Plant B) but with a variation. This variation was directed at mitigating scale formation by continuously dosing seawater with a scale inhibitor (a polyphosphate based additive, which is a mixture of sodium polyphosphate and lignin sulfonic acid derivatives, aimed at mitigating the soft calcium carbonate scale), and occasionally washing the train with acid (2-3 times per year). However, Plant B had to be shutdown almost every 20 days to remove scale as it was nearly the case with Plant A. In Plant B, thermal shock was used, which entailed halting operation and passing steam to the inner side of tubes and seawater to the shell side to cause a sudden contraction to crack accumulated scale on tubes' surfaces. Scale debris was then washed out from the bottom of the train. The procedure of using a scale inhibitor, thermal shock, and acid wash was then extended to Plant A. FIG. 1 depicts a simplified flow sheet for the triple-effect MED train in Plant B, whereby Plant A was essentially similar to Plant B.

From that early period of development onwards, the desalination field was settled upon using a scale inhibitor. To this day, the use of scale inhibitors has become ritual practice. However, the well recognized facts that polyphosphates scale inhibitors were generally ineffective of controlling alkaline scale, let alone sulfate scale, since not only did they fail to delay magnesium hydroxide scale, they also reverted to orthophosphates, which, in turn, promoted dense calcium and iron scale at temperatures of the order of about 82-94° C. (the expected transition temperature range from calcium carbonate scale to magnesium hydroxide scale). It follows that the desalination field was further settled upon confining the top brine temperature within 82-94° C. Yet, these limitations of the settled upon myth in the desalination field (the combinations of using a scale inhibitor and confining the top brine temperature) were attempted in Plant B, then extended to Plant A, but both plants failed to give longer periods between scale cleanings because scale in pool boiling MED stagnantly deposited on the outside of tubes.

Flash distillation has also been known for nearly as long as pool boiling distillation. If a multi-stage flash (MSF) train was successfully built on analogous constructional lines to those used for a pool boiling MED train, it could prolong the periods between the necessary scale cleanings, since vapor is generated by flashing in a flash stages (basically steel boxes with no evaporation surfaces), thereby scale deposition may be limited to the inner sides of tubes of pre-heaters/condensers, wherein at least soft scale deposits may be washed off by the forced circulation of the feed stream. Scale problems, based on the limitations of the settled upon myth in the desalination field, may thus be tolerable in MSF.

Between 1957 and 1958, a seawater desalination plant comprising four independent recycle brine multi-stage flash (RB-MSF) desalination trains, and each train comprised four flash stages, wherein three stages in the heat gain (recovery) section (HGS) and one stage in the heat rejection section (HRS), was completed in Kuwait (Plant C-D). The installed capacity of each train was about 630,000 GPD. The running time of continuous operation in Plant C-D was over 160 days, when it was only a matter of 20 days in Plants A and B, prior to scale removing. FIG. 2 depicts a simplified flow sheet for an RB-MSF train in the Plant C-D.

The expected similarity between FIG. 1 and FIG. 2 was therefore lied in their PR, which were practically 3, since the RB-MSF train as shown in FIG. 2 was based on similar thermodynamic principles as were applicable to the MED train (FIG. 1) and nearly similar top brine temperatures. The PR of both trains was inextricable from the number of effects or stages. The heat rejection condenser (HRC) in FIG. 1 was also similar in functionality to the HRS in FIG. 2. Heat gained in the first effect (FIG. 1) or the brine heater (FIG. 2) was presumably rejected by the HRC (FIG. 1) or the HRS (FIG. 2). If the specific heat input (steam to a first effect or a brine heater) and the specific heat rejection (cooling seawater to a HRC or a HRS) in the design of both trains were equal, then the ratio of cooling seawater to circulating brine in both types of trains would be the same. However, regardless of such equivalencies, reject cooling seawater from both trains would be enormous.

The differences between FIG. 1 and FIG. 2 were also expectedly lied in eliminating all submerged tubes (evaporation surfaces) thereby entirely generating vapor by flashing (FIG. 2), yet in converting all external pre-heaters/condensers and flashing chambers (FIG. 1) to one structure comprising one type of heating surface acting as a barrier between vapor and liquid (FIG. 2). The heating surface in flash stages fulfilled heating the feed stream inside the tubes, condensing flashed off vapor outside the tubes, and partially mitigating scale problems insides the tubes by at least washing off soft scale deposits through the forced circulation of the feed stream. While the latter seemingly made the limitations of the settled upon myth in the desalination field tolerable, it did not resolve scale problems.

But the apparent simplicity of the design in FIG. 2 was at the expense of pumping an enormous amount of recycle brine. In flash distillation, the enthalpy of vaporization (latent heat) is first supplied to liquid before flashing is allowed, and then the enthalpy of condensation can be extracted from the liquid during flashing. The temperature differentials route, rather than the pressure differentials route, between flash stages is implemented to provide a uniform heating surface throughout the flash stages in each section (HGS and HRS) of a MSF train. As such, only the sensible heat of liquid, after the brine heater, is used to obtain the heat of vaporization under reduced pressure from the temperature drop of liquid in each flash stage. Thus, the flash fraction (y) in each flash stage may be given as follows:

$$y = \frac{H_u^L - H_d^L}{H_d^V - H_d^L} \tag{2a}$$

where $H_u^L$ is the upstream liquid enthalpy at upstream temperature and pressure (kJ/kg); $H_d^L$ is the residual liquid (brine) enthalpy at downstream pressure and corresponding saturation temperature (kJ/kg); and $H_d^V$ is flashed vapor enthalpy at downstream pressure and corresponding saturation temperature (kJ/kg). Here, "upstream" and "downstream" refer, respectively, to before and after the liquid passes through the flow channel of a flash stage. In the absence of the required complete enthalpy data, the flash fraction may be approximated as follows:

$$y = \frac{c_p(T_u - T_d)}{H_v} \quad (2b)$$

where $c_p$ is liquid specific heat at upstream temperature and pressure (kJ/kg °C.), $T_u$ is the upstream liquid temperature (°C.), $T_d$ is the liquid saturation temperature corresponding to the downstream pressure (°C.), and $H_v$ is the liquid heat of vaporization at downstream pressure and corresponding saturation temperature (kJ/kg).

The flash fraction thus dictates distillate output in MSF, which is precisely the inherent disadvantage of MSF since flash evaporation is partial evaporation. Based on the inventor's simulation algorithm, the flash fraction in each flash stage of the HGS (FIG. 2) is about 1.8% (distillate) of recycle brine despite the large temperature drop (about 10.1° C.) in each flash stage. As such, the amount of recycle brine is far larger than the amount of distillate.

The effective temperature difference (ETD) available for an overall heat-transfer in a flash stage (FIG. 2) is lower than the corresponding ETD available in an effect (FIG. 1). ETD is approximately the temperature range between the first and last stage (effect) divided by the number of stages (effects). In MSF, the heat input into recycle brine inside the tubes of flash stages causes a temperature rise, which reduces the ETD available in each flash stage for heat transfer, whereas the heat input in MED causes boiling of brine while the ETD remains constant. From a strictly thermodynamic point of a view, if both trains were used to produce the same amount of distillate using the same number of effects or stages in each train, a MED train would operate on a better cycle. This may explain why flash desalination was ignored whereas boil-flash desalination (MED) took the lead in the early development of the desalination field. It follows that MSF has a chance of success within inland installations, wherein pool boiling heat surface type MED failed mainly due to excessive scale problems, only if MSF comprises a much larger number of stages than MED, circulates an enormous amount of recycle brine to meet the required distillate output, and slightly concentrates recycle brine to avoid scaling encrustation by a concentration (the total dissolved solids; TDS) factor in the order of about 1.2 to 1.6. Here, the concentration factor is the concentration ratio of recycle brine to seawater.

In 1960, a seawater desalination plant comprising two independent RB-MSF trains, and each train comprised 16 stages in the HGS and 3 stages in the HRS, was commissioned in Kuwait (Plant E). The installed capacity of each train was about 1.2 million GPD with a PR in the order of 5.7. FIG. 3 depicts a simplified flow sheet for the improved RB-MSF train in the Plant E. The inventor's simulation algorithm indicates that the flash fraction in each flash stage of FIG. 3 was about 0.42% of recycle brine.

The designs as shown in FIG. 2 and FIG. 3 were nearly remarkably similar, but their PR were different. The PR of the design as shown in FIG. 2 was tied to the number of stages as was the case with the standard MED (FIG. 1); thereby the PR of order of 3.3 was obtained with 4 flash stages (FIG. 2). On the other hand, the PR of the design as shown in FIG. 3 was no longer tied to the number of stages as was the case with the standard MED (FIG. 1). This may seem nonsensical to aim for a PR of 5.7 with 19 flash stages (FIG. 3) when it could be obtained with sextuple-effect MED. However, the latter was installed in Aruba and Curacao (1956-1958), but it was proposed and rejected in Kuwait (1955) in favor of the RB-MSF (FIG. 2) due to sheer complexities of the pool boiling sextuple-effect including extending the length of heating surfaces far beyond the proportionate distillate output. This required a quite deep brine pool and higher boiling points for the bottom tubes, which, in turn, led to excessive scale built-up within the bottom tubes and made it exceedingly difficult to access them. That was the end of pool boiling MED in land installations.

FIG. 4 reveals how steep the reduction in production cost of potable water from seawater desalination was between 1953 and 1960 in Kuwait. Since then many nations have shifted their focus to seawater as a cost-free, infinite and seemingly inexhaustible source, and MSF as a mean of reliably meeting potable water demand at an acceptable cost. MSF has thus ruled the seawater desalination market. By 1975, more than 88% of the world's potable water production from seawater desalination, roughly about 685 million GPD, was produced by MSF. By 2015 (forty years later), the installed capacity of Kuwait was about 620 million GPD; most of which came from RB-MSF plants (88%), where the remaining came from two RO plants installed in 2011 and 2014, wherein the installed capacity of each RO plant was about 36 million GPD.

Except for slightly raising top brine temperature to about 110° C. in some MSF plants, mainly due to introducing on-line sponge ball-tube cleaning in the late 1960s, the practice in MSF plants follows essentially the same limitations of the settled upon myth in the desalination field to combat scale formation (using a scale inhibitor and confining top brine temperature) as they were set in the 1950s. Scale inhibitors (e.g., polyphosphates, phosphonates, polycarbonic acids, etc.) are primitive in nature with proven limited values in solving magnesium hydroxide and calcium sulfates scale. Anyone with experience in such scale depositions knows that to have been true even if the top brine temperature was restricted to a far less temperature than 110° C., wherein such scale deposition had at least damping effects not only by acting as nuclei for further deposition but also by upsetting the regularity of heat transfer coefficients.

Sponge balls provide on-line tube cleaning by forcibly circulating the balls through the inner side of tubes of heating surfaces to dislodge soft scale. Yet, recycle brine, by definition, re-circulates most of scale debris from flash stages as well as dislodged soft scale from the inner side of tubes by the sponge balls back to the same tubes in a HGS and a BH. The very purpose of sponge balls is thus instantly negated by the very function of recycle brine.

MSF, in itself as a desalination concept, has proven to be a long life concept since it is fully verifiable to operate an MSF plant for 50 years. For example, an installed MSF plant in 1971 in Kuwait is scheduled to be phased out in 2021. Further, seawater, with the exception of a few geographical locations, has nearly remarkably constant proportions of dissolved ions despite variations in its total ions content (e.g., 3.5-4.5 wt %). About 88% of the total ions content in seawater is monovalent ions (sodium, potassium and chloride), about 5% is alkaline cations (magnesium and calcium), and about 7% is sulfate and carbonates (bicarbonate, carbonate, carbon dioxide and carbonic acid), wherein the magnitude of sulfate is about twenty times the magnitude of carbonates. About one-third of the magnesium concentration may be in the form of sulfate and the remaining two-thirds are in the form of chloride (e.g., Table 1); thus about two-thirds of the concentration of sulfate may essentially pair with magnesium and the remaining one-third mostly pairs with calcium. The very marginal concentration of carbonates, wherein bicarbonate is the main ion and the essential natural pH regulator of seawater, is about 0.35-0.4% of the total ions content (3.5-4.5 wt %). Hence, about 10% (0.35-0.45 wt %) of the total ions content in seawater (3.5-4.5 wt %) is ions scale pairing content.

In order to indefinitely hold this myth, the desalination field further contrived that if a desalination method was operated below the saturation envelop of calcium sulfates scale by restricting the top brine temperature to 110° C. or preferably far less, 99.9% of seawater total ions content could not be the issue, but it is that other "0.1%" or "less" could dictate the practical success or failure of the desalination method. In other words, it is that other "1%" or "less" of the ions scale pairing content (0.35-0.45 wt %), wherein the whole "1%" is the entire carbonates whereas the "less" is that other 10% or so of this whole "1%", thereby it is that carbonate ion that remained bound up in the bicarbonate ion at the normal pH of seawater, which is essentially the saturation limit of calcium carbonate that could dictate the success or failure of desalination methods.

The reaction mechanisms of carbonates, as dictated by bicarbonate, wherein the latter is the pH buffer of seawater, could be acidic, alkaline or in parallel. Each mechanism comprises steps, wherein some steps are instantaneous and some are albeit slower since they involve rearrangement, but the net reaction of bicarbonate regardless of the mechanism is the essentially same, which may be expressed as follows:

$$2HCO_3 \Leftrightarrow CO_2 + CO_3 + H_2O \quad (3a)$$

This net bicarbonate reaction is proper, but it is improperly the foundation of the myth in the desalination field.

In order to intrinsically evaluate this mythology, none of its utilities should be evaluated independently, but they should be considered in a coherent context and with regard to broader aspects of seawater desalination. FIG. 5 shows an independent RB-MSF train comprising 23 stages (20 stages in the HGS and 3 stages in the HRS), wherein the train is part of a MSF desalination plant, wherein the plant comprises eight identical independent trains. Based on the inventor's simulation algorithm, Table 2 presents the performance of the RB-MSF train (stage by stage) using the natural composition of seawater (Table 1), Table 3 presents a given operating condition of the train, and Table 4 presents the exergy analysis of the train based on the operating condition as given in Table 3. Here, exergy refers to the capacity of a train to perform work. Exergy analysis combines the first and second laws of thermodynamics, whereby physical and chemical exergy contributions are included; thereby it is taken as a measure of the train's performance when coupled with a defined passive state (seawater ambient temperature, pressure, and composition). The physical exergy relates to differences in temperature and pressure between the given thermodynamic state and the passive state at constant salts composition. The chemical exergy relates to the difference in salts composition between the thermodynamic state under consideration and the passive state at constant temperature and pressure. The Pitzer model, as a sound thermodynamic framework, is used as a foundation to estimate the chemical exergy. By performing the exergy balance on each of the units [e.g., the steam letdown valves (SLV), de-superheater (DSH), brine heater (BH), heat gain section (HGS), heat rejection section (HRS), vacuum de-aerator (VD), and ejectors/condensers (EC), pumps (P), and throttling valves (TV)] including final outlet streams, the exergy distribution within the RB-MSF train for a given operating condition is presented in Table 4. This analysis may help in hoping to arrange for the train to be reversible as thermal energy and work energy are supplied or destroyed.

The top brine temperature of the RB-MSF train is 110° C. The recycle brine is continuously dosed with a scale inhibitor and the HGS and the BH of the train is cleaned on-line every 2 hours by sponge balls. The pH values in recycle brine are higher (e.g., 0.2-0.8 unit) than that in seawater (e.g., pH: 7.9-8.1) due to thermal decomposition of bicarbonate, which is slightly alkaline, and thus the alkaline mechanism of bicarbonate may prevail. During overhauling, analysis of scale depositions from front-end flash stages in the HGS of the train, wherein the temperatures of flashing brine extend from the top brine temperature down to roughly about the expected the transition temperature of calcium carbonate to magnesium hydroxide, reveals intense, hard and over layered scale.

FIG. 6 shows that magnesium hydroxide deposition is dominant generating a curve in the form of essentially an elongated "V", which starts at the highest deposition (94.8%) in the first flash stage, changes to convex downwards, sharply passes through the lowest and steepest point (the fifth flash stage), changes sharply upwards to concave, passes through the second highest deposition (94.2%) in the seventh flash stage, and then falls off again as it approaches its approximate transition temperature. Calcium carbonate scale deposition, which is marginal in these flash stages, essentially follows an opposite pattern. Calcium sulfate (anhydrite) scale deposition also follows an opposite pattern to the magnesium hydroxide scale deposition, but it is dominant in the fifth flash stage despites temperatures of flashing brine in such stages are below 110° C.

The deposition patterns of such scaling compounds may be explained, as the inventor postulates, by modifying the alkaline bicarbonate mechanism as follows:

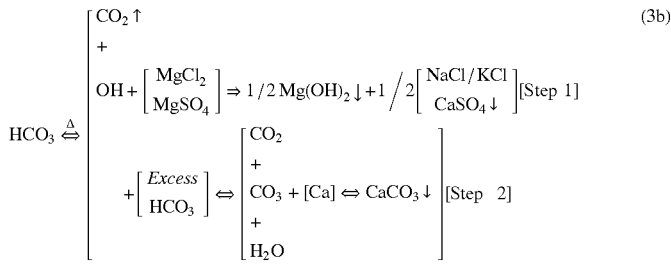

In the front-end flash stages, wherein higher temperatures are involved, heat breaks down the bicarbonate ions into carbon dioxide, which escapes as a gas, and hydroxyl ions are formed, which produces magnesium hydroxide scale from magnesium chloride (about ⅔ of the magnesium ion) and magnesium sulfate (about ⅓ of the magnesium ion) in recycle brine. The highest magnesium hydroxide scale deposition (>94% of the total scale) takes place in the first and the seventh flash stages, wherein carbon dioxide (along with other non-condensable gases) is vigorously vented (FIG. 5), thereby the vigorous escape of carbon dioxide abundantly promotes magnesium hydroxide scale deposition. Seawater contains an excess of sulfate over both calcium (about ⅓ of the sulfate ion) and magnesium (about ⅔ of the sulfate ion), and the same excess would nearly remain proportional to the concentration factor of recycle brine. When magnesium is heavily deposited in the form of hydroxide in the first four flash stages as it is clearly shown in FIG. 6, then it progressively gives place to an excess of calcium (Eq. 3b, Step 1); thus the super-saturation of calcium sulfate (anhydrite) occurs, which evidently initiates anhydrite scale. Nearly in the middle between the first and seventh flash stages, wherein carbon dioxide is not vigorously vented (the fifth stage), the deposition of anhydrite scale is a maximum when the deposition of magnesium hydroxide scale is a minimum, and yet the deposition of magnesium hydroxide and calcium carbonate scale approaches equivalence.

Here, the one point to be emphasized is that the release but limited escape of carbon dioxide play an important role not only in the formation of alkaline scale by damping magnesium hydroxide scale (Eq. 3b, Step 1) and promoting calcium carbonate scale (Eq. 3b, Step 2), but also in the formation of calcium sulfate scale (Eq. 3b, Step 1), when the latter may not be expected owing presumably to the formation of relatively stable super-saturation (flowing recycle brine in flash stages with a short residence time at temperatures below 110° C.). The second point to be noted is that in the back-end flash stages, wherein temperatures of flashing brine are below 80° C., the steps in Eq. (3b) would be reversed, thereby it is expected that magnesium hydroxide scale deposition falls off sharply to a marginal level at about 50° C. or so, calcium carbonate scale deposition takes off to a dominant level then falls off to a marginal level as the temperatures of flashing brine approach ambient, whereas calcium sulfate scale may cease.

It should be noted that the main reason for this myth in the first place in the early 1950s was to lengthen the operational running time of desalination trains so that the shut-down time due to scale cleaning would be reduced. It may have been of useful utility in the past, but today this mythology is of doubtful utility, since not only is there always calcium carbonate scale deposition, but magnesium hydroxide scale and calcium sulfate scale are certainly deposited, despite the restriction of the top brine temperature and the combined use of scale inhibitors and on-line balls-tube cleaning. A thin layer of soft gelatinous magnesium hydroxide scale deposits is nearly as good an insulator of heating surfaces as a thick layer, and it is worse in the case of the hard anhydrite scale deposit. Scale is not only intensely initiated in flash stages but also carried over to heating tubes through recycle brine. This, in turn, reduces heat transfer coefficients and increases pressure drops; thus necessitating periodic shut-downs and overhauls to remove scale. It also entails acid cleaning to restore the heat transfer coefficients to their original values, mechanical cleaning in severe cases, and combinations. It further necessitates a significant excess in the heat transfer surface, as a scale fouling allowance, to minimize unscheduled shutdowns. The heat transfer per unit surface area of a HGS in a train constitutes about 30% of the capital cost, yet the scale fouling allowance could reach 25% of excess area, thereby increasing capital cost by about 8%.

Thermal energy and work energy were made available by a power generation cycle at the expense of a natural resource and the environment. In 2015, power-water co-generation plants in Kuwait, for example, were fueled by about 350,000 barrels per day (BPD) of oil equivalent in the forms of heavy crude oil, heavy fuel oil, gas oil, and lean gas. The tradeoff between higher energy values (in terms of total enthalpy) and dumping less air pollutants into the atmosphere (in terms of sulfur and other non-hydrocarbon content) of such combined purpose plants depends on the fuel type.

Table 4 shows that about 9% (147.4 kJ/kg) and 62% (1,010.2 kJ/kg) of the total steam specific energy input (1,640.9 kJ/kg) are destroyed, respectively, in the SLV and DSH before it reaches the BH of the train. Steam is thus available at temperatures far higher than it can be used in the train, but 71% of its specific energy input is destroyed because of restricting the top brine temperature due to scale problems, although scale problems are not resolved at the restricted top brine temperature by a scale inhibitor (FIG. 6) and sponge balls, and although economically this bled (not exhausted) steam from the power cycle should be used to extract work energy. This indicates that the power-water co-generation plant is based-load, wherein the co-generation plant must produce a steady distillate output; thereby the power produced must also be kept steady. This also firmly indicates that the country is more concerned about water than power, yet the approach militates considerably against the economy and environment when the power generation cycle is oversized and restrained in order to bleed steam to operate a set of trains in a desalination plant at quite wasteful conditions. Instead, the co-generation plant should be load-following, wherein the power production can be made flexible without upsetting the distillate output.

The distillate cost ($ per kg/s of distillate) from an independent MSF desalination train in a power-water co-generation plant, excluding the cost of work energy for pumping, may be expressed as follows:

$$C = C_1 \cdot \Delta H_{vap} \left[ \frac{C_A \cdot C_{E_T}}{U \cdot \Delta T} \right]^{1/2} \qquad (4)$$

where is $C_1$ is an adjustable parameter comprises other design factors, $\Delta H_{vap}$ is the enthalpy of vaporization (kJ/kg), $C_A$ is the cost of heat transfer surface per unit surface area [A] ($/m), $C_{E_T}$ is the cost of total energy ($/kW) wherein $E_T$ is the specific energy input [$E_i$; kJ/kg] multiplied by the steam mass flow [$m_s$; kg/s], U is the overall heat transfer coefficient (kJ/s m²K), and $\Delta T$ is the difference between the highest and lowest temperature in a train (K); the flash range. FIG. 7 illustrates water phase changes as a function of temperatures and water specific volumes. The only way to diminish or vanish $\Delta H_{vap}$ is to conduct evaporation near or at the critical point of water, wherein the critical pressure ($p_c$) is 221 bar and the critical temperature ($T_c$) is 374° C. At such extreme pressure and temperature conditions, the PR can actually be in the order of 3 to 6 per an effect or a stage. However, such conditions require very expensive construction materials and extreme pumping power, and lead to scale issues becoming extreme hindrances.

However, in order to reduce distillate cost, but away below the extreme critical region, and within the liquid-vapor region (FIG. 7), $\Delta H_{vap}$, A and $m_s$ should be reduced, whereas U and $\Delta T$ should be increased. This would point to only one direction; that is increasing the top brine temperature, if seawater is actually effectively de-scaled (by means other than scale inhibitors). With the exception of conducting desalination near or at the critical conditions wherein $\Delta H_{vap}$ vanishes, all of these parameters would undoubtedly improve distillate cost, but none of them would provide as much room for improvement as increasing $\Delta T$. The latter is explained in FIG. 8, wherein it shows that the vapor pressure gradient of seawater (the natural composition, Table 1), in order for flashing to occur, is the same at interrelated temperatures, yet this same vapor pressure gradient has a much smaller temperature gradient at a higher temperature than at a lower temperature. This means that a substantial increase in distillate and/or more stages can be added at a higher top brine temperature for the same temperature difference than at a lower top brine temperature. Thus, it is feasible to increase distillate by about 78% by raising the top brine temperature of a train from 110° C. to 150° C. (far below the critical conditions).

Higher vapor pressures and overall heat transfer coefficients combined with lower enthalpy of vaporization, heat transfer per unit surface area, and steam mass flow mean not only producing more distillate with less specific heat input but also smaller train's dimensions, less reject brine, less reject cooling seawater, thereby less seawater usage. This is unlike desalination practice of today, wherein lower vapor pressures at top brine temperatures in the order of 110° C. or less mean enormous amounts of seawater usage and recycle brine, significant pumping power requirements, considerable train dimensions, and enormous amounts of reject streams.

The inventor's view is that there is a considerable room for appreciable reductions in capital and operating costs in operating a train albeit above atmospheric pressure (e.g., 4.2 bar) than what has been practiced and considered adequate (e.g., 1.2 bar at 110° C. of top brine temperature), especially when most existing MSF plants were actually designed to sustain a hydraulic pressure test of 4-times the practiced operating pressure. In fact, it is the plausible way to actually divorce the PR from the number of stages or effects by conducting evaporation in the region albeit above atmospheric pressure and 100° C. (Eq. 1a), thereby producing more than 1 kg of distillate per less heat of evaporation (kJ) and less reject brine, thereby less seawater feed stream. Here, it should be recalled that the PR, as specifically defined in Eq. 1a, cannot be tied to the number of effects or stages because 1 kg of distillate cannot be produced in each consecutive effect or stage because of the enthalpy of vaporization increases as the pressure and temperature decrease, thereby the produced amount of vapor in each successive effect or stage is less than in a preceding effect or stage. This may be crudely illustrated in FIG. 7, wherein pressure and temperature of water in the liquid-vapor region are not independent for a phase change; thereby increasing the pressure also increases the temperature at which evaporation takes place. At higher temperature, it is easier to overcome the intermolecular forces, despite the slight increase in boiling point elevation, thereby less energy is required for evaporation (e.g., heat of vaporization is smaller at higher pressures). On the other hand, decreasing the pressure also decreases the temperature, thereby increasing the enthalpy of evaporation by widening the difference between the saturated liquid (L) and vapor (V) enthalpies.

Because of restricting the top brine temperatures to 110° C. or less, the only virtue to extract more distillate is to extend the flash range by lowering brine temperature in the last stage to ideally about seawater ambient temperature (SWAT). This also may be burnt in on the souls of those thermodynamicists to bring the thermal rejection rate close to the ideal reversible rate. As such, an enormous amount of cooling seawater has been used in a once-through mode as a heat sink in a HRS to flash-off a small fraction of distillate at the lower-temperature end of a train.

The ideal reversible rate is the free energy difference between seawater and its separate salts in the standard state (e.g., passive state at ambient temperature, pressure and mass), thereby it is the hypothetical minimum specific energy ($E_{min}$; kJ/kg) to separate salts from seawater at zero recovery ratio. The inventor estimates $E_{min}$ by expanding the van't Hoff relation for the osmotic pressure of seawater and properly accounting for the salt-dissociation phenomenon. As such, $E_{min}$ may be expressed as follows:

$$E_{min} = \frac{\pi}{\rho} = \frac{\upsilon \cdot C \cdot T \cdot R}{\rho} \tag{5}$$

where $\pi$ is the osmotic pressure of seawater (kPa; kJ/m³), $\rho$ is the density of seawater (kg/m³), C is the concentration of salts in seawater (kmol/m³), $\upsilon$ is the actual dissociation constant of sodium chloride, T is seawater ambient temperature (SWAT; K), and R is the ideal gas constant (8.3144598 kJ/kmol K). TDS is entirely replaced by sodium chloride, as an approximation of the same concentration of seawater, since sodium chloride is the predominant salt in seawater. The molalities (mol/kg) ratio of the sodium ion to the chloride ion is then related to the theoretical dissociation, wherein sodium chloride is dissociated into two ions (sodium and chloride); thereby the actual dissociation constant of sodium chloride, as approximate of the natural composition of salts in seawater (Table 1), is 1.74. FIG. 9 shows the estimated $E_{min}$ at different SWAT, wherein the TDS is 39,500 mg/L (Table 1). FIG. 9 also shows the estimated specific energy rejection ($E_r$) to be added to $E_{min}$, when SWAT is 33° C. and a feed of 3 kg of seawater is taken to produce about 1 kg of distillate and about 2 kg of reject brine, which is the same proportional ratio in the RB-MSF train (FIG. 5 and Tables 2-4).

The required amount of cooling seawater in a HRS (HRS-SW) should considerably exceed the amount of recycle brine in a HGS in order to bring the temperature rejection rate closer to the ideal reversible rate. If not, it should be at least equal to the amount of the recycle brine in the HGS in order to make the ETD the stages of HGS and HRS closely equal. As such, any reduction of the required amount of HRS-SW would drastically affect the temperature rejection rate. Yet, this amount is constrained by the seasonal variations of SWAT, specific energy input, capital cost and operational sensitivity. As shown in FIG. 10, the summer season in Kuwait, for example, is very long, and the natural SWAT may be in the range of 27-33° C. for at least 7 months of the year. The winter season is very short, and SWAT may be in the order of 18-26° C. but seldom in order of 14° C. The train may be designed to balance the extreme ends (14° C. and 33° C.) of SWAT and anywhere in between since SWAT dictates not only the heat transfer area of the HRS and the heat input of the BH but also the amounts of recycle brine and cooling seawater, thereby the infrastructures of seawater intake, rejects discharge and recycle streams (pipelines, pumps, settling basins, strainers, coarse filters if any, chlorination, and throttling/controlling valves).

FIG. 11 and Tables 2-3 reveal that the ratio of total seawater [(T-SW); to feed the HRS and E/C with cooling seawater] to RB is about 1.03 at 33° C. SWAT. About 14% of the T-SW is fixed as cooling seawater for the ejectors/condensers (E/C-SW), and about 86% is used as cooling seawater for the HRS (HRS-SW), thereby the ratio of HRS-SW to RB is about 0.89. The same nearly goes for SWAT at 30° C. but with a marginal reduction in the amount of RB.

FIG. 11 also reveals that ratios of T-SW to RB at 14° C. and 20° C. SWAT are about, respectively, 0.47 and 0.6. Here, a recycle supplement stream (RSS), comprising reject cooling seawater from the HRS, reject cooling seawater from E/C, reject brine (B), recycle brine (RB), return condensate (RC) and distillate (D), is used to augment the amount of HRS-SW. RC and D are used in the RSS to maintain a constant temperature (27° C.) and a TDS level (39,500 mg/L as seawater) at the entry to the HRS. The amount of the RSS brings the ratio the combined feed (RSS and T-SW) to RB to about 0.98 at 14° C. and 20° C. SWAT. As such, the ratio of HRS-SW to RB is about 0.84 at 14° C. and 20° C. SWAT, whereas the E/C-SW remains fixed at about 14% of the combined feed (the same as at 30° C. and 33° C. SWAT).

The variations in SWAT therefore necessitate at least an allowance of 10% of excess heat transfer surface in the HRS, which increases the capital cost of the train by about 5%, when this allowance should be in the order of 50% for an effective design that should bring the ratio of HRS-SW to RB to about 1.4. Yet, FIG. 9 and Table 4 confirm that at 33° C. SWAT, the specific heat input of the BH to raise the RB temperature by 6.5° C. (from 103.5° C. to 110° C.) is entirely rejected in the HRS (about 6.65° C. of a rejection temperature above 33° C. SWAT), which negates the very thermodynamically intended purpose of integrating the HRS in an MSF train since the specific energy rejection ($E_r$) is slightly higher than the specific energy input ($E_i$) to the BH, let alone bringing it closer to the minimum specific energy ($E_{min}$). The simulated amount of distillate from the HRS constitutes about 8.5% of the total distillate of the train at 100% load factor (Table 2). However, the train can be operated in the range of 65-110% load factor, but it's normally operated at 85% load factor. In other words, this amount of distillate from the HRS can be extracted from the HGS without the complexity of adding the HRS, which also negates another purpose of integrating the HRS in an MSF train in the first place; that is producing more distillate. The same nearly goes, but with albeit higher temperature rejection, at 30° C. SWAT (about 6.75° C. of temperature rejection from the HRS above 30° C.) and 27° C. SWAT (about 7.6° C. of temperature rejection from the HRS above 27° C.).

At 20° C. SWAT, the specific energy input ($E_i$) of the BH to raise the RB temperature by 6.8° C. (from 102.2° C. to 109° C.) is not only entirely rejected, but an additional equivalent recycled energy input within the RSS is also destroyed at the entry to the HRS to maintain the temperature of the HRS-SW at 27° C., thereby about 14.7° C. of temperature rejection from the HRS above 20° C. SWAT. Further, about 25% of the total distillate of the train will be lost to maintain the RSS at a TDS level of 39,500 mg/L and a temperature of 35.3° C. prior to blending with the HRS-SW at the entry to the HRS, and to compensate for the lost return condensate to the power generation cycle. Yet, at 14° C. SWAT, wherein the specific energy input of the BH and the temperature at the entry to the HRS are the same as at 20° C. SWAT, the temperature rejection from the HRS is about 20.7° C. above 14° C. SWAT. FIG. 12 shows that the specific energy rejection is tripled at 14° C. SWAT. Here, the situation is even worse since the entire operation of the train is extremely overstrained with a greater loss of total distillate than at 20° C. SWAT.

As can be clearly seen, the purpose of integrating a HRS in an MSF train, as implemented, has met neither a thermodynamic requirement nor an actual distillate necessity. It essentially supports, in part, the mythology of using and then reducing the loss of a scale inhibitor and other additives by recycling brine through a HGS. But, the later requires an enormous amount of once-through cooling seawater that should ideally exceed the amount of recycle brine by about 40%, which is apparently impractical. In other words, the whole purpose of a HRS is solving the dual disadvantages of using and reducing the loss of chemicals by much more complex and costly disadvantages.

Table 4 shows that the pumping power of the train is over 12,000 kW, which is considerable bled work energy from the power cycle. About 67% of this pumping power is attributed to the recycle brine pump. This pump must handle a severe suction condition wherein recycle brine is at least at the saturation temperature, resistance from friction losses in the heat transfer tubes, and variations in the load factor. These issues lead to overstraining the required net positive suction head (NPSH) of the pump at a normal load, vibration, and cavitation; thereby dissipating about 3,000 kW.

Despite de-aerating the actual seawater feed stream prior to blending with reject brine to form recycle brine and the use of an oxygen scavenger during the desalination of recycle brine, oxygen is still present in recycle brine, carbon dioxide is also released from the breakdown of alkalinity, and air leaks may also find its way into a train under vacuum. An E/C system in each train of a desalination plant has to compress these gases in order to expel them into the atmosphere and its cooling seawater and specific energy requirements are not negligible. It is impossible to expel gases without also expelling an accompanying amount of water vapor. About 1,700 kW of bled M.P. steam is also destroyed in the ejectors of each train. Because each train in a plant is operated independently, the losses of destroyed M.P. steam and water vapor are collectively considerable in a desalination plant comprising multiple independent trains.

Seawater is considered a cost-free, infinite and inexhaustible source; thereby it has been unguardedly exploited to produce distillate. However, the doubtful utility of this mythology in present day desalination is demonstrated, for example, in FIG. 13. This figure is approximate, but does reflect how large the magnitude of cumulative seawater usage in Kuwait. Based on the installed distillate capacity of Kuwait in 2015, about 5.2 billion GPD of seawater may be used in order to produce about 620 million GPD of distillate; thereby rejects may be in the order of about 1.2 billion GPD as reject brine, 2.8 billion GPD as reject cooling seawater from heat rejection sections (HRS), and 535 million GPD as reject cooling seawater from ejectors/condensers (E/C). Not only does desalination use enormous amounts of seawater to produce a small fraction of distillate (about 10%), it also re-deposits its enormous rejects (about 90%) along with additives back into the sea. Seawater is thus constantly subjected to dramatic changes in additives loads, salts concentrations and heat flux.

In 2015, the estimated loads of additives in rejects from desalination plants in Kuwait may be in the order of about 8,500 kg/day of chlorine residue, 44,000 kg/day of oxygen scavengers (e.g., sodium bisulfite), 26,400 kg/day of scale inhibitors (e.g., polycarbonic acids, phosphonates, etc.), and 220 kg/day of foam inhibitors (dialkyl ethers, polyethylene glycol, polypropylene glycol, etc.). Critical loads of other additives and additives' by-products are also discharged to the sea, including acid, corrosion inhibitors during acid cleaning (e.g., benzotriazole and its derivatives including selenium), transition metals (e.g., copper and nickel), hypobromite, and halogenated organics (e.g., bromoform and trihalomethane).

The amounts of additives and their by-products may seem marginal in respect to the enormous amounts of reject streams, wherein dilution is assumed to be the solution to their pollution, but dilution only spreads them wider and farther since their lethal toxicity in marine environment is manifested in their persistence, reduction of oxygen, and accumulation in sediments and habitants. The Arabian Gulf, as nearly an enclosed sea, wherein Kuwait is located within its northwestern corner, has peculiar ecological characteristics. FIG. 14, for example, illustrates forcibly the impact of the excessive seawater usage on the dramatic decline of fish and fishery production in Kuwait. The anthropogenic exploitation associated, in part, with seawater desalination has clearly exerted a significant impact that not only causes drastic changes in the directly affected habitats, but also in the adjacent habitats and the associated primary sources of fish stocks. Seawater may be viewed as a cost-free and infinite source for desalinated water, but it is certainly not inexhaustible at least when it comes to death of marine life and migration of marine inhabitants.

The two most important characteristics of seawater are temperature and salinity, wherein together they control density, which is the major factor governing the vertical movement of seawater; more importantly in shallow seawater. The dramatic changes in situational salinity may be illustrated in Table 1, wherein marshy, shallow and low current seawater at the tip of the Arabian Gulf (Kuwait) is subjected to about 200 million GPD of reject brine with about 63,200 mg/L of TDS and about 994 million GPD of total reject with about 40.4° C. of temperature rejection from an MSF desalination plant, which comprises eight independent RB-MSF trains. The magnitude of the TDS, in itself, may be of less importance than the surge in the load of magnesium, calcium, sulfate and bicarbonate. This surge in the load of such scale forming ions has clearly altered the natural composition of seawater. The heat flux from the total rejects is also significant due to the high specific heat of seawater, which not only increases SWAT but may also make seasonal temperature variations insignificant. The combined effects of the surge in TDS and SWAT would cause operational sensitivity, thereby forcing a reduction in the concentration factor of recycle brine, a reduction of a top brine temperature, an increase in seawater feed, an increase in additives' consumptions, an increase in the frequency of shutdowns and overhauls, and combinations thereof.

By 2035, additional 800 million GPD of distillate will be needed in Kuwait. FIG. 15 reflects the disparity of the water demand-supply in Kuwait, which indicates that the rise in the anticipated water demand (about 5% per year) outpaces the supply from existing desalination plants. The projected water demand also, to a lesser extent, may coincide with the phase out of some of the older MSF plants that were installed in the early 1970s and 1980s.

By accepting this acquiescence myth and its pregnant silences as set forth hereinabove, it seems that the path to stimulate a new pseudo market is to gradually erode the dominance of MSF and reassert MED. Because the number of flash stages in an MSF train, unlike an MED train, is not tied up to the PR, in the region around atmospheric pressure and 100° C., thereby requiring a larger number of flash stages, MED with improved heat transfer coefficients may have a fundamental capital investment advantage over MSF to achieve the same PR with a lesser number of effects. Since the energy requirements for an MSF train or an MED train branch from two sources (thermal energy for a brine heater or an effect along with ejectors, and work energy for pumps), whereas RO requires only work energy for pumps, RO has an energy consumption advantage over both MSF and MED. The interest is further stimulated in recent years by the so-called "Build-Operate-Transfer" (BOT) concept, wherein private investors are essentially free to choose their proposed desalination methods with minimal interference and requirement from a governing entity, the capital cost is shared in a pre-determined proportion between the investors and the governing entity (e.g., 40% by investors and 60% by a governing entity), and the investors are allowed to sell water, power, or both, to exclusively the governing entity or directly to consumers for a pre-determined period (e.g., 20-40 years). By exclusively buying the products, the governing entity may, in turn, further subsidize the costs to reduce the burden on consumers.

In late 2016, a desalination plant comprising 10 independent trains with a total installed capacity of about 128 million GPD, wherein each independent train was based on a thermal vapor compression (TVC) type MED (TVC-MED) with a GOR in the order of 11.2, was commissioned in Kuwait. The reported length of heat transfer tubes is 18,750 miles. In late 2018, a RO desalination plant with a total installed capacity of about 36 million GPD was also commissioned in Kuwait. Both plants were based, for the first time, on the BOT concept.

Pool boiling heat surface type MED existed since 1884, and remained dominant throughout the whole development of marine and inland distillation until 1956; a total period of 72 years. During this period, a single company had installed about 75% of all such desalination plants in the world. It started with a production capacity of about 250 GPD and reached its maximum of 1.7 million GPD. In other words, this pool boiling type MED worked to its zenith, then froze primarily because of scale issues, and replaced by MSF since then. It seems, 60 years later, as wisely stated by Mark Twain, "history does not repeat itself but it does rhyme".

FIG. 1, which is a configuration of a pool boiling type MED train, shows that seawater feed stream is pumped and gradually pre-heated in each pre-heater before it is fed into the highest temperature effect, and brine from the highest temperature effect is pumped downward to the lowest temperature effect for partial evaporation in each effect. FIG. 16, which is a generic configuration of a TVC type MED train, is very similar to FIG. 1 in terms of seawater flow arrangement, but the difference is that part of seawater feed stream is split off at each effect, fed in parallel to each effect, and added to the brine in that effect. This may increase distillate output by about 3-5%, but the design is not only complex in terms of heterogeneity and control requirements but, flow-wise, is also very restrictive. Another type of mixed feed arrangement is that groups of effects are fed in parallel and their discharge is pumped to another group or two groups in the same MED train, essentially to reduce the number of pumps required.

Because of the intricate heterogeneity and excessive flow restrictions (e.g. seawater spray nozzles and their on-line fine filters, multiple pre-heaters, multiple flash chambers, multiple liquid-liquid heat exchangers, multiple vapor-liquid heat exchangers, etc.), on-line sponge balls cleaning cannot be used in such MED and TVC-MED trains. Thus, the top brine temperature is further restricted to 65° C. in an attempt to limit scale forming species to calcium carbonate. Yet, seawater flow in heat transfer tubes is low; thereby more susceptibility to scaling due to supersaturating, even though it is assumed that scale prone species are restricted to calcium carbonate scale by restricting the top brine temperature to 65° C.

Since the adoption of the multi-effect concept to desalinate seawater, the promise of an improved heat transfer coefficient over a given temperature range revolves around: either (1) using a small number of effects, thereby obtaining a nearly equal order of a PR and the same amount of distillate per an effect from the same ETD over a lesser heat transfer surface; or (2) increasing the number of effects, thereby nearly equally increasing the PR and obtaining the same distillate output per effect from a smaller ETD over the same or lesser heat transfer surface. Nearly all virtues for expanding the number of effects of MED in the past 60 years or so were driven by the notion that a thin-film boiling concept, which in itself would assure better heat transfer coefficients, if it is conducted properly, since brine boils by spraying on the thin-film, can be maintained in practice. Yet, this implies higher heat-concentration co-gradients at the thin-film surface than that of a conventional evaporative surface. A higher heat gradient means a higher vapor gradient from a lesser amount of brine at a lesser heat transfer per unit surface area; otherwise the capital cost of such an enhanced type of heat transfer is prohibitive. But a higher concentration co-gradient combined with scale issues and variations in loads and conditions of seawater feed stream, despite restricting the top brine temperature to 65° C., mandatory cleaning of seawater spray nozzles and their on-line fine filters, and frequent acid cleaning against calcium carbonate scale, mean that it is difficult to avoid spots scale accumulation, wherein such spots not only act as nuclei for further scale accumulation but also destroy the very sensitive function of uniform thin-film boiling, thereby establishing continuous ideal-film boiling in a large capacity MED train may not steadily be maintained.

Yet, the capital cost of such an enhanced type heat transfer surface MED implies that it is only related to the length of evaporation surface, but it is not directly related to the PR (GOR) of the train. If a plant comprises 10 independent MED trains, wherein the GOR of each train is of the order 11.2 thereby each train comprises at least 12 effects, was assumed at a top brine temperature of 65° C. but without a TVC, then it would require a double length of enhanced and conventional heat transfer surfaces (at least 37,500 miles) because the temperature difference per effect is quite low. This may affirm a prohibitive capital cost. Further, SWAT must not exceed 25° C. in order to maintain the same ETD among effects of such a train when the Arabian Gulf SWAT not only could easily exceed 27° C. for at least 7 months of the year but also could approach 40° C. (due to thermal loads of reject streams), thereby such an MED train equipped with a thin-film heating surface but without a TVC may be impractical under such conditions. It follows that a revised large capacity MED train equipped with a thin-film heat transfer surface may have a chance of reducing its capital cost against an MSF train of an equivalent capacity and operating under same conditions only if it comprises a number of effects well below its PR.

In what follows is that the actual reason of a heat pump (e.g., a TVC) in a TVC-MED train is neither to get more heat nor even to get enough heat to cause vaporization, but to get heat at a temperature suitable for heat exchange on an enhanced type surface, whereby the length of the thin-film heat transfer surface may be reduced; thereby reducing the number of effects below the PR, which, in turn, may reduce the capital cost. As such, the number of effects may be no longer closely tied to the PR as is the case in a standalone MED train, yet here the validity of the PR [a lower top brine temperature (65° C.) and a lower pressure (0.3-0.2 bar)] is no longer anchored to its assumed foundation as expressed in Eq. 1a (around the region of atmospheric pressure and 100° C.). This is essentially similar but opposite to the development of a RB-MSF train, wherein a liquid pump (recycle brine) aids in making the number of stages extricable from the PR, thereby extending the number of stages well above the PR. However, recycle brine did not drastically affect the structural simplicity of MSF, but a TVC adds more complexity to the already complex structure of MED. What Mark Twain meant by his passage is that that although history does not literally repeat itself, in the sense that exactly the same things happen over and over again, it does have recurring themes ("rhymes") which we ignore at our own peril. Here, the "rhymes" alternate from entirely governing the PR by the number of effects for 72 years or so (e.g., a MED train), expanding the number of stages beyond the PR for 60 years so far (a RB-MSF train), and now the beginning of reducing the number of effects below the PR (a TVC-MED train).

However, since a TVC-MED train is operated at a top brine temperature of 65° C., 0.3-0.2 bar, and at a fixed ETD per effect, seawater feed stream needs to be pre-heated up to the temperature of each effect before evaporation is possible. Pre-heating of seawater feed stream begins with two liquid-liquid heat exchangers through exchanging heat with final reject brine and distillate streams, then in a HRC, and thereafter in a series of pre-heaters. The heat transfer surfaces of such various conventional exchangers are considerable, their overall heat transfer coefficients are lower than the enhanced type in each effect, and they are very susceptible to scaling. It is also important to realize that these liquid-liquid heat exchangers, which recover heat from the final reject brine and distillate streams to pre-heat seawater feed stream, are quite useless in terms of irreversibility. The key fact is that vapor must be condensed, yet these exchangers only pre-heat seawater, thereby not only the portion of cooling seawater to the HRC must be increased, and with it the heat transfer surfaces of the HRC and these heat exchangers must increase, but this also increases the portion of cooling seawater that must be rejected back to the sea at higher temperatures. The need of an extensive length (e.g., 18,750 miles of tubes' length) of various heat transfer surfaces (conventional and enhanced types) is one of the basic reasons why a TVC-MED train reveals so much less than may have been thought at the first impression; achieving a higher PR with a lower number of effects, thereby reducing the capital cost.

A TVC in a TVC-MED train may be driven by mainly L.P. steam or solely M.P. steam. The TVC-MED train using mainly L.P. steam and solely M.P. steam are compared with the RB-MSF train (FIG. 5) in terms of total energy requirements in Table 5. For a demonstration purpose, all trains are compared at the same GOR (9.5), which is the actual GOR of the RB-MSF train as shown in FIG. 5 and analyzed in Tables 2-4. The actual thermal energy requirement to feed the BH of the RB-MSF is 35,687.3 kW and the rest (8,881.5 kW) is wasted in SLV and DSH, wherein about 59% of M.P. steam is also destroyed in the DSH of the BH, and only 41% is used in the E/C. The work energy for the recycle brine pump at 65% efficiency is 8,331.7 kW, which is slightly less than the essentially wasted thermal energy. Thus, the intrinsic total energy requirement for the RB-MSF would be about 48,040 kW, which is albeit lower than the total energy requirement of a TVC-MED train using mainly L.P. steam, but much lower than a TVC-MED train using solely by M.P. steam. On the other hand, the entire thermal energy input for the TVC-MED train whether using mainly L.P. steam or solely M.P. steam is a requirement to operate the TVC, thereby it adds to power consumption since it is unavoidable bled steam from a power generation cycle. The needed amount of M.P. steam in such MED trains for ejectors is double that in the RB-MSF train since the effects are operated at low pressures (from 0.3 to 0.2 bar). By embarking on a quite wasteful piecemeal, wherein L.P. steam is available at higher temperature and pressure conditions than is required in a BH of a RB-MSF train but a significant portion of the specific energy of this L.P. steam along with M.P. steam is destroyed in SLV and DSH, which, in turn, diminishes the economy of the RB-MSF train, a TVC-MED train taking advantage of such quite wasteful conditions is mistakenly considered an advantage. In addition, only when the TVC-MED train is driven by my M.P. steam would reduce the number of effects below its GOR (2 groups of effects×4 effects per a group) but not when it's driven by L.P. steam (2 groups effects×6 effects per a group) as shown in Table 5. If all of these trains were equally compared at a higher GOR (e.g., 11.2), wherein a TVC-MED train is proposed for such a purpose, a RB-MSF train, including its wasteful thermal energy, would consume less energy than a TVC-MED train whether the TVC requires mainly L.P. steam or solely M.P. steam.

A RO plant cannot make use of exhausted steam from a power generation cycle, but it only adds to power consumption. For this reason alone, it may be used to a limited extend, but also for other reasons including the perceived extensive seawater pre-treatment (e.g., compared to MSF), the limitation of seawater osmotic pressure (in addition to scale issues) that prohibit higher recovery ratios, and concerns about an unacceptable level of boron and higher levels of TDS in product streams, RO in its current standing may not be employed to an extent commensurate with water demands as evidently the case in Kuwait.

Yet, Table 5 demonstrates effectively and inevitably that neither the liquid pump (recycle brine) in a RB-MSF train to expand the number of stages above the assumed PR, nor a heat pump (TVC) in a TVC-MED train to reduce the number of effects below the assumed PR are advantageous in terms of energy consumption. For a given number of effects in a TVC-MED train in a feed forward mode or a parallel feed mode, an improvement in heat transfer coefficients may improve the capital cost (if any) under a given set of conditions, but would not improve energy consumption, whereas for a given number of stages in MSF, an improvement in heat transfer coefficients would improve capital cost and energy consumption. If a MED train could be aided by a TVC and a low ETD, they could also aid a MSF train with a greater benefit to its PR. However, none of these improvements will truly achieve their intended purpose unless the "big foot" of all desalination methods is intrinsically solved; that is the scale issues.

However, the traditional clinging to solve scale issues by a desalination method have blurred the essentially simple message; the true impact of scale issues must be considered a priori, and to this end, efforts to truly solve them should be directed with greater discernment. Nanofiltration (NF) was marketed in 1976, as a softening method to treat hard but otherwise potable water from water wells. In the 1980s, NF was applied to selectively remove sulfate from seawater for oil-field's seawater injection operations. Here, the removal of alkaline cations (magnesium and calcium) from seawater is not essential (it may a disadvantage in some oil wells), but the removal of sulfate from seawater is a must since downhole formation water is rich with sparingly soluble alkaline cations (strontium, barium, radium, and NORM), since once they pair with sulfate cause severe scale or radioactive scale plugging in wells. In seawater desalination, the removal of alkaline cations, sulfate and carbonates are essential, especially in thermal desalination.

At the normal pH of seawater, negatively charged NF membranes allow most monovalent ions (sodium, potassium and chloride) to pass through, partially reject monovalent bicarbonate and divalent cations (magnesium and calcium), and highly reject the divalent sulfate. In order to maintain neutrality, for every rejected anion, a cation must be rejected. But the observed ions rejection generally decreases with increasing the recovery ratio (RR) due to significant ions build-up at the membrane surface (the concentration polarization phenomenon), wherein far more cations are available to shield the negatively charged membrane surface, making it easier for divalent cations, but more easier for monovalent anions (e.g., bicarbonate), to pass through the membrane. Thus, NF membranes are made as a tradeoff between a lower rejection of bicarbonate and divalent cations (especially calcium) and high rejection of sulfate, or vice versa, in order to avoid sulfate scale at the membrane surface and mitigate carbonate scale within the pre-treatment.

The inventor has tested seawater (Table 1, the natural composition of seawater) using NF without any pre-treatment for bicarbonate and within the practical RR of NF. RR is the ratio of the product stream flow rate to the feed stream flow rate. FIGS. 17A and 17B show the concentrations of magnesium, calcium, bicarbonate and sulfate, respectively, in the NF product stream and reject stream. As shown in FIG. 17A, the concentrations of magnesium, calcium and bicarbonate in the NF product stream at the highest permissible RR (0.75) are, respectively, about 658 mg/L, 329 mg/L and 89 mg/L. At the lowest RR (0.05), wherein NF would be practically of useless utility, the concentrations of magnesium, calcium and bicarbonate in the product stream are about, respectively, 275 mg/L, 175 mg/L and 42 mg/L. As can be seen, NF at the extreme ends of RR and anywhere in between would not resolve alkaline scale issues (e.g., FIG. 6) when its product stream is used to feed a thermally-driven desalination method at higher temperatures. The concentrations of sulfate, magnesium, calcium and bicarbonate in the NF reject stream at 0.75 RR are, respectively, about 12,200 mg/L, 4,144 mg/L, 1,134 mg/L and 295 mg/L. This extremely sulfate infested NF reject stream is typically discharged back to a sea. NF is far more susceptible to scale issues and not a zero-liquid discharge (ZLD) but, too, a feed stream splitter like any desalination method; wherein ions in the feed stream, to a varying degree depending on the nature and operating conditions of the method, are reduced in a product stream but elevated in a reject stream. Attempts to solve scale issues in the desalination field by another partial desalination method (NF and the like) may emanate from a commercial incentive rather than an end user's prospective.

However, NF has been combined with: (1) an independent MSF train, wherein NF is presumably operated at the highest RR and the NF product stream is fed the MSF train; (2) an independent MSF train, wherein NF is presumably operated at lower RR and the product stream is mixed with seawater or recycle brine from the MSF train and the mixed stream is fed to the MSF train; and (3) an independent MSF-MED train, wherein NF is presumably operated at lower RR and the product stream is mixed with seawater, and the mixed stream is fed to the train. Here, if a desalination plant comprises eight independent MSF or MED trains, for example, then eight NF systems must be added to the desalination plant (a NF system per a train).

A lower RR means high capital cost and high seawater feed whereas a higher RR means high operating cost and highly sulfate-infested reject stream. A NF system nearly costs as much as a RO system, and both are high pressure membranes. At any RR, whether it's low or high, a NF system (similar to a RO system) requires extensive seawater pre-treatment comprising multi-media filtration, microfiltration/ultra filtration or coagulation/flocculation, scale inhibition, oxygen scavenging/de-chlorination, and de-aeration. If a NF product stream was re-concentrated by mixing with seawater or recycle brine from a MSF train and then fed to the train, it would defeat the purpose of adding NF since the mixed (re-concentrated) product stream would be far more inferior to the actual NF product stream. It is like sleeping under an expensive but a too-short blanket; thereby, along this line of thinking, it may be more comfortable to yank and pull the blanket, if the blanket was a RO system, instead of a NF system, wherein at least RO produces potable water, and then divert a portion of the RO product stream for mixing with seawater or recycle brine to feed a MSF train; or for that matter just divert a portion of a distillate stream from a MSF or MED train for mixing with seawater or recycle brine and re-feed the mixture to the train. It is therefore not surprising in the face of such tantalizing schemes to claim in an invention that NF can be operated at a pressure in the order of 80 bar, when the NF maximum possible pressure is about 41 bar, and yet this fact was also stated in the same invention.

The dilemma throughout the history of the desalination field, wherein its ascendancy rests squarely on scale issues, is that by ignoring these issues, the solution of one problem has, in turn, created several new ones. FIG. 18 captures this dilemma. By preconceiving the illusion of the "impossible" (scale issues are not solvable), the desalination field has been dramatically limiting the "possible" (scale issues are inevitable, thereby tolerable or solvable within desalination methods themselves), wherein all solutions begin and end in a locked in circle within this perceived "possible", thereby failing to see the distorted perception of the "impossible". When the preconceived "impossible" and perceived "possible" are bordered, however improbable, the perceived "possible" becomes the specialized thinking, whereby it becomes more difficult to deviate from it, nor to generate creative ideas within it, nor even obvious ones. It is like brushing a tooth, but brushing this tooth means losing the rest (as demonstrated in FIG. 18), yet protecting the surface of this tooth does not extend to its hidden roots (the scale issues).

The facts do not support this mode of thinking, because scale issues cannot be solved by desalination methods alone, nor desalination methods can be a fortiori pretend to scale issues. These facts are inescapable because resources are exhaustible, thereby they should be effectively conserved and sparingly used. As such, the inventor believes that roughly about 50-70% of future water demands in Kuwait, for example, may be obtained from existing MSF plants, or may be by properly re-configurating the new MED plant(s) with the aid of a true de-scaling method.

The solution, rather, must be to deploy investments more effectively; that is, more strategically in terms of capital cost and more efficiently in terms of operating cost and environment constraints. It is of lesser importance how much artificially to spend less on capital cost than how much actually to spend on operating cost and environmental issues in the long haul. There is no substitute for thinking along these connections.

The Objectives of the Invention

The objectives of this invention are to provide effective desalination methods and systems with the aid of inventive de-scaling methods, wherein such methods and systems are aimed at: (1) eliminating the use of scale inhibitors, thereby lifting the imposed restriction on top brine temperatures; (2) eliminating recycle brine, thereby requiring much less pumping power and less cooling seawater; (3) producing more distillate while reducing steam consumption as well as reject brine; (4) producing de-scaled reject brine to be readily utilized in other applications; (5) eliminating reject cooling seawater, thereby reducing seawater usage and pumping power requirements; (6) improving de-gassing, thereby rigorous venting and lessening M.P. steam requirements for ejectors; and (7) protecting the marine environment and marine inhabitants.

BRIEF SUMMARY OF THE INVENTION

Embodiments of this invention are generally and very briefly summarized in FIG. 19. Further objects, novel features, and advantages of this invention will be apparent to those skilled in the art upon examining the accompanying drawings and upon reading the following description of the preferred embodiments, or may be learned by practice of the invention.

DESCRIPTION OF THE PREFERRED EMBODIMENT

Figure 1:
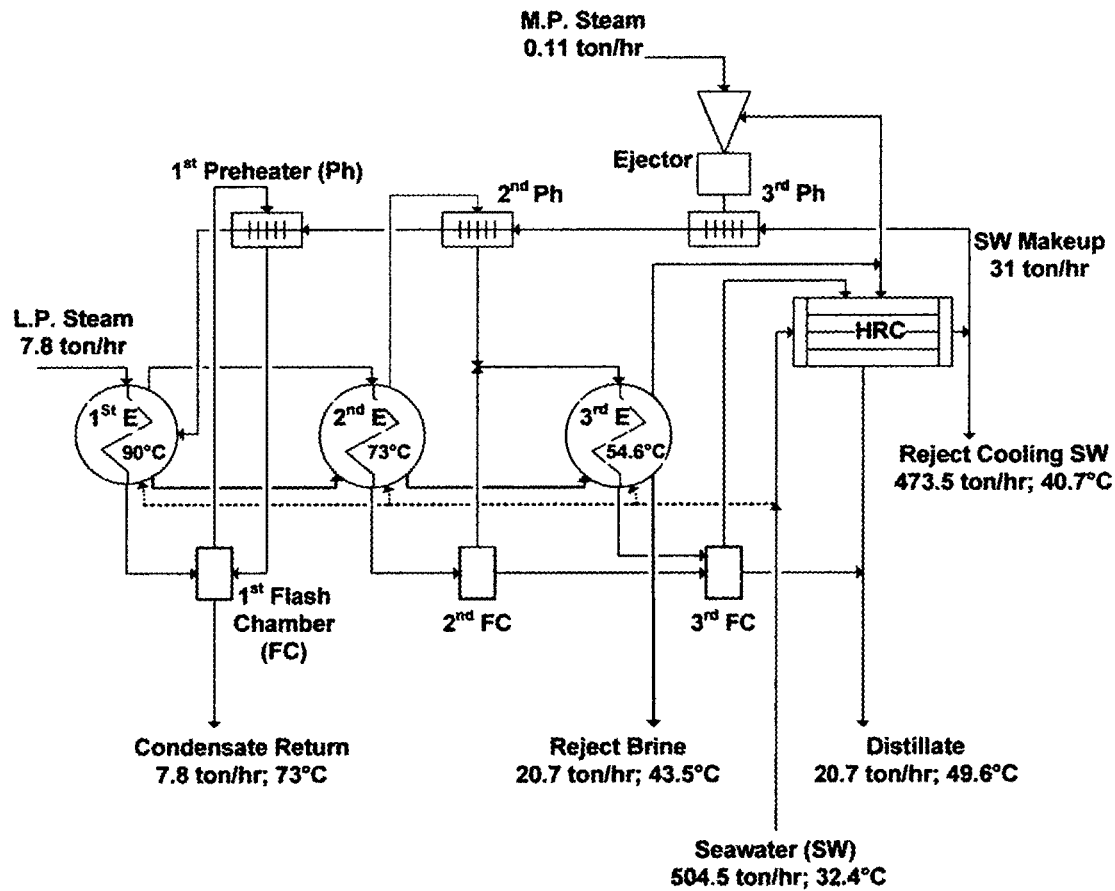
FIG. 1 illustrates a configuration for a triple-effect MED train.
Figure 2:
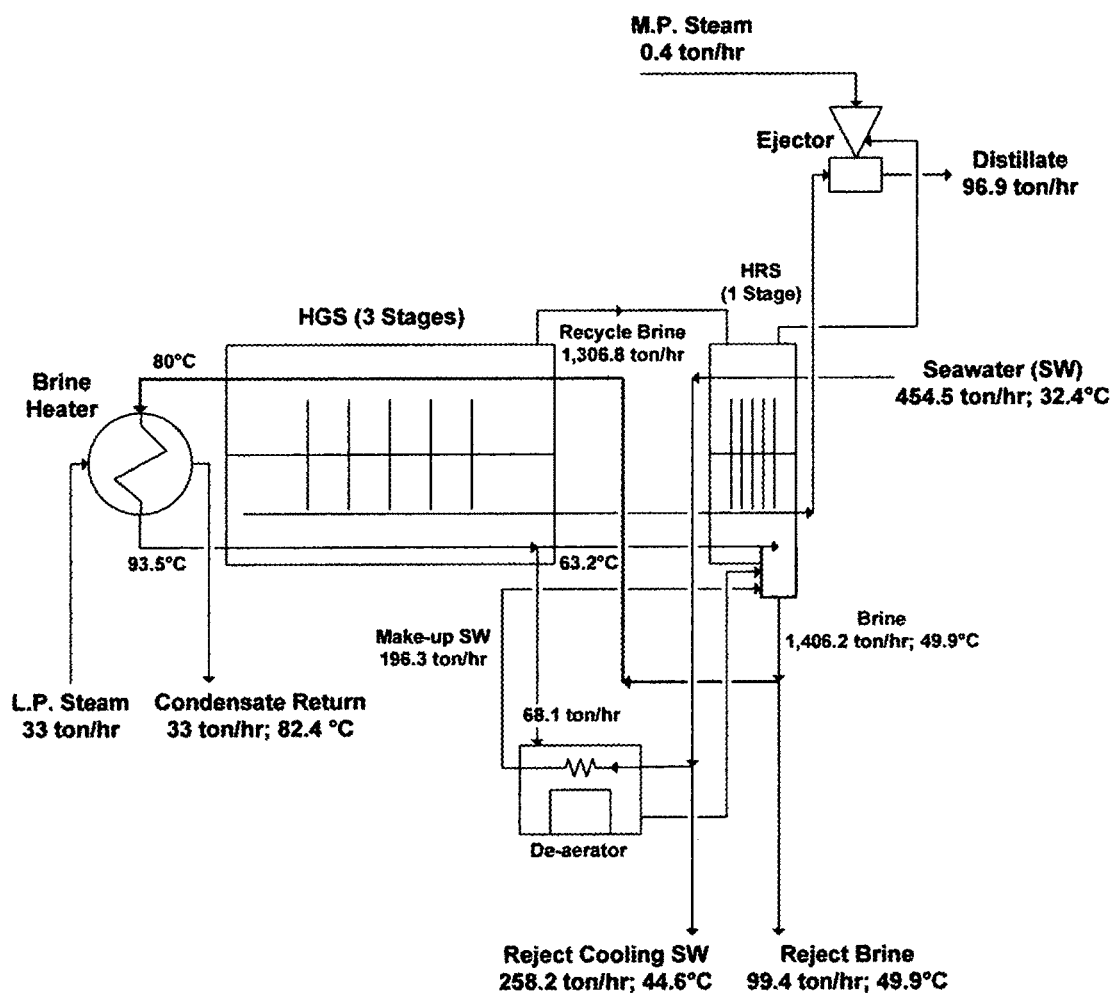
FIG. 2 illustrates a configuration for a RB-MSF desalination train.
Figure 3:
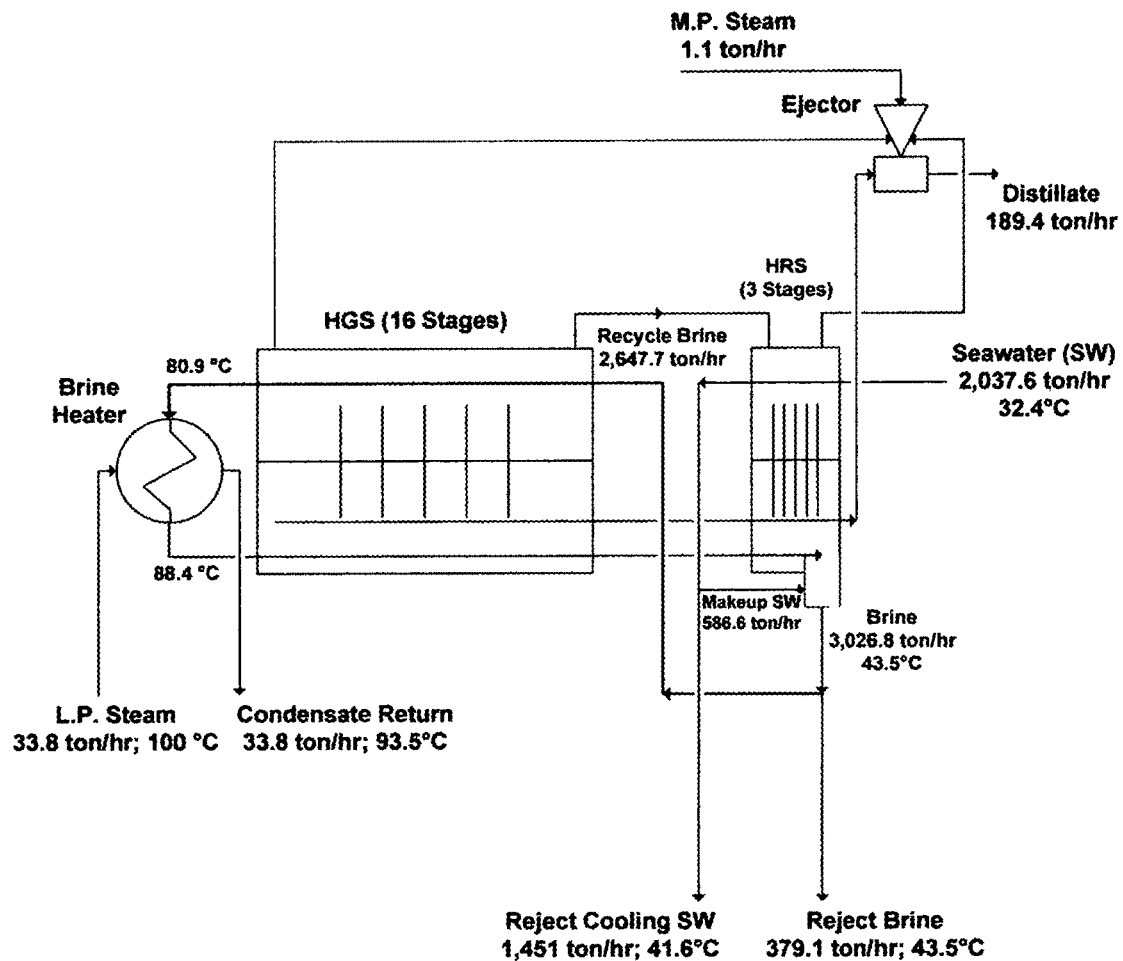
FIG. 3 illustrates another configuration for a RB-MSF desalination train.
Figure 4:
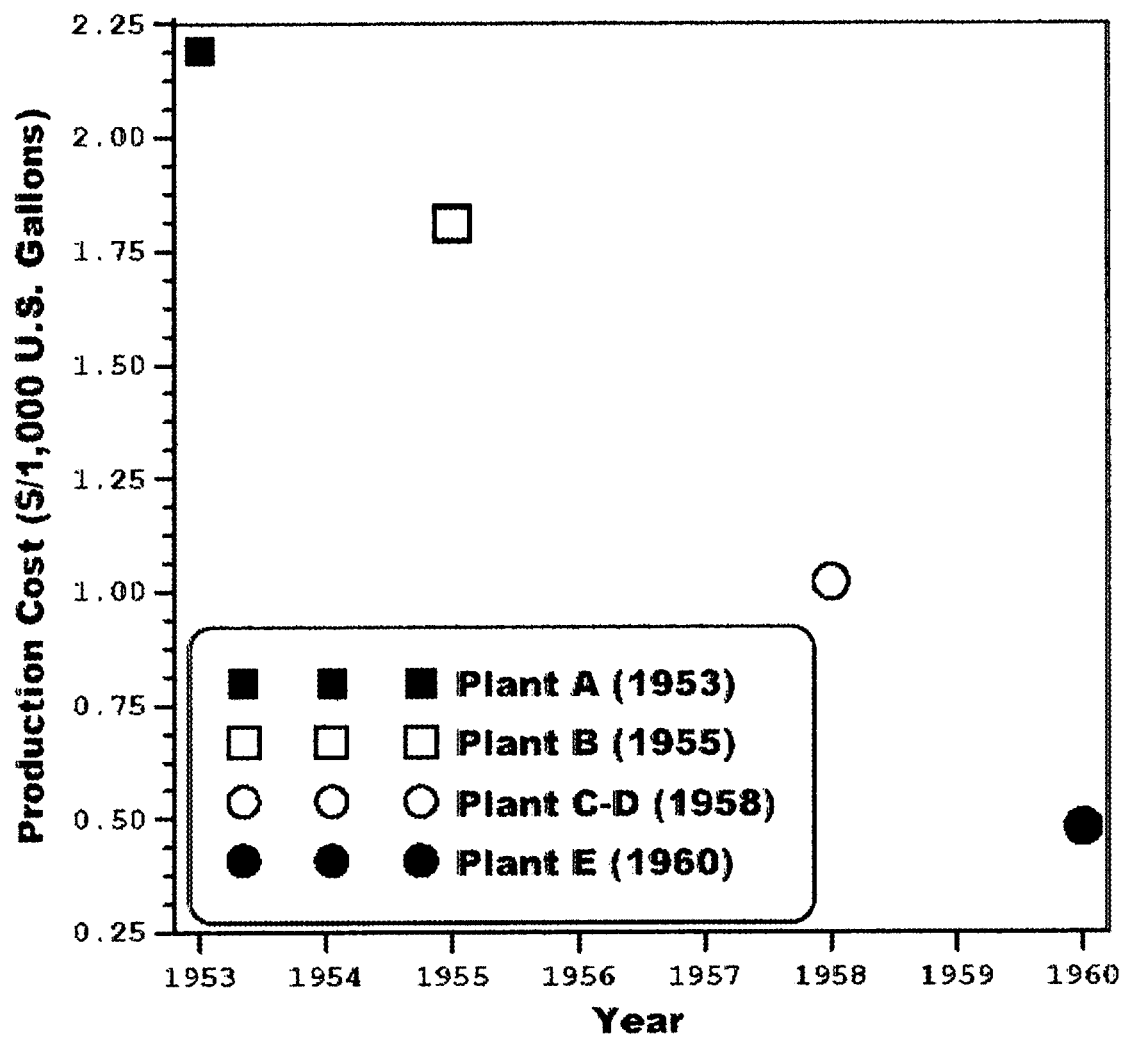
FIG. 4 illustrates the reduction in distillate cost between 1953 and 1960.

The Mixed Brine Forward (MBF) Desalination Concept

The point is clear; the dilemma in the desalination field, as described hereinabove, is manifested in disadvantageously operating multiple independent MSF trains in a desalination plant (system) as well as multiple independent MED trains in a desalination plant. The dilemma may also extend to disadvantageously impractical combining of MED-MED concept in an independent train, or combining MSF-MED concepts in an independent train.

The multi-effect concept has been known in commodity industries (e.g., sugar) long before it became adopted by the desalination field in 1884. In such industries, the product is much more valuable than distillate, the size of a train is relatively small, and the number of effects in the train is very limited; thereby the most thermodynamically regenerative approach to concentrate a feed stream is applied. The regenerative approach is based on a backward feed mode, wherein a feed stream flows to the lowest temperature effect, and after partial evaporation, its concentrate cascades as a feed to each higher temperature effect in turn; thereby the energy extracted to heat the feed is only slightly warmer than the feed it is heating. Neither external feed pre-heaters nor flashing chambers are required; only one form of heat transfer surface is required, and the required thermal energy is provided by increasing the heat transfer surface in each effect. Vapor is produced in this backward feed by true boiling; thereby it may be called multi-effect boiling (MEB). The structural simplicity of this MEB is comparable to, if not better than, the structural simplicity of MSF, despite the difference in their feeding mode and despite the fact this backward fed multi-effect has been known long before MSF, but the point to be emphasized here is that simplicity is the key reason for the dominance of MSF since 1960.

However, seawater desalination would be impossible in a multi-effect train with this backward feed mode since it has the obvious disadvantages of conducting brine evaporation at the highest TDS level and the highest temperature thereby results in the highest scaling issues, and yet, rejecting brine from the train at the highest temperature thereby results in the highest wasteful thermal energy. The first disadvantage requires true de-scaling, not just adding a scale inhibitor and limiting a top brine temperature; whereas the second disadvantage requires useful thermal recovery, not just using a liquid-liquid heat exchanger to pre-heat a feed stream. Along these conventional lines of thinking (limiting a top brine temperature, and using a scale inhibitor and a liquid-liquid heat exchanger), attempts may be made and re-made, discarded and re-discarded.

A specific attempt, for example, was made to presumably solve the second disadvantage, wherein brine is rejected from the highest temperature effect of a backward fed multi-effect by grouping backward fed effects with forward fed effects in a train, whereby the heat of the high temperature reject brine from the first effect of the group of backward fed effects was exchanged with a seawater feed stream in a liquid-liquid heat exchanger to heat seawater and degrade the temperature of this reject brine before it was fed to the first effect of the group of forward fed effects (e.g., British Patent No. GB 1,174,423). To solve the main disadvantage, wherein brine is rejected at the highest TDS level resulting in the highest scale issues, the thermally degraded reject brine by the liquid-liquid heat exchanger was then mixed with a seawater feed stream to reduce its TDS level, thereby reducing its scaling tendency, before it is fed to the first effect of the group of forward fed effects (e.g., British Patent No. GB 1,174,423).

Figure 6:
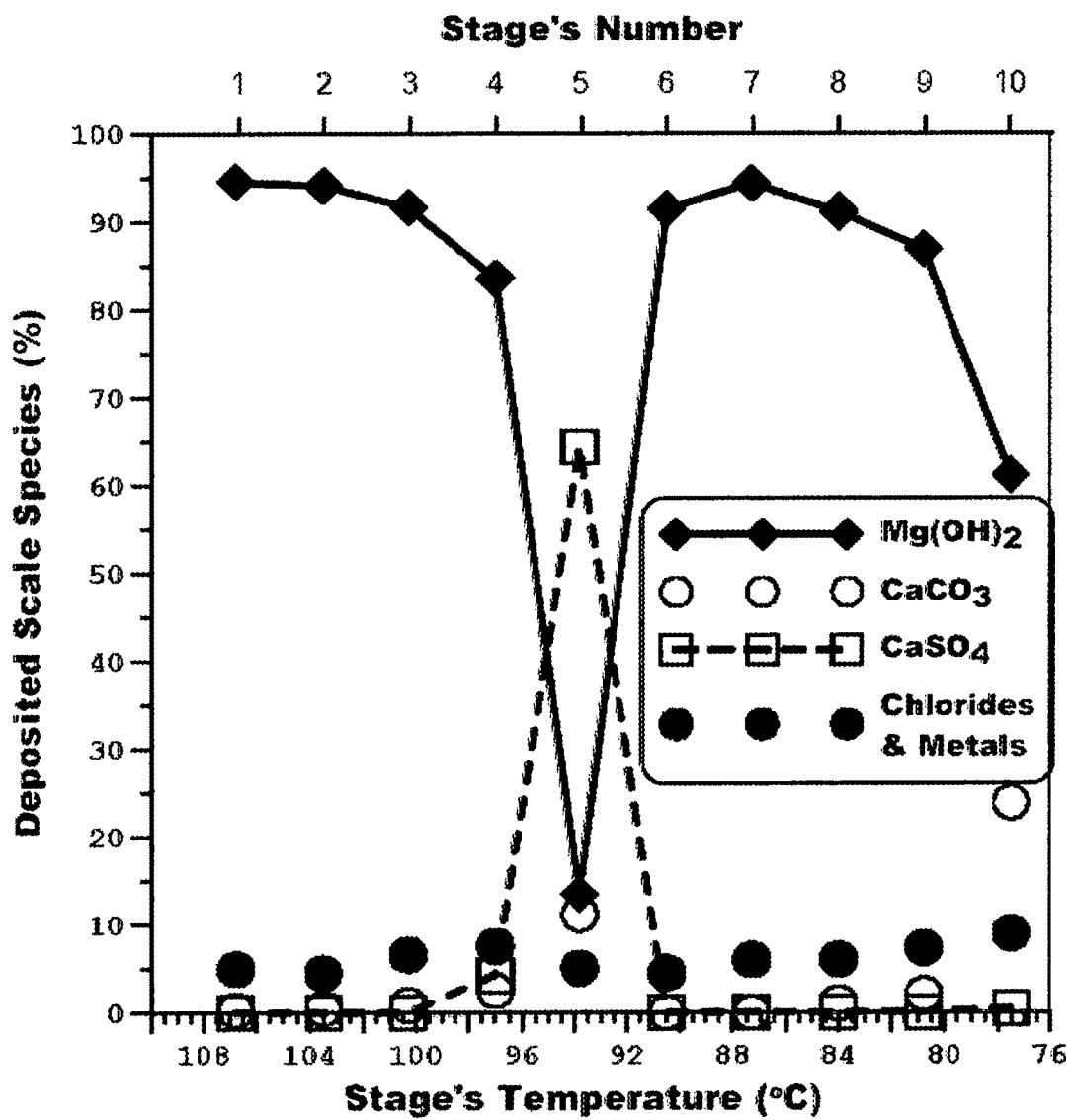
FIG. 6 illustrates scale depositions in front-end stages of a RB-MSF train.
Figure 7:
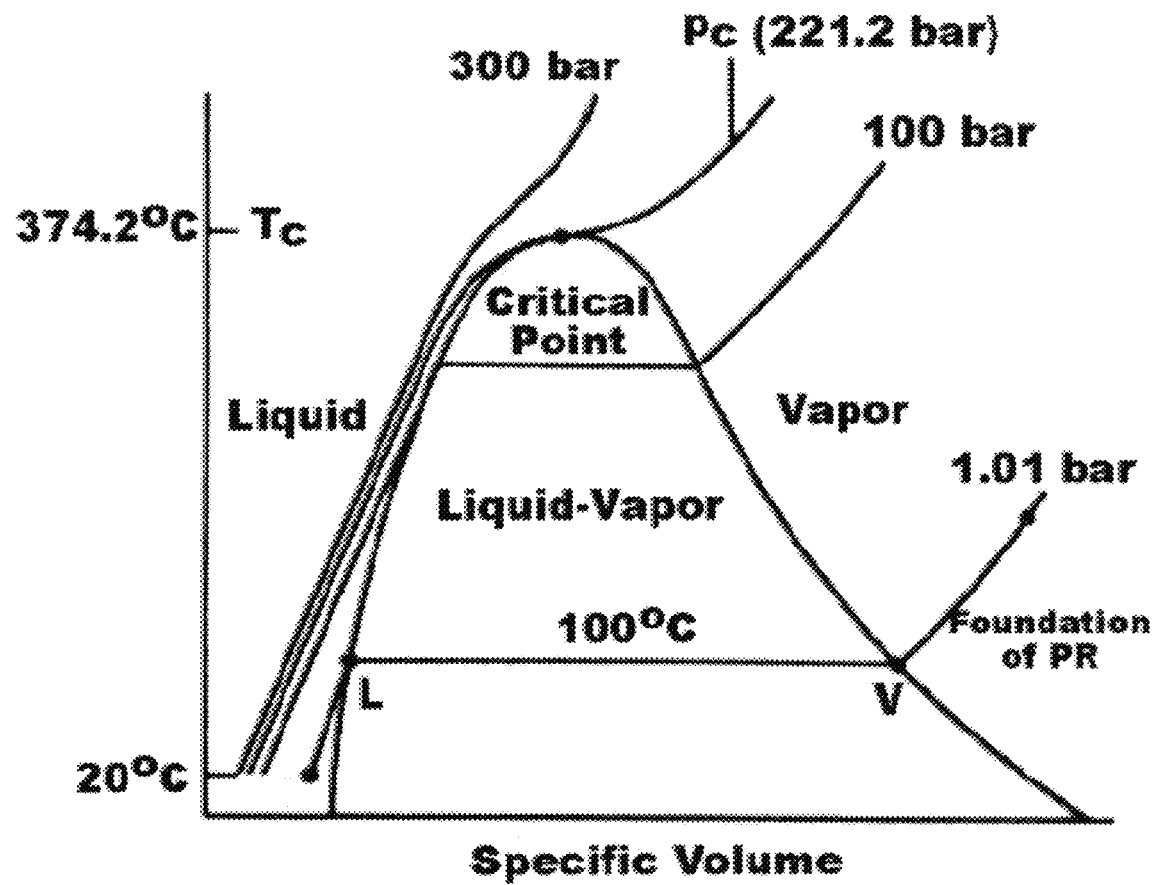
FIG. 7 illustrates the temperature-specific volume water phase diagram.
Figure 8:
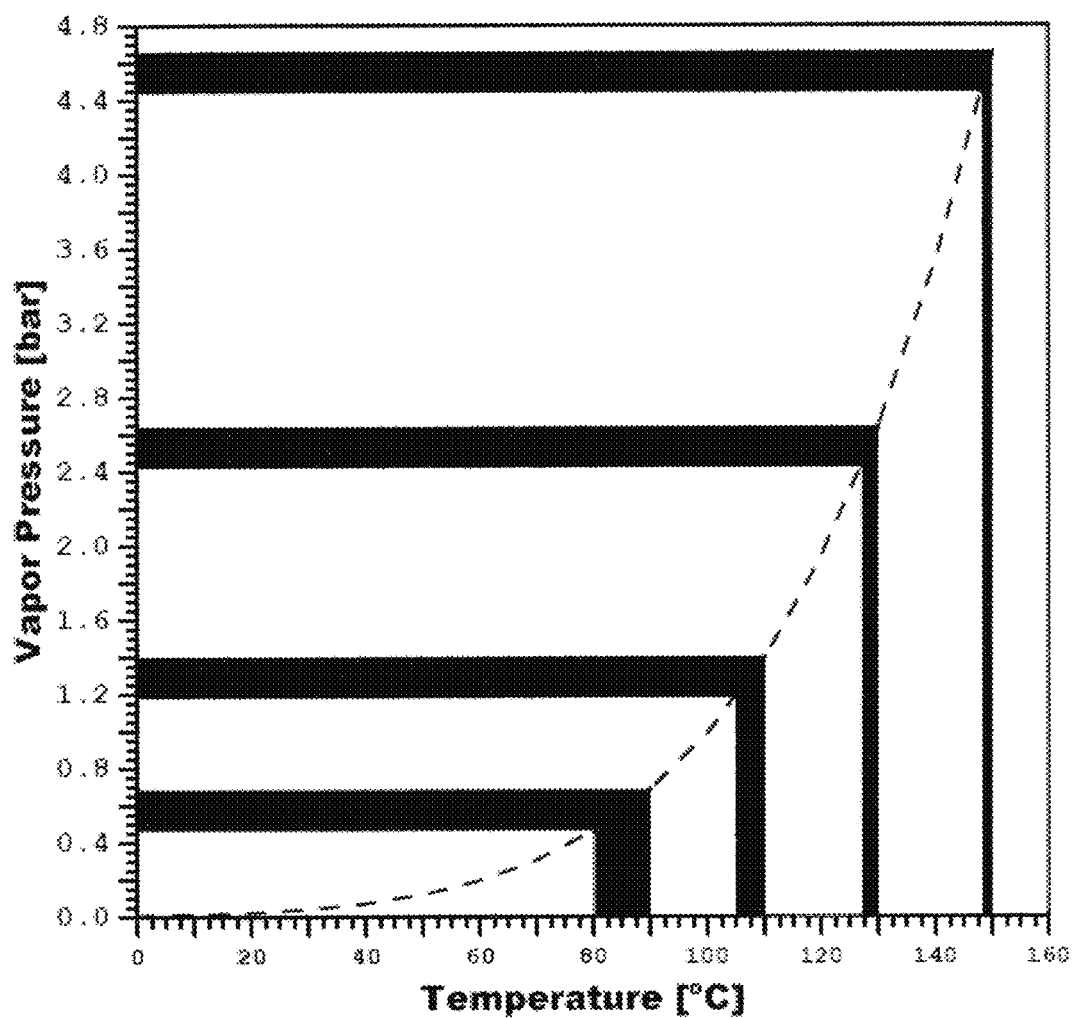
FIG. 8 illustrates the water vapor pressure-temperature gradient diagram.
Figure 9:
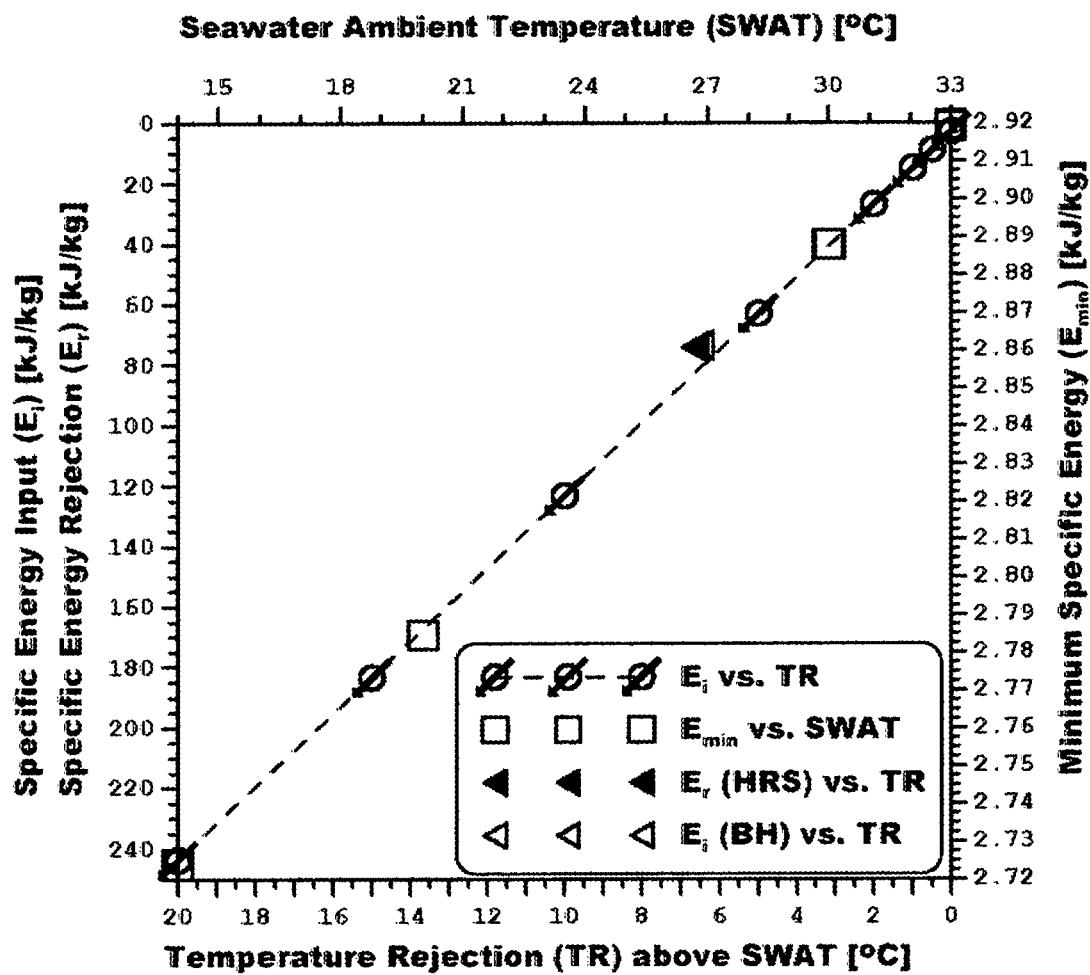
FIG. 9 illustrates the minimum specific energy at different SWAT and the specific energy rejection of a RB-MSF train at 33° C. of SWAT.
Figure 16:
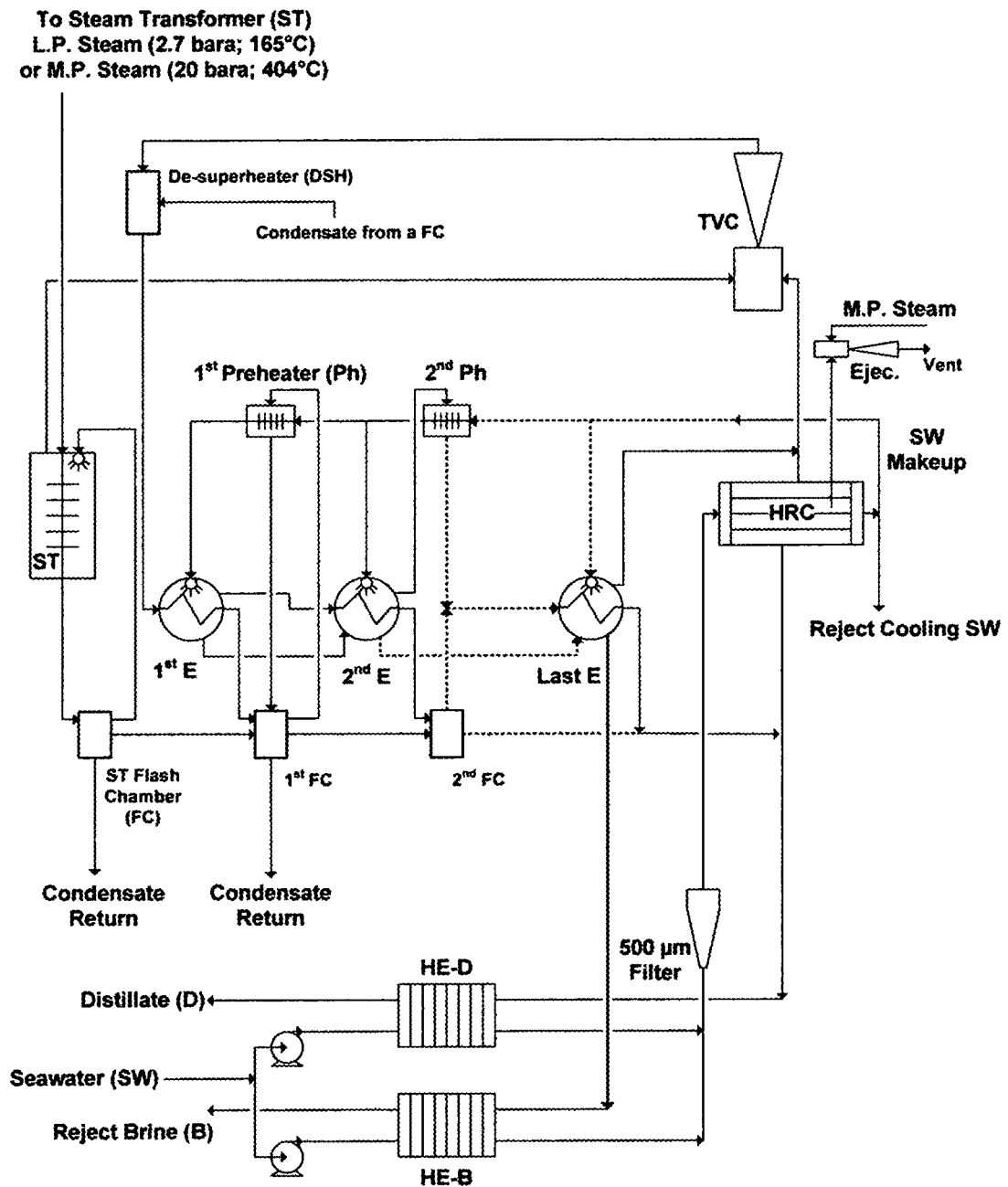
FIG. 16 illustrates a generic configuration of a TVC type MED train.
Figure 17A:
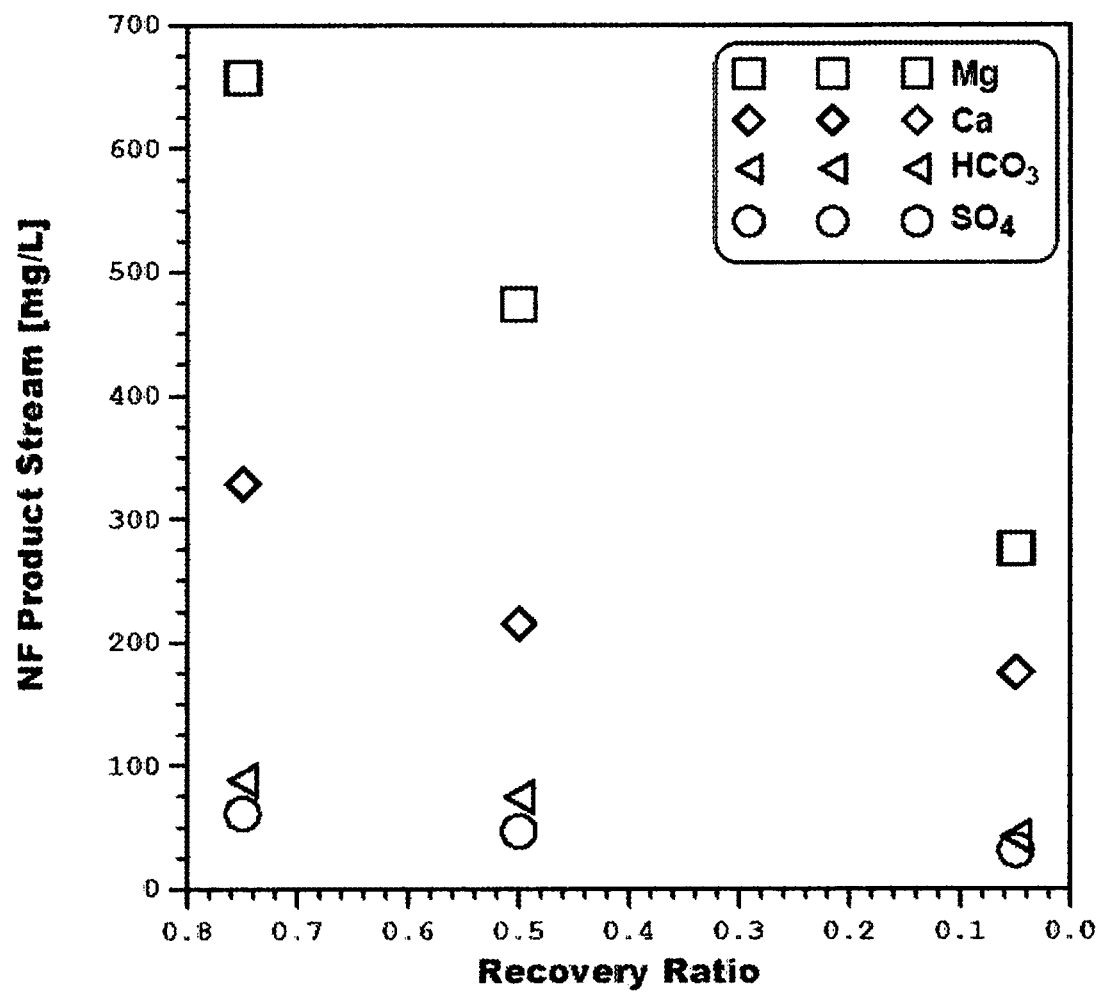
FIG. 17A illustrates some ions concentration in a NF product stream.
Figure 17B:
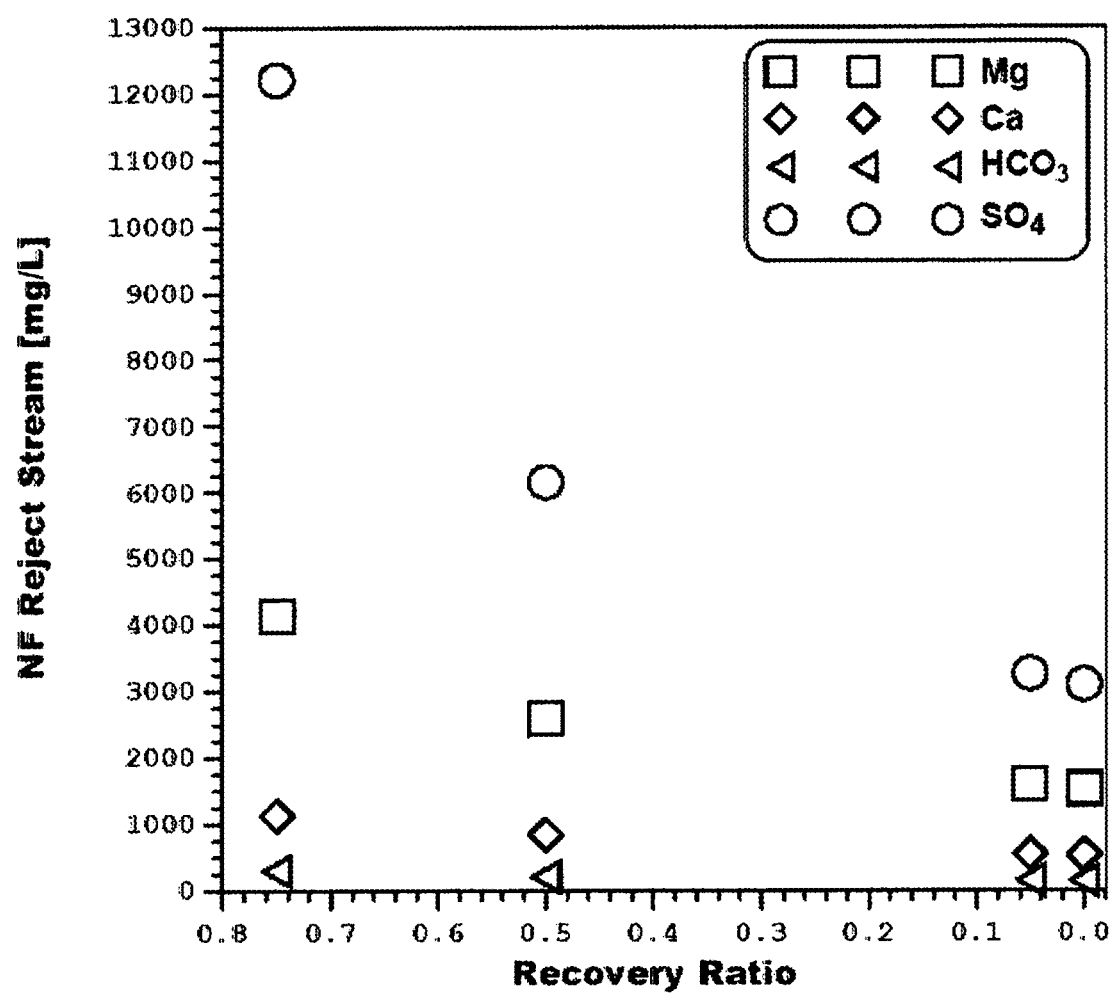
FIG. 17B illustrates some ions concentration in a NF reject stream.
Figure 18:
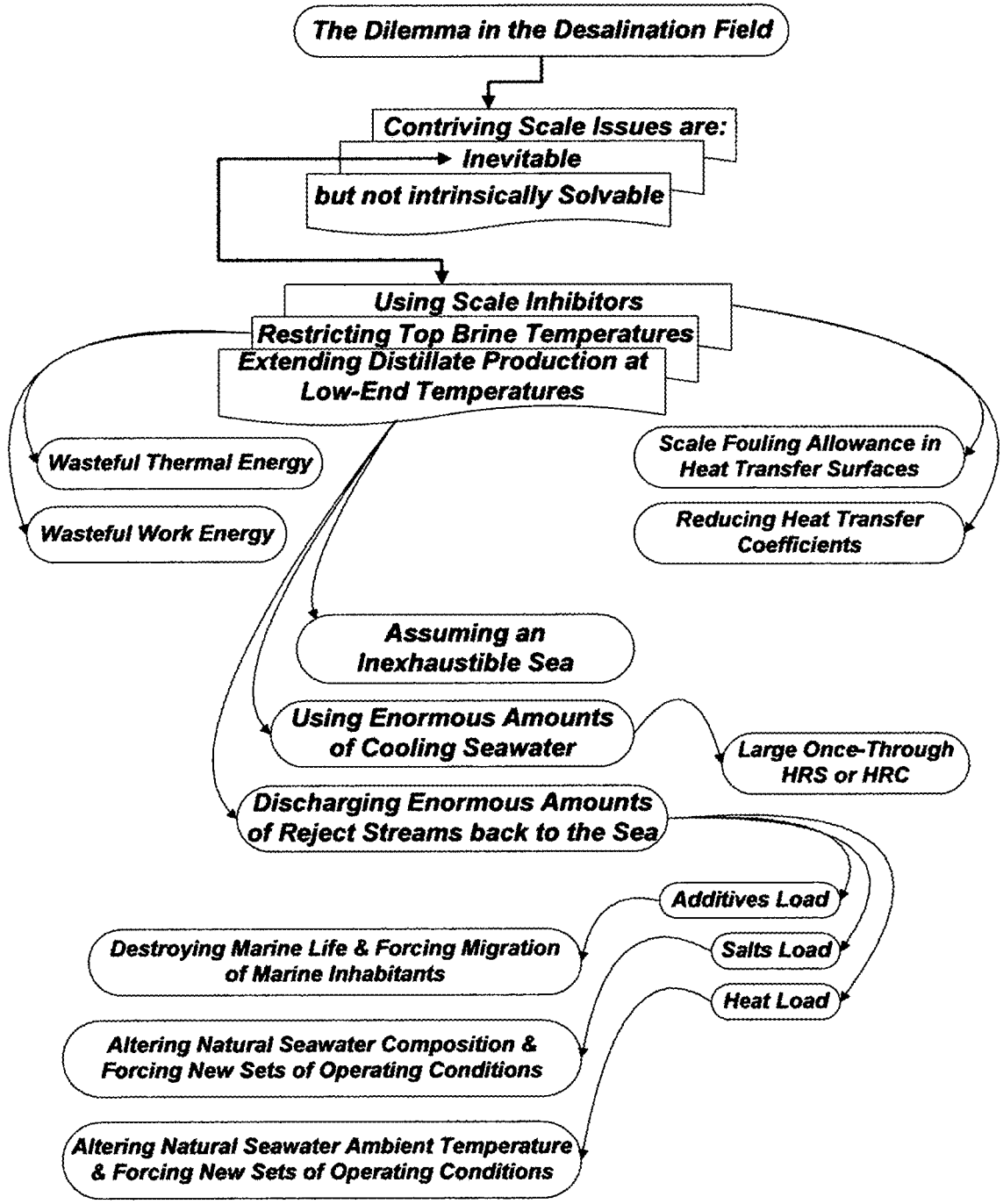
FIG. 18 illustrates the dilemma in the desalination field.
Figure 19:
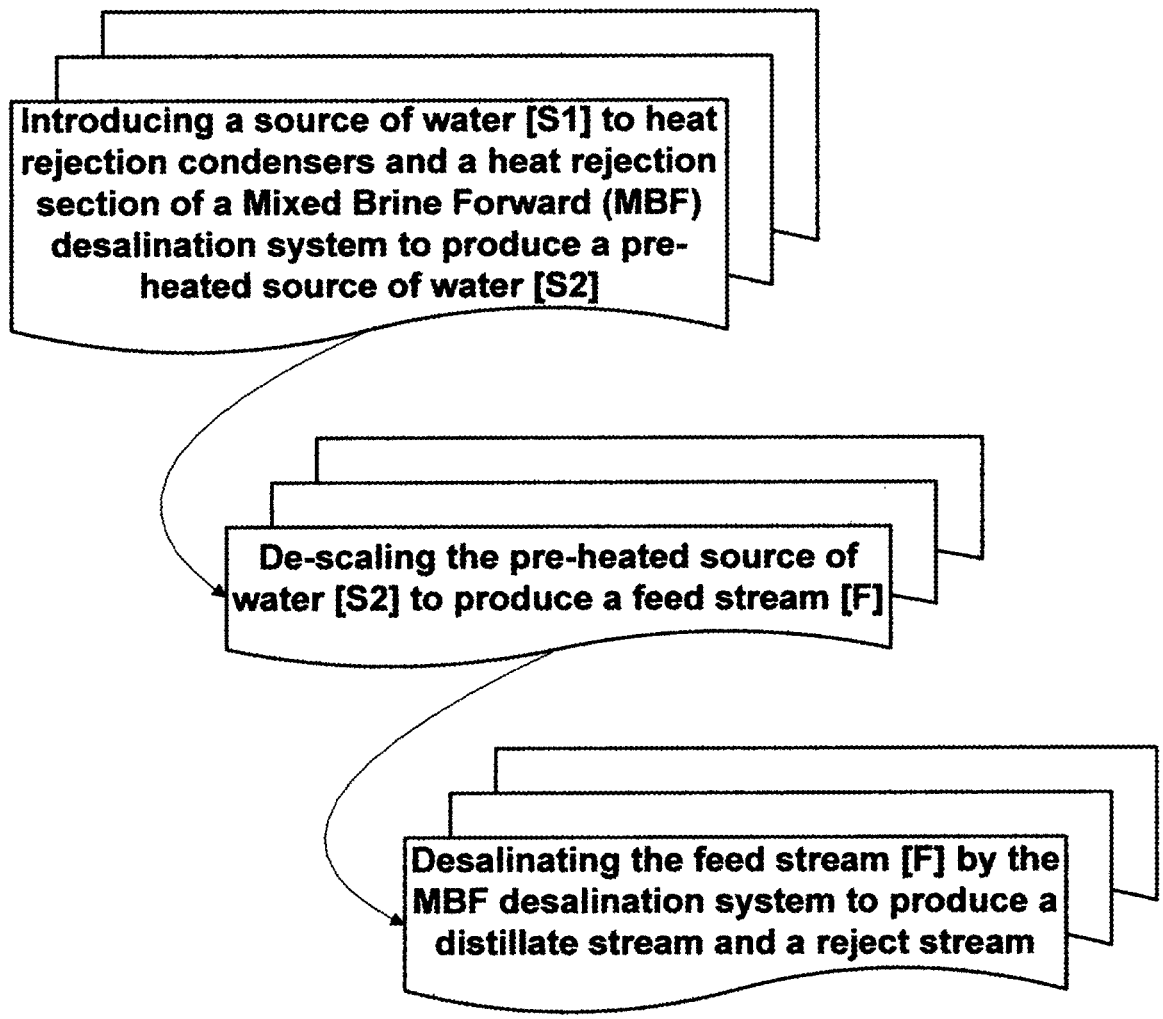
FIG. 19 illustrates a general chart to some embodiments of the invention.

If the use of a liquid-liquid heat exchanger was hypothetically ignored, thereby directly concentrating reject brine at the highest temperature and TDS level from the first effect of the group of backward fed effects by a group of forward fed effects in a train, even when the top brine temperatures in the first effect of each group were within the low actual practiced range of the multi-effect [e.g., 65° C. (FIG. 16) to 90° C. (FIG. 1)], scale issues would be total hindrances. FIG. 6 shows the severity of scale issues in flash stages of a RB-MSF train from the top brine temperature (110° C.) down to about 78° C., wherein flash stages have no evaporating surfaces (basically steel boxes with pre-heaters/condensers at the top to indirectly condense distillate and preheat recycle brine), but evaporating surfaces are the heart of the multi-effect concept whereby any slight variations due to scaling issues, especially with low ETD effects, and more especially on enhanced type heat transfer surfaces, instabilities of heat transfer rates in one effect would ripple through different effects in a train.

Scaling issues become pronounced within the heart of the multi-effect concept, neither using a scale inhibitor nor reducing a top brine temperature would resolve them; thereby any attempt to use of the backward feed mode without true de-scaling would be doomed to fail. As such, it is believed that the backward feed multi-effect has never actually been practically applied to seawater desalination for the obvious scale issues. In fact, the backward feed mode was considered an unsophisticated way of engineering the multi-effect concept for seawater desalination.

In seawater desalination, unlike commodity industries, the only valuable product is distillate thereby it must be produced as inexpensively as possible, and the impact of scale issues must at least be within tolerance. Thus, a forward feed mode is utilized, wherein seawater at its normal TDS level is evaporated at the highest temperature effect, and as brine cascades down from effect to effect, its TDS level increases but its temperature decreases. In order to mimic the regenerative nature of the backward feed mode, external pre-heaters and flash chambers (the latter may also refer to as flash boxes, flash vessels, flash pots, etc.) are added between each effect, otherwise the supplied steam to the first effect would be largely consumed in pre-heating the feed stream. Such additions, to presumably avoid the region of scale issues, in turn, increase the capital cost, make the structure of a train heterogeneous, and of course by no means resolve the scale issues. This may be called multi-effect distillation (MED) since not all produced vapor from each effect is achieved by true boiling, nor all condensed vapor by pre-heaters contributes heat to boiling, nor any flashed vapor by flash chambers gives more distillate but all flashed vapor contributes heat to the pre-heaters. This forward feed MED, which is shown in FIG. 1, was the standard from 1884 to the late 1950s. However, it was the foundation that paved the way for building MSF along similar construction lines with the same forward feed mode; but in MSF, most of the structural complexity vanishes since the evaporating surface is entirely eliminated, and vapor is entirely produced by flashing and internally condensing on feed pre-heaters, at the expense of increasing the size of the pre-heaters and the number of stages as well as pumping power for recycle brine.

MSF has also been combined with MED in a multi-effect multi-stage (MEMS) independent train, wherein the train is essentially broken down into a group of flash stages, and each group has its own recycle brine and operates as one effect (e.g., U.S. Pat. Nos. 3,489,652; and 3,595,757). However, MEMS entails a far more complex structure, intricate operation, and excessive number of pumps and pumping power requirements.

Alternatively, this invention is built on the ground of less structural complexity with the objectives of eliminating the use of scale inhibitors thereby lifting the imposed restriction on top brine temperatures; eliminating recycle brine thereby drastically reducing pumping power requirements; producing more amounts of distillate at less consumption of steam; rejecting less amounts of brine whereby the reject brine is readily usable in other applications; eliminating reject cooling seawater from a heat rejection section and heat rejection condensers thereby effectively lessening amounts of seawater feed and utilizing less pumping power; improving de-aeration thereby lessening consumption of M.P. steam to ejectors; and safe guarding the marine environment and marine inhabitants. What I have coined the Mixed Brine Forward (MBF) desalination concept, in conjunction with effective de-scaling methods, is therefore conceived.

In one embodiment, the inventive MBF desalination system comprises a plurality of trains arranges in series; in which the trains alternate between a backward fed multi-effect (BME) train and a MSF train; wherein the first train in the MBF desalination system is a BME train and the last train in the MBF desalination system is a MSF train. Each of the BME trains in the MBF desalination system comprises a steam supply, a number of effects, and a heat rejection condenser; wherein each of the effects in the BME trains comprises spray nozzles and spray film evaporating tubes. Each of the MSF trains in the MBF desalination system comprises a steam supply, a brine heater and a heat gain section except the MSF last train, wherein the MSF last train comprises a steam supply, a brine heater, a heat gain section and a heat rejection section. Each of the trains in the MBF desalination system produces a final distillate stream and a final brine stream; wherein the final brine stream from each of the trains is discharged at a pre-selected temperature and a total dissolved solids (TDS) level. A source of water is passed through each of the heat rejection condensers of the BME trains, and the heat rejection section of the MSF last train; wherein the source of water is pre-heated in each of the heat rejection condensers of the BME trains, and the heat rejection section of the MSF last train to produce a pre-heated source of water. The pre-heated source of water is fed to the de-scaling step (as described below in the next section of this invention) to produce a feed stream. A portion of the feed stream is fed to the last effect of the BME first train; wherein the BME first train is the only BME train in the MBF desalination system in which it is fed with the a portion of the feed stream; wherein the last effect of the BME first train is operated at the lowest temperature; wherein its portion of the feed stream is progressively heated and concentrated in each of the effects of the BME first train (from the last effect to the first effect); thereby producing a first train final distillate stream and a first train final brine stream; wherein the first train final brine stream is discharged from the first effect of the BME first train at the highest temperature and TDS level. Another portion of the feed stream is fed to the last stage of the MSF second train of the MBF desalination system; wherein the MSF second train comprises only a heat gain section; wherein its portion of the feed stream is heated in the heat gain section, and exited the first flash stage of the heat gain section at a temperature, about the temperature of the final brine stream, from the first effect of the BME first train; wherein the heated portion of the feed stream from the heat gain section of the MSF second train is mixed with the first train final brine stream from the first effect of the BME first train to form a mixed brine stream; wherein the mixed brine stream is further heated in the brine heater of the MSF second train to form a heated mixed brine stream; wherein the heated mixed brine stream flows to the first flash stage of the heat gain section of the MSF second train; wherein each of the flash stages is operated at successively lower temperatures and pressures in going down each of the flash stages in the MSF second train (from the first flash stage to the last flash stage); thereby the MSF second train produces a second train final distillate stream and a second train final brine stream; wherein the second train final brine stream is discharged from the MSF second train at the lowest temperature. The second train final brine stream from the MSF second train flows, in turn, as a feed stream to the last effect of the BME third train; wherein it successively undergoes evaporation, as described in the BME first train, to produce a third train final distillate stream and a third train final brine stream. A further portion of the feed stream is fed to the last flash stage of the MSF fourth train and heated in the heat gain section and exited from the first flash stage; wherein, in turn, is mixed with the third train final brine stream from the first effect of the BME third train to form a mixed brine stream; wherein the mixed brine stream is further heated in the brine heater of the MSF fourth train and then fed to the first flash stage of the MSF fourth train; wherein it successively undergoes flashing, as described in the MSF second train, to produce a fourth train final distillate stream and a fourth train final brine stream. This MBF desalination concept continues in the same manner until the MSF last train; wherein the MSF last train produces a last train final distillate stream and a last train final brine stream, whereby the last train final brine stream is discharged from the MBF desalination system.

Thus, the above described MBF desalination system is a multi-evaporation system without supplying additional heat after the first effect of each of the BME trains and the brine heater of each of the MSF trains; a multi-feed system without rejecting the pre-heated source of water from the heat rejection condensers of the BME trains and the heat rejection section of the MSF last train back to the sea; and a mixed multi-concentration system with only supplying the portion of the feed stream to the last effect of the first MBE train, and supplying portions of the feed stream to the last flash stage of each of the MSF trains. This inventive MBF desalination concept is also applicable to membrane distillation (indirect contact membrane distillation, vacuum membrane distillation, osmotic membrane distillation, etc.), vapor recompression evaporators, and the like.

Figure 20A:
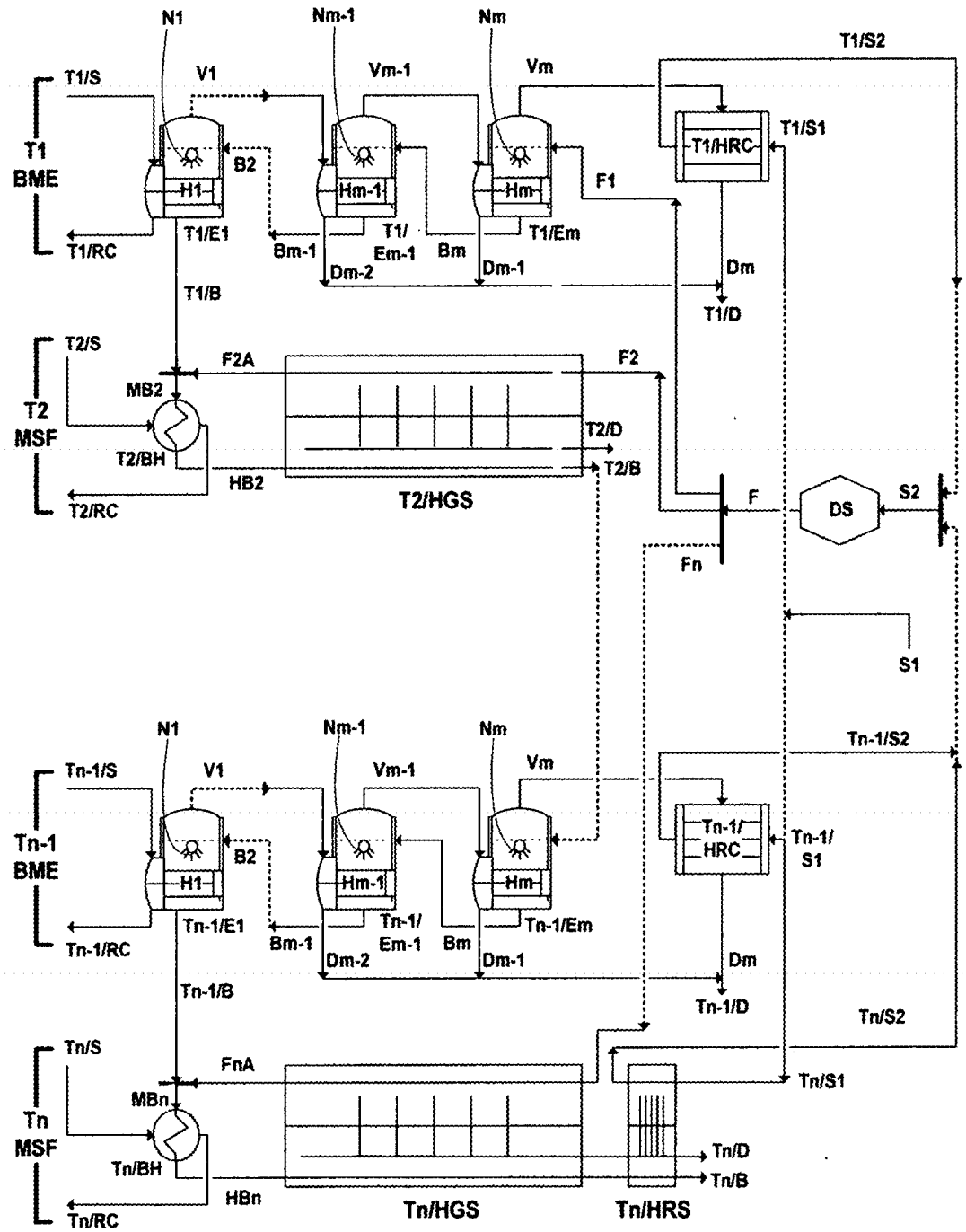
FIG. 20A illustrates a possible flow diagram for the inventive MBF desalination system.

FIG. 20A, as an example, illustrates this embodiment; wherein the MBF desalination system comprises a number of desalination trains; wherein the number of the desalination trains is selected based on the desired distillate total sum of the MBF desalination system; wherein the desalination trains in the MBF desalination system alternate between a BME train and a MSF train; wherein the number of effects in each of the BME trains, and the number of stages in each of the MFS trains are selected based on the desired distillate output from each train that commensurate with the desired distillate total sum of the MBF desalination system.

Based on the desired distillate total sum of the MBF desalination system, the number of the trains may be extended from a first train [T1] to a last train [Tn]; wherein the notations [T1, T2, ..., Tn−1, and Tn] refer to the number of each of the trains in the MBF desalination system. For example, [Tn] refers to the last train whereas [Tn−1] refers to a preceding train of the last train. For simplicity, FIG. 20A shows only the first two trains [T1 and T2] and the last two trains [Tn−1 and Tn] in the MBF desalination system, and the connections between these sets of trains are indicated in FIG. 20A by dotted lines. The MBF desalination system may also be limited to two trains. Each train has it is own steam supply [T1/S, T2/S, ..., Tn−1/S, and Tn/S], a return condensate stream [T1/RC, T2/RC, ..., Tn−1/RC, and Tn/RC], a final distillate stream [T1/D, T2/D, ..., Tn−1/D, and Tn/D], and a final reject brine stream [T1/B, T2/B, ..., Tn−1/B, and Tn/B]. Each of the BME trains comprises a heat rejection condenser [T1/HRC, ..., Tn−1/HRC]. Each of the MSF trains comprises a heat gain section [T2/HGS, ..., Tn/HGS], except the MSF last train; wherein it comprises a HGS [Tn/HGS] and a heat rejection section [Tn/HRS].

The effects [E1 to Em] in each of the BME trains in the MBF desalination system are arranged in series; wherein E1 is the first effect and operated at the highest temperature, Em is the last effect and operated at the lowest temperature, and Em−1 is the preceding effect of the last effect [Em]. For simplicity, FIG. 20A shows only these three effects [E1, ..., Em−1, and Em] in each of the BME trains in the MBF desalination system since the remainder effects duplicate in function the effects shown, and the connections among these effects [E1 to Em] in each of the BME trains are indicated in FIG. 20A by dotted lines. Each effect in each of the BME trains has it is own evaporating surface [H1, ..., Hm−1, and Hm], spray nozzles [N1, ..., Nm−1, and Nm], a vapor stream [V1, ..., Vm−1, and Vm], a condensed vapor stream (distillate) [..., Dm−2, Dm−1, and Dm], and a brine stream [..., "B2", ..., "Bm−1", and "Bm"].

As shown in FIG. 20A, a portion [F1] of the feed stream [F] flows and sprays via the nozzles [Nm] on the outer surface of evaporating tubes [Hm] of the last effect [Em] of the BME first train [T1/BME]; wherein the last effect [Em] is operated at the lowest temperature and pressure, to produce a vapor stream [Vm] and a brine stream [Bm]. The brine stream [Bm] from the last effect [Em] of the BME first train [T1/BME] flows backward to the subsequent effect [Em−1] and then sprays via nozzles [Nm−1] on the outer surface of evaporating tubes [Hm−1] to produce a vapor stream [Vm−1] and a brine stream [Bm−1]. The brine stream [Bm−1] then flows in similar manner to the subsequent effect. As a brine stream flows backward from effect to effect, it is upgraded in temperature and TDS level until it is discharged from the first effect [E1] at a pre-selected temperature and TDS level as a final brine stream [T1/B] of the first BME train [T1/BME].

Steam [T1/S] is fed into the inner side of the evaporating tubes [H1] of the first effect [E1] of the BME first train [T1/BME]. A portion of the feed stream of the first effect [E1], which is the brine stream [B2] from the second effect (not shown in FIG. 20A) evaporates, thereby the first effect [E1] produces a vapor stream [V1] and a brine stream, wherein the produced brine stream from the first effect [E1] is the final brine stream [T1/B] of the BME first train [T1/BME]. Steam is condensed inside the evaporating tubes [H1] of the first effect [E1] and returned to its source (e.g., a power generation cycle, a standalone boiler, etc.) as a returned condensate stream [T1/RC].

The produced vapor stream [V1] from the first effect [E1] is fed into the inner side of evaporating tubes of the second effect (not shown in FIG. 20A). It condenses after giving up its latent heat to the lesser temperature brine being sprayed on the outer surface of the evaporating tubes of the second effect. Here, spraying via nozzles in each of the effects is accompanied by flashing, thereby boiling (a spray film at the surface of the evaporating tubes) and flashing (spraying through the nozzles near the top of the effect under a reduced pressure) contribute to vapor production (which is after condensation in a next effect becomes distillate) in each effect, wherein boiling is dominant. The condensation of the vapor stream [V1] from the first effect [E1] occurs in the second effect [E2] at a temperature a few degrees lower than that in the first effect [E1] due to the successively lower pressure in each effect down the train. The condensate of the vapor stream [V1] from the first effect [E1] becomes the distillate stream of the second effect [E2] (not shown in FIG. 20A).

Similarly, the produced vapor stream from the second effect is fed to the inner side of evaporating tubes of a third effect and so on, thereby condensates (distillate streams) [..., Dm−2, Dm−1] flow from effect to effect (from E1 to Em−1] under gravity, except the produced vapor stream [Vm] from the last effect [Em]. The vapor stream [Vm] from the last effect [Em] is condensed [Dm] in the heat rejection condenser [T1/HRC] of the BME first train [T1/BME] by a portion [T1/S1] of a source of water [S1], wherein the source of water [S1] is supplied to the entire MBF desalination system via a common line. The distillate [Dm] stream from the condensed vapor stream [Vm] from the last effect [Em] is combined with distillate streams [..., Dm−2, Dm−1] from other effects as a final distillate stream [T1/D] of the BME first train [T1/BME]. The pre-heated portion [T1/S2] of the source of water exiting the heat recovery condenser [T1/HRC] of the BME first train [T1/BME] is entirely transferred via a common line [S2] to a de-scaling step [DS]. The de-scaling step [DS] is described below in the next section of the invention; wherein the de-scaling step [DS] produces the feed stream [F] that feeds the entire MBF desalination system.

As shown in FIG. 20A, another portion [F2] of the feed stream [F] flows into the last flash stage of the MSF second train [T2/MSF] via the inner tubes of pre-heaters/condensers, and exists [F2A] from the first flash stage of the MSF second train [T2/MSF], wherein it is mixed with the final brine stream [T1/B] from the BME first train [T1/BME] to form a mixed brine stream [MB2], before the mixed brine stream [MB2] enters the brine heater [T2/BH] of the MSF second train [T2/MSF]. The mixed brine stream [MB2] passes through the brine heater [T2/BH] to gain heat, and then the heated mixed brine stream [HB2] (for simplicity, it is referred to as a heated brine stream [HB2]) flows to the first flash stage in the heat gain section [T2/HGS] of the MSF second train [T2/MSF], wherein it flashes in each of the flash stages at successively lower temperatures and pressures as it flows down the flash stages, thereby producing a final distillate stream [T2/D] and a final brine stream [T2/B]. Steam [T2/S] is fed into the brine heater [T2/BH] of the MSF second train [T2/MSF]; wherein steam gives up its latent heat to heat the mixed brine stream [MB2], thereby steam condenses and returns to its source (e.g., a power generation cycle, a standalone boiler, etc.) as a returned condensate stream [T2/RC].

Similarly, the final reject brine [T2/B] from the MSF second train [T2/MSF] is fed to the last effect of the third BME train [T3/BME] (not shown in FIG. 20A), and the operation of the MBF desalination system continues in a similar manner for the remainder of alternating BME and MSF trains, as described above between the BME first train and the MSF second train, until the MSF last train; wherein the MSF last train [Tn/MSF] comprises a heat gain section [Tn/HGS] and a heat rejection section [Tn/HRS], which produces a final distillate stream [Tn/D] and a final brine stream [Tn/B]. The final brine stream [Tn/B] from the MSF last train, which is the last train in the MBF desalination system, is discharged from the MBF desalination system. The MSF last train is the only MSF train in the MBF desalination system, which comprises a heat rejection section [Tn/HRS]. The essential purpose of the heat rejection section in the MSF last train is to extract more distillate and to bring the temperatures of the final distillate stream [Tn/D] and the final reject stream [Tn/B] closer to the ambient temperature of the source of water [S1]. A portion [Tn/S1] of the source of water [S1] is fed to the heat rejection section [Tn/HRS] of the MSF last train [Tn/MSF]; wherein it is pre-heated, and the pre-heated portion [Tn/S2] exiting the heat rejection section [Tn/HRS] is entirely transferred via the common line [S2] to the de-scaling step [DS]; wherein the de-scaling step [DS] produces the feed stream [F].

In another embodiment (not shown in FIG. 20A), each of the brine heaters [T2/BH, . . . , Tn/BH] along with each of their steam supplies in each of the MSF trains [T2/MSF, . . . , Tn/MSF] in the MBF desalination system may be eliminated; thereby flashing directly each of the mixed brine streams [MB2, . . . , MBn] in each of the heat gain sections [T2/HGS, . . . , Tn/HGS] of the MSF trains [T2/MSF, . . . , Tn/MSF] and the heat rejection section [Tn/HRS] of the MSF last train at a reduced pressure and a lower temperature than the pressure and temperature of each of the mixed brine streams [MB2, . . . , MBn].

In further embodiments (not shown in FIG. 20A), wherein in order to optimize the amount of the pre-heated source of water [S2] from the MBF desalination system, alternatively or additionally, the heat rejection section [Tn/HRS] in the MSF last train [Tn/MSF] may be eliminated; more than one MSF train in the MBF desalination system may comprise a heat rejection section; or each MSF train in the MBF desalination system may comprise a heat rejection section.

Figure 5:
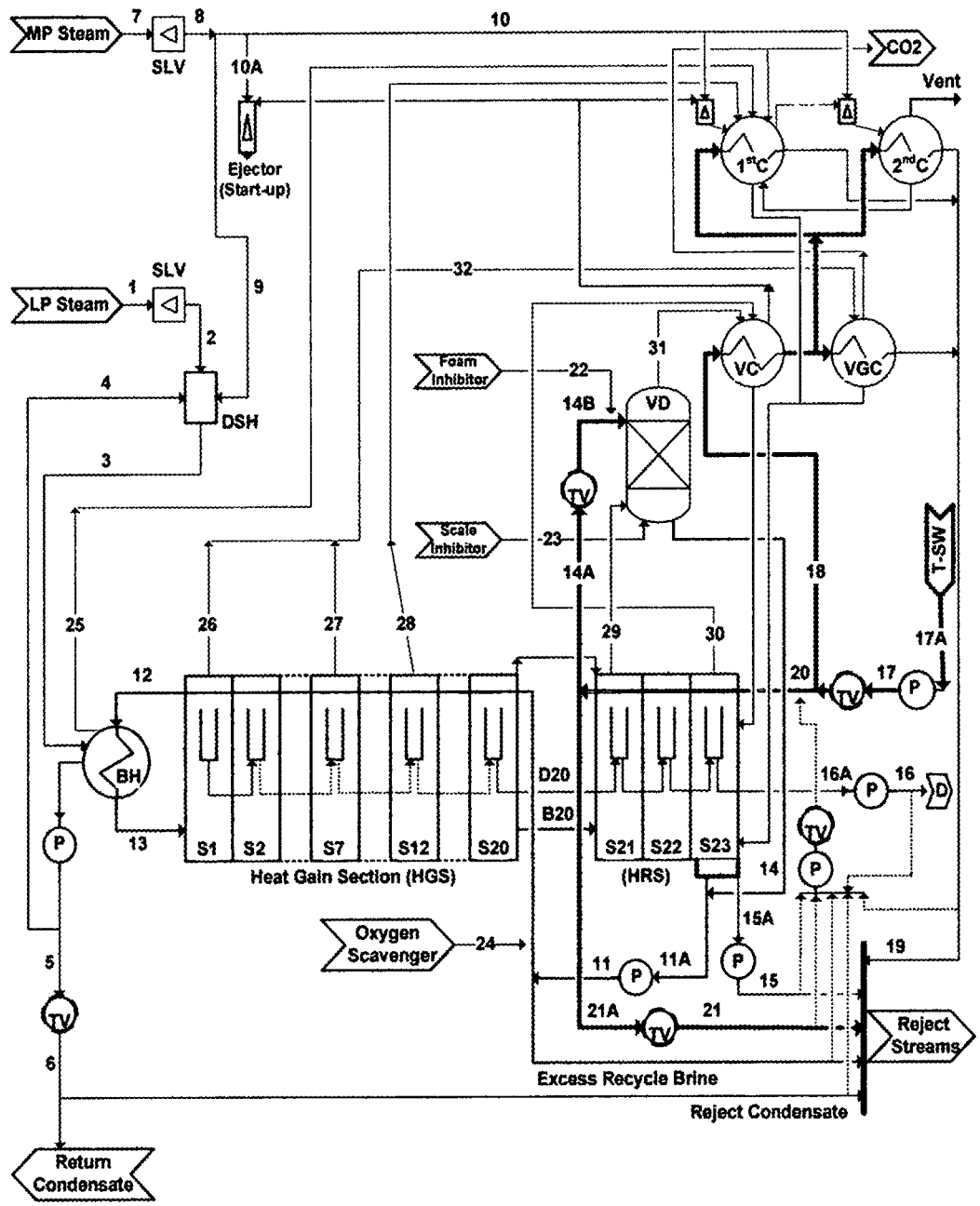
FIG. 5 illustrates a detailed configuration for a RB-MSF desalination train.
Figure 20B:
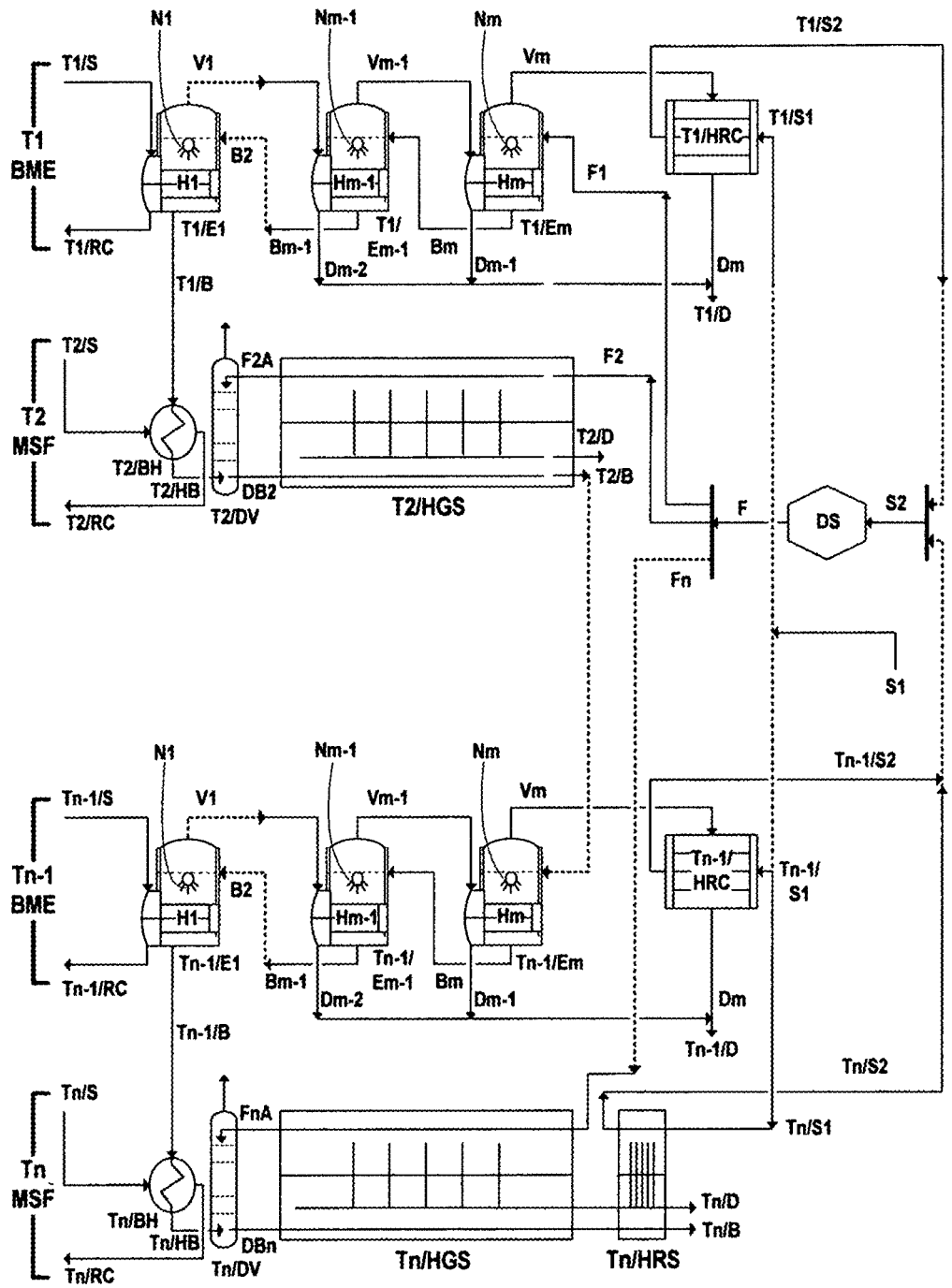
FIG. 20B illustrates another possible flow diagram for the inventive MBF desalination system.

In a yet further embodiment as shown in FIG. 20B, each of the MSF trains [T2/MSF, . . . , Tn/MSF] in the MBF desalination system comprises a de-gassing vessel [T2/DV, . . . , Tn/DV]. For example, only the final brine stream [T1/B] from the BME first train [T1/BME] passes through the brine heater [T2/BH] of the MSF second train to gain further heat, and then the heated brine stream [T2/HB] passes into the de-gassing vessel [T2/DV] of the MSF second train. The heated portion [F2A] of the feed stream [F2] from the first flash stage of the MSF second train [T2/MSF] flows into the de-gassing vessel [T2/DV], whereby it is mixed with the heated brine stream [T2/HB] as well as de-gassed by the vapor flashed from the heated brine stream [T2/HB] to produce a de-gassed heated mixed brine stream [DB2] (for simplicity, it is referred to as a de-gassed brine stream [DB2]). The same goes for each alternating pair of the remainder of the trains (e.g., Tn−1/MBE train and Tn/MSF train). This has the advantage that the de-gassed, heated, and mixed brine streams [DB2] is more thoroughly de-gassed and inert (in terms of dissolved gases such as oxygen, carbon dioxide, and the like), before it enters the heat gain section [T2/HGS] of the MSF second train. This also has the advantage of preventing venting issues in the brine heater since only the final brine stream [T1/B] from the BME first train [T1/BME], which is thoroughly de-gassed in the effects of the BME first train, passes through the brine heater [T2/BH], whereas the may be less de-gassed heated portion [F2A] of the feed stream [F2] from the first flash stage of the MSF second train [T2/MSF] is diverted to the degassing vessel [T2/DV]. This, in turn, reduces the consumption of M.P. steam in ejectors and eliminates the use of an oxygen scavenger. The vital importance of these advantages in this invention can be more appreciated when the complexity and inferiority of the venting system in a conventional independent RB-MSF train (e.g., FIG. 5) are recognized, whereby fully pronounced in using a vacuum de-aerator (VD), an oxygen scavenger, a vent condenser (VC), a vent gas condenser (VGC), a first condenser ($1^{st}$ C), a second condenser ($2^{nd}$ C), and M.P. steam.

Figure 20C:
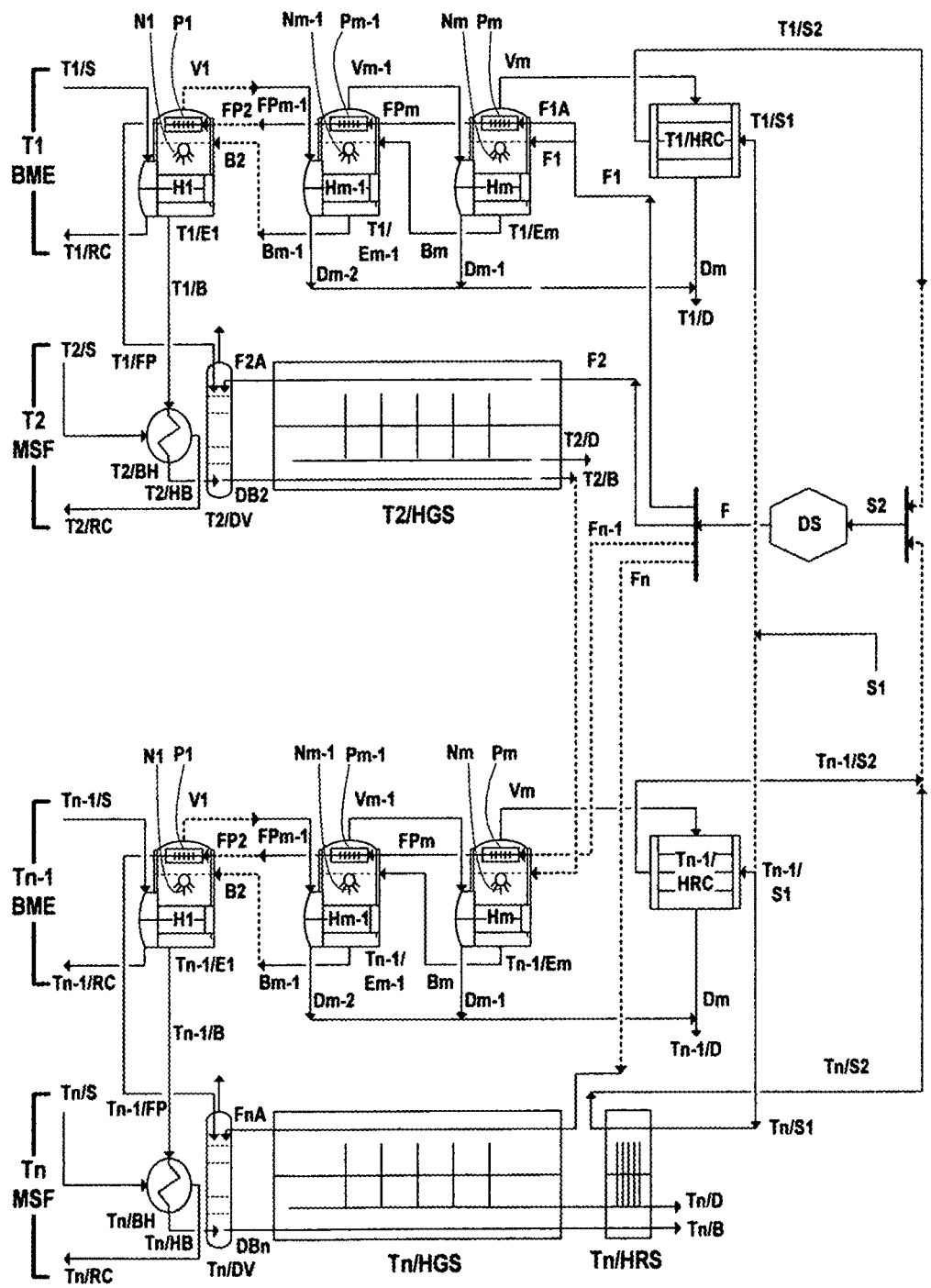
FIG. 20C illustrates a further possible flow diagram for the inventive MBF desalination system.

In yet a further embodiment as shown in FIG. 20C, each of the BME trains [T1/BME, . . . , Tn−1/BME] in the MBF desalination system comprises a separate set of pre-heaters [P1, . . . , Pm−1, and Pm]; wherein each set of the pre-heaters carries separately a portion [F1A, . . . , Fn−1] of the feed stream [F]. The essential purpose of the pre-heaters in each of the MBE trains is to provide in parallel additional amounts of heated feeds [T1/FP, . . . , Tn−1/FP] to each of the subsequent MSF trains at a temperature that is about the temperature of each of the final brine streams [T1/B, . . . , Tn−1/B] from each of the MBE trains. For example, a portion [F1A] of the feed stream [F1] to the BME first train [T1/BME] flows separately to the last pre-heater [Pm] of the last effect of the BME first train [T1/Em]; wherein it is gradually heated as it passes through the remainder of the pre-heaters, from the last effect [Em] to the first effect [E1], by the produced vapor [V1, . . . Vm−1, and Vm] from each effect until it exits the first effect of the BME first train [T1/FP] at a temperature that is about the temperature of the final brine stream [T1/B] from the first effect of the BME first train. This separately heated feed stream [T1/FP] by the pre-heaters [Pm, Pm-1, . . . , P1] of the MBE first train flows to the degassing vessel [T2/MSF] of the MSF second train; wherein it is de-gassed along with the heated portion [F2A] of the feed stream [F2] exiting the first flash stage of the MSF second train [T2/MSF] by the heated brine stream [T2/HB] from the brine heater [BH] of the MSF first train, thereby producing a degassed, heated and mixed brine stream [DB2] (here, for simplicity, it is referred to as a de-gassed brine stream [DB2]). The latter [DB2] then flows to the heat gain section of the MSF second train [T2/MSF]. The same goes for each alternating pair of the remainder of the trains (e.g., Tn−1/MBE train and Tn/MSF train). This has the advantage to provide a parallel additional amount of heated feed to each of the MSF trains, thereby increasing distillate output of each of the MSF trains.

Figure 20D:
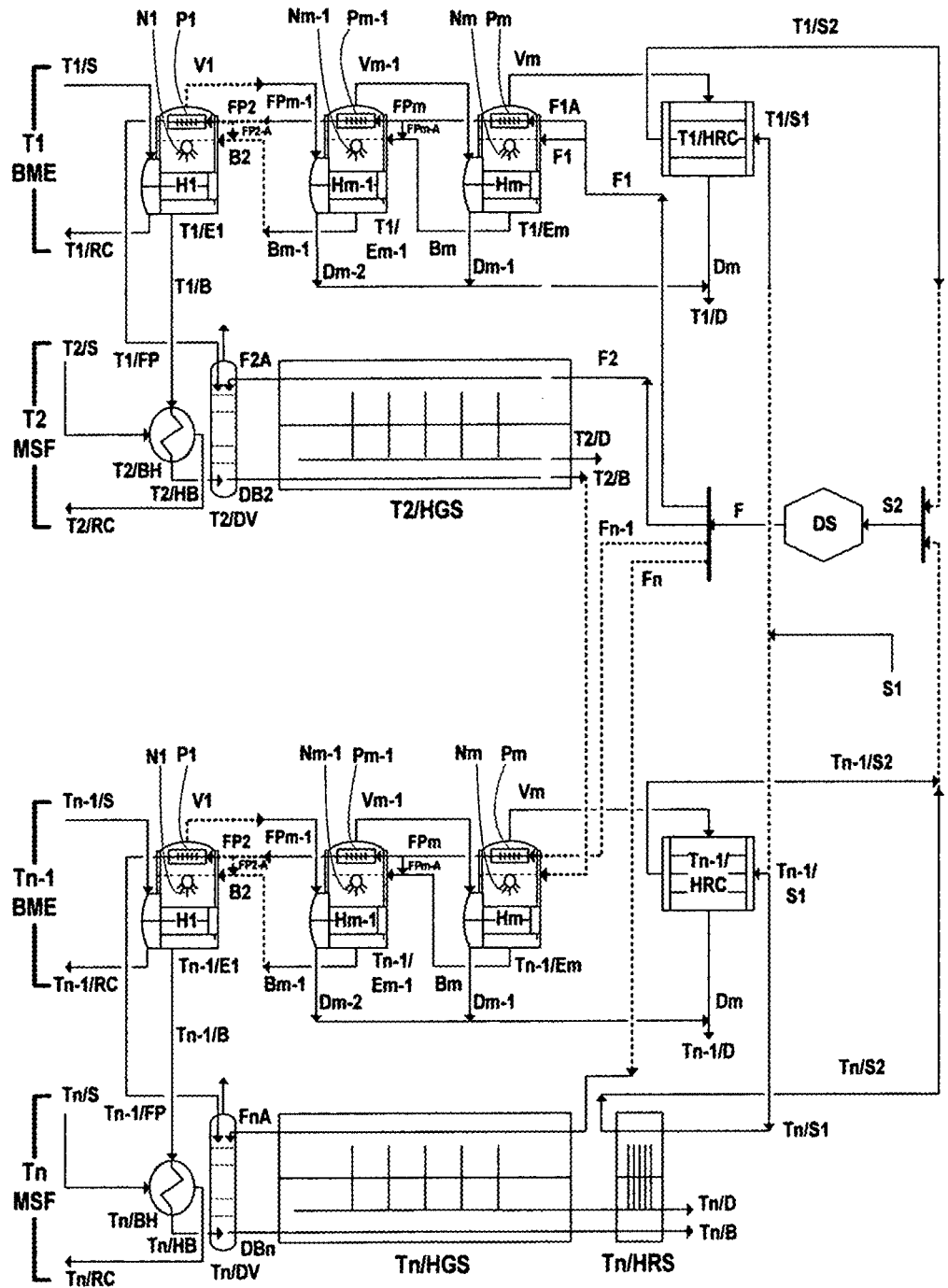
FIG. 20D illustrates yet a further possible flow diagram for the inventive MBF desalination system.

In yet a further embodiment as shown in FIG. 20D, an additional purpose for the pre-heaters in each of the MBE trains, as described above in Paragraph [0134], is to add an amount of feed [FPm-A, . . . , FP2-A] from each of the pre-heated feeds [FPm, . . . , FP2], after the last effect [Em], to the feed stream of each of the subsequent effects [Em-1, . . . , E1], in each of the MBE trains. Each of these added amounts of feeds [FPm-A, . . . , FP2-A] to the feed stream each effect, except the last effect, is about the amount that is evaporated from each effect. The temperature of each of added amounts of feeds [FPm-A, . . . , FP2-A] from the pre-heaters to each effect is about the temperature of the effect in which it is added to. This has the advantage to provide the same amount of feed to all effects in each of the MBE trains; thereby producing about the same amount of distillate from each effect, which, in turn, increases distillate output from each of the MBE trains.

In yet further embodiments (not shown in FIGS. 20C and 20D), wherein the degassing vessels [T2/DV, . . . , Tn/DV] of the MSF trains [T2/MSF, . . . , Tn/MSF] may be eliminated. Here, for example, the final brine stream [T1/B] and the heated feed stream [T1/FP] from the BME first train [T1/BME] are mixed with the heated portion [F2A] of the feed stream [F2] exiting the first flash stage of the MSF second train [T2/MSF] to form a mixed brine stream [MB2] at the entry to the brine heater [T2/BH], and then the mixed brine stream [MB2] passes through the brine heater [T2/BH] to gain heat, whereby the heated mixed brine stream from the brine heater [T2/BH] flows to the flash stages in the heat gain section [T2/HGS] of the MSF second train [T2/MSF], wherein it flashes in each of the flash stages at successively lower temperatures and pressures in going down the flash stages, thereby producing a final distillate stream [T2/D] and a final brine stream [T2/B]. This arrangement is essentially similar to the arrangement as shown in FIG. 20A and described in Paragraphs [0125]-[0130], except that the heated feed stream [T1/FP] by the pre-heaters from the BME first train is added to the mixed brine stream. The same goes for each alternating pair of the remainder of the trains (e.g., Tn−1/MBE train and Tn/MSF train).

Figure 20E:
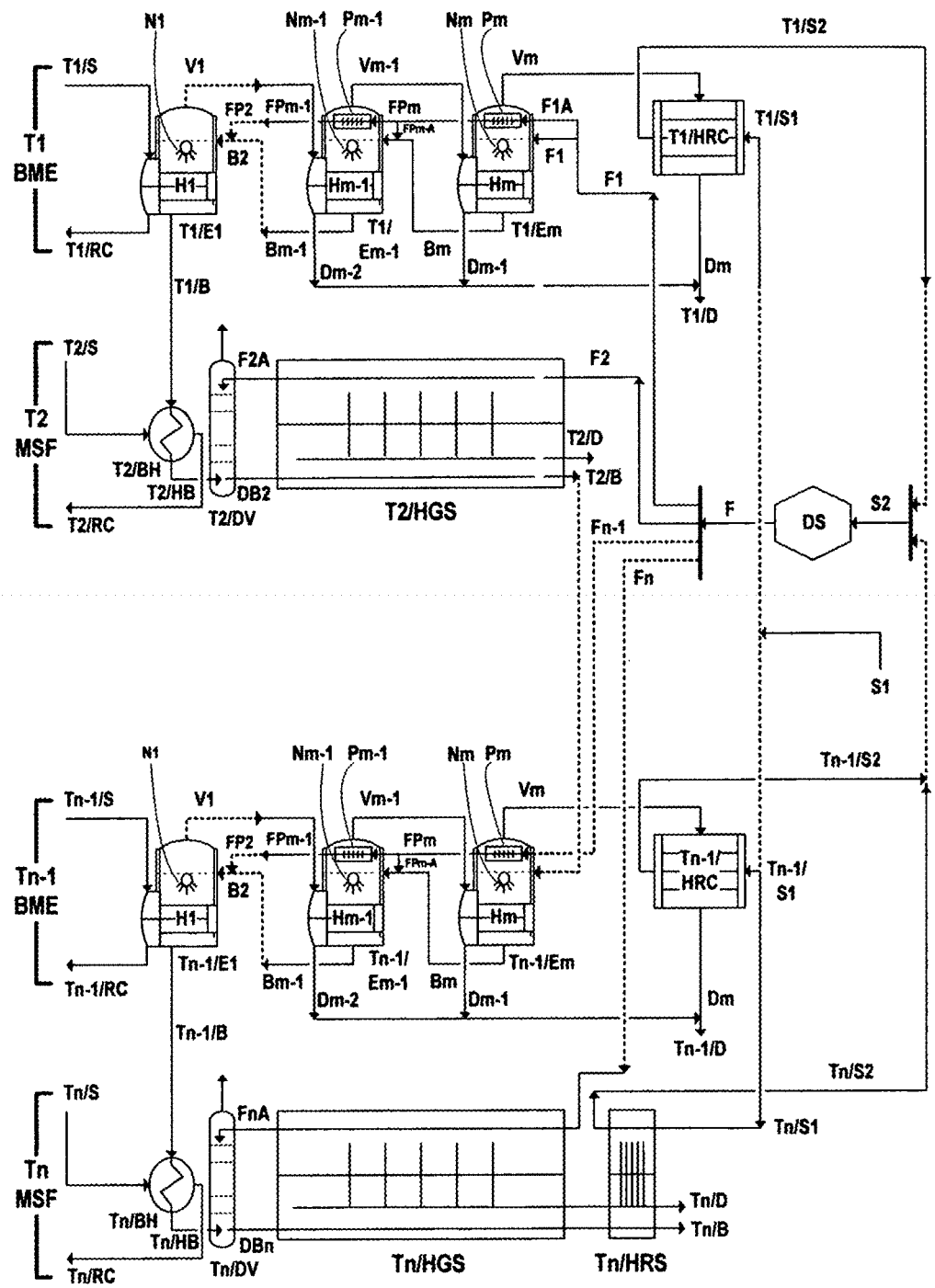
FIG. 20E illustrates yet a further possible flow diagram for the inventive MBF desalination system.

In yet a further embodiment as shown in FIG. 20E, wherein the purpose for the pre-heaters in each of the MBE trains, which deviates from the purpose as described above in Paragraph [0134] and shown in FIG. 20C, is to only add an amount of feed [FPm-A, . . . , FP2-A] from each of the pre-heated feeds [FPm, . . . , FP2], after the last effect [Em], to each of the subsequent effects in each of the MBE trains. Thus, the pre-heaters [P1] in each of the first effects of the MBE trains [T1/E1, . . . , Tn−1/E1] may be eliminated.

In yet a further embodiment (not shown in FIG. 20E), the degassing vessels [T2/DV, . . . , Tn/DV] of the MSF trains [T2/MSF, . . . , Tn/MSF] may be eliminated. Here, for example, the final brine stream [T1/B] from the BME first train [T1/BME] is mixed with the heated portion [F2A] of the feed stream [F2] exiting the first flash stage of the MSF second train [T2/MSF] to form a mixed brine stream at the entry to the brine heater [T2/BH] of the MSF second train [T2/MSF], and then the mixed brine stream passes through the brine heater [T2/BH] to gain heat, whereby the heated mixed brine stream from the brine heater [T2/BH] flows to the flash stages in the heat gain section [T2/HGS] of the MSF second train [T2/MSF] (similar to the arrangement as shown in FIG. 20A and described above in Paragraphs [0125]-[[0130]). The same goes for each alternating pair of the remainder of the trains (e.g., Tn−1/MBE train and Tn/MSF train).

Figure 20F:
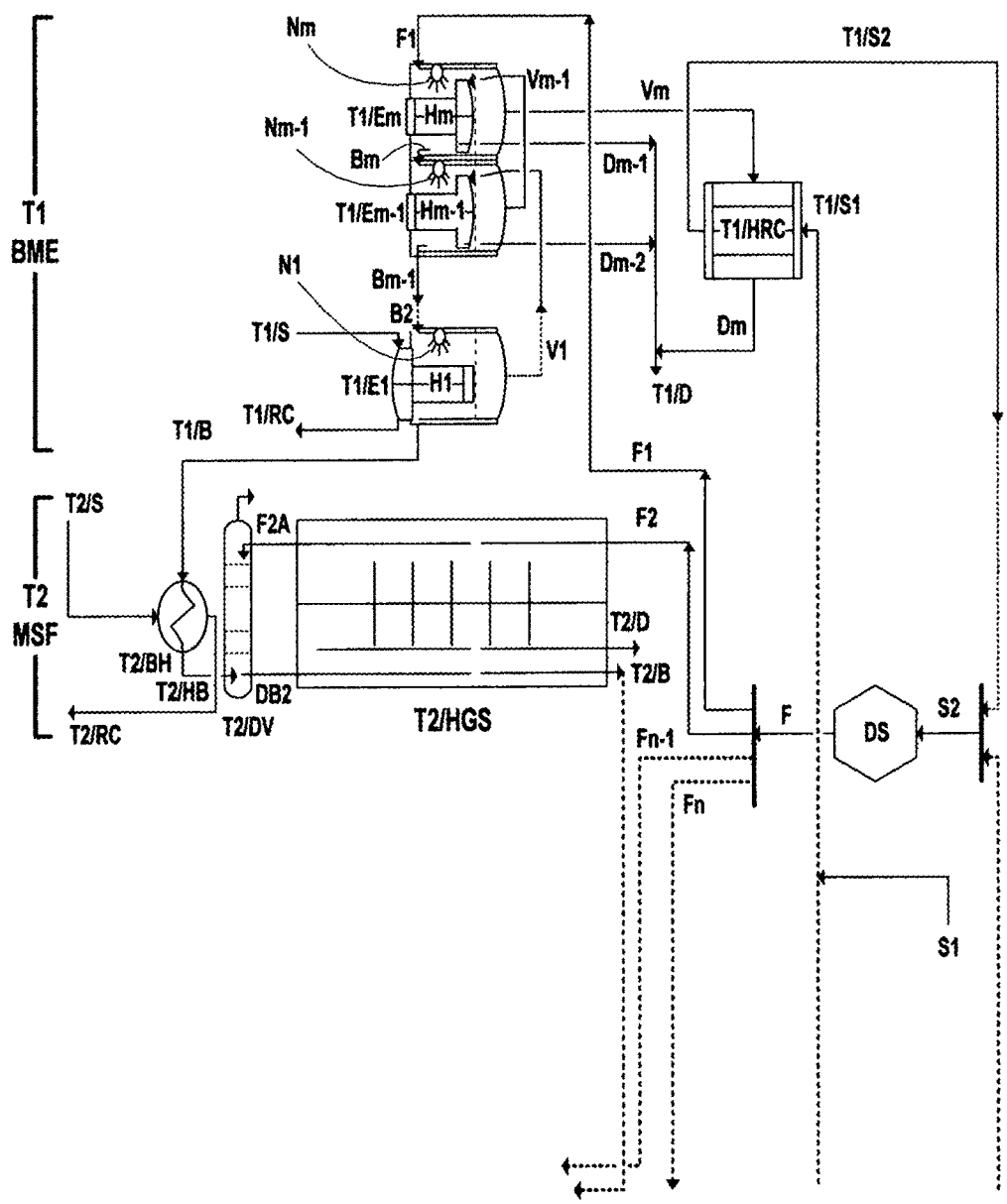
FIG. 20F illustrates yet a further possible flow diagram for the inventive MBF desalination system.

In yet a further embodiment as shown in FIG. 20F, wherein the essential purpose is to eliminate the pumps that transfer a brine stream from effect to effect [from Em to E1] in each of the BME trains [T1/BME, . . . , Tn−1/BME] (FIGS. 20A through 20E), thereby vertically arranging the effects. For simplicity rather than redundancy, FIG. 20F shows only the first two trains of the BMF system [T1/BME and T2/MSF]. The arrangement in FIG. 20F is essentially similar to the arrangement in FIG. 20B except the effects in each of the BME trains are arranged vertically.

In FIG. 20F, the effects are also arranged in series but arranged vertically, wherein the first effect [E1] is located at the bottom whereas the last effect [Em] is located at the top of each of the BME trains (e.g. [T1/BME] as shown in FIG. 20F). On the brine (feed) side, a portion [F1] of the feed stream [F] flows down to the last effect [Em] through the nozzles [Nm] and sprays on the outer surface of the evaporating tubes [Hm] in the last effect, wherein the last effect [Em] is operated at the lowest temperature of the BME first train [T1/BME]. The brine stream [Bm] from the last effect [Em] flows by gravity to the next subsequent effect [Em−1] through the nozzles [Em−1] and sprays on the outer surface of the evaporating tubes [Hm−1] in the effect. A brine stream then flows in a similar manner to the subsequent effects until the first effect [E1], wherein the final brine stream [T1/B] is discharged from the MBE first train at a pre-selected temperature and TDS level. As such, pumps along with their power requirements to transfer a brine stream from effect to effect (e.g., in contrast with BME trains as shown in FIG. 20A) in the vertically arranged BME trains are eliminated. The final brine stream [T1/B] from the vertically arranged BME first train is then fed to the brine heater [T2/BH] of the MSF second train, which is similar to the description as given above in Paragraph [0133]. On the vapor side, steam [T1/S] is fed into the inner evaporating tubes [H1] of the first effect [E1]. Steam gives up its latent heat to the sprayed brine stream [B2] (from the second effect; not shown in FIG. 20F) on the outer surface of the evaporating tubes [H1] of the first effect, and the condensed steam is discharged as a return condensate stream [T1/RC] to its source (e.g., a power cycle, etc.). The vertically arranged BME train as shown in FIG. 20F is operated at successively higher pressure and temperature from the first effect [E1] (the bottom one) to the last effect [Em] (the top effect). The effects may be arranged in equal pressure increments, from top effect to bottom effect (pressure decrements, from bottom effect to top effect), instead of the conventional equal temperature increments. Such an arrangement provides an equal thermodynamic driving force at all effects, and allows a freedom to reduce evaporating surface (e.g., number of tubes) in each subsequent vapor stream path. Due to pressure differentials, temperature differentials, and high vacuum in going up the effects (from the first effect to the last effect), vapor may be transferred from a higher pressure and temperature effect to a subsequent lower pressure and temperature effect. A Venturi orifice or tube (e.g., low pressure in tube, high pressure in destination) may also be used to maintain a sufficient vapor velocity in evaporating tubes. As such, vapor from the first effect [V] is fed into the evaporating tubes of the second effect (not shown in FIG. 20F), wherein it gives up its latent heat to the brine stream being sprayed on the surface of the evaporating tubes in the second effect, thereby condensing the vapor [V] from the first effect in the second effect, which becomes the distillate stream of the second effect. Similarly, vapor from the second effect is fed to the evaporating tubes of the third effect and so on. The condensate from each effect flows under gravity from effect to effect, except the last effect [Em]. The vapor stream [Vm] from the last effect [Em] is condensed [Dm] in the heat rejection condenser [T1/HRC] as described above in Paragraph [0128]. The same arrangement can be made for each subsequent alternating pair of trains (a vertically arranged BME train and a MSF train) in the MBF desalination system, which is not shown in FIG. 20F. It should be noted that the vertically arranged BME train can be operated independently as standalone train; thereby it can be used in food, commodity, chemical, pharmaceutical, and oil-gas industries.

Figure 20G:
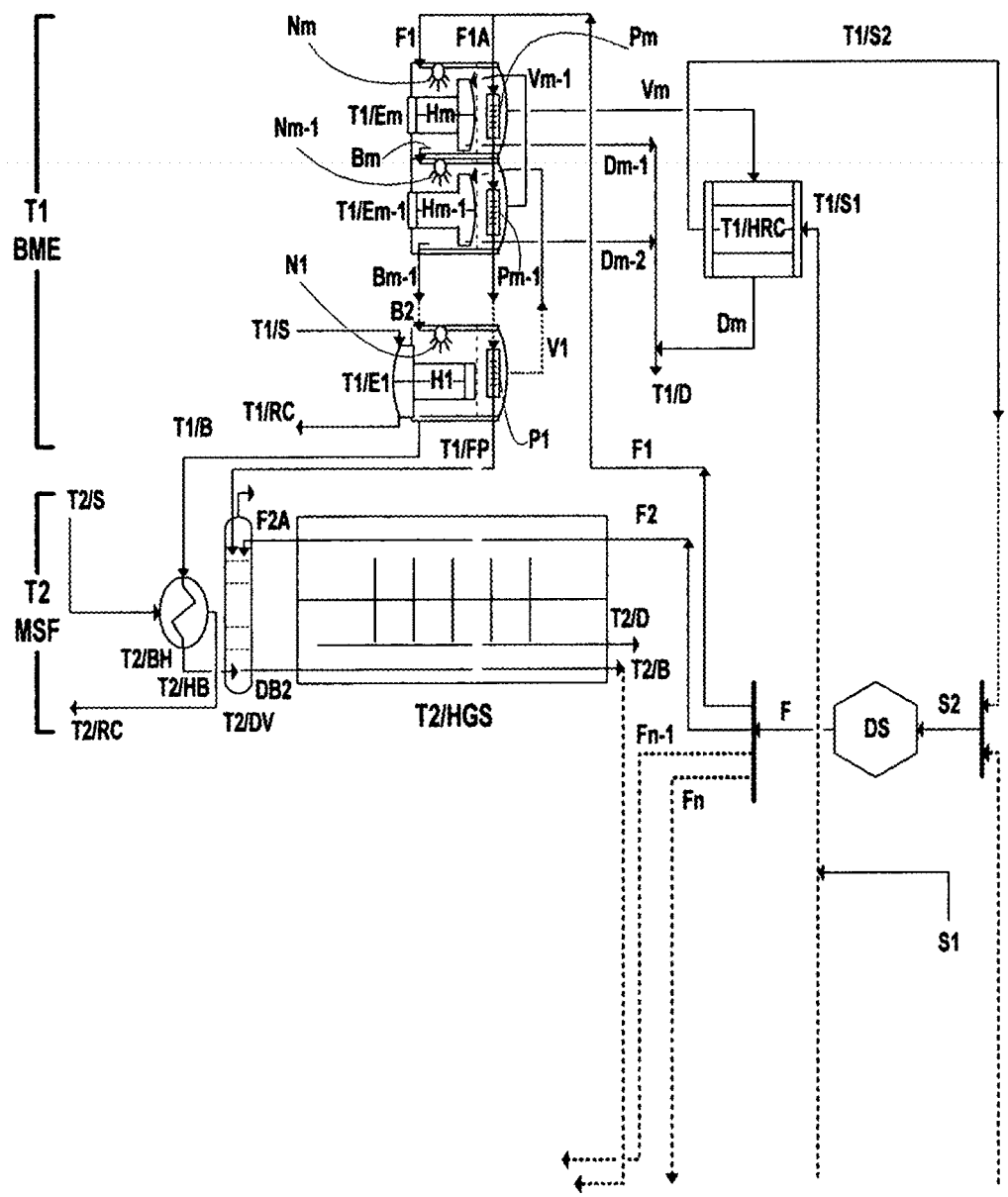
FIG. 20G illustrates yet a further possible flow diagram for the inventive MBF desalination system.

Since one of the objectives of this invention is to maximize distillate output, thereby in yet a further embodiment as shown in FIG. 20G, the vertically arranged BME first train [T1/BME] in the MBF desalination system comprises a separate set of pre-heaters [P1, . . . , Pm–1, and Pm]. Each set of the pre-heaters carries separately a portion [F1A] of the feed stream [F1] to the MBE first train [T1/BME] to produce a separately heated feed stream [T1/FP] (as described above in Paragraph [0134]).

Figure 20H:
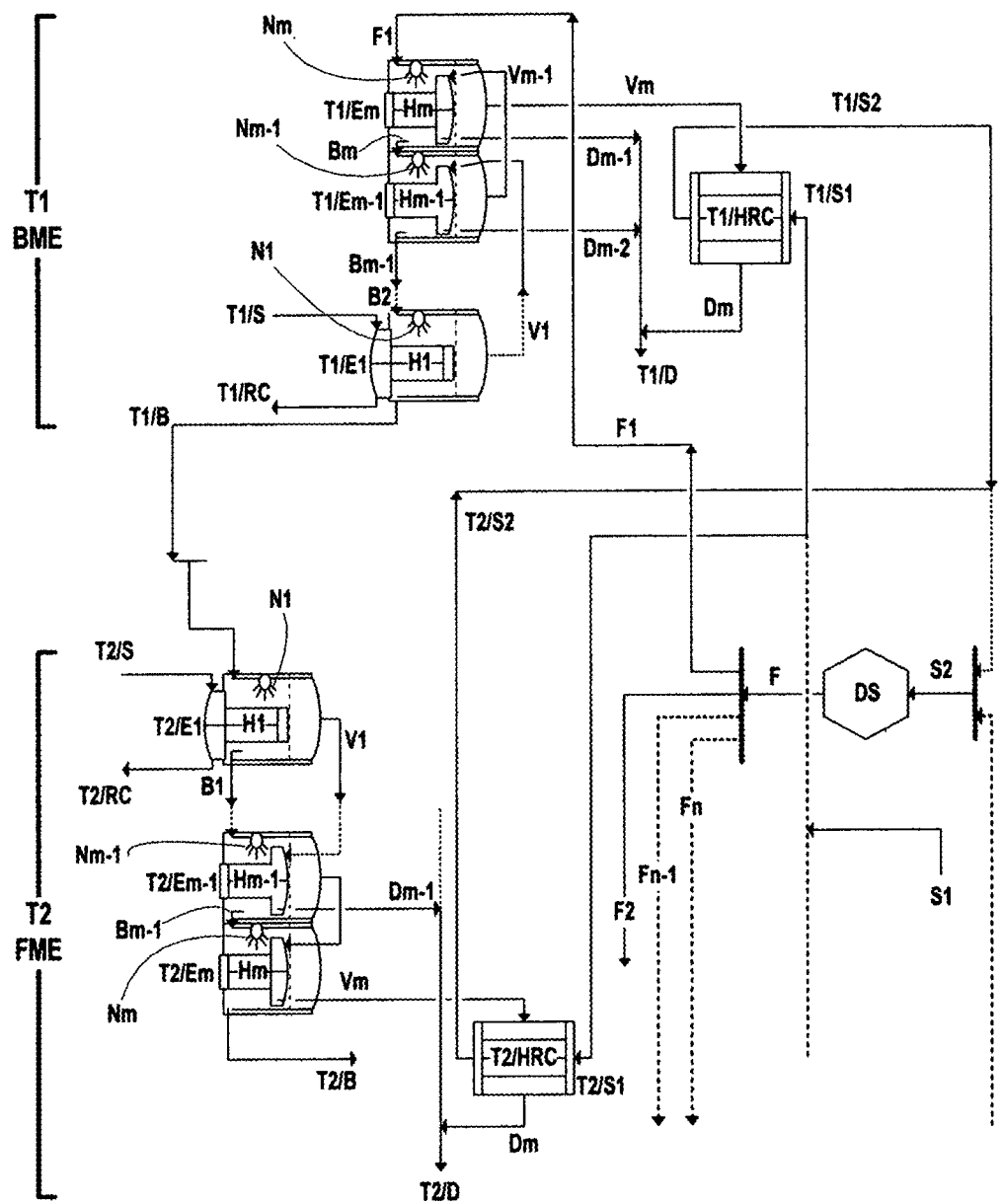
FIG. 20H illustrates yet a further possible flow diagram for the inventive MBF desalination system.

In yet a further embodiment, the MSF trains in the MBF desalination system as described above are replaced with forward fed multi-effect (FME) trains. For example, this is illustrated in FIG. 20H, wherein only the first two trains in the MBF desalination system are shown (again for simplicity instead of redundancy). The first train as shown in FIG. 20H is the vertically arranged BME train, which is described above in Paragraph [0140]. The second train is the vertically arranged FME train.

In the FME second train as shown in FIG. 20H, the effects are arranged in series but laid vertically, wherein the first effect [E1] is located at the top whereas the last effect [Em] is located at the bottom of the FME second train [T2/FME]. On the brine (feed) side, the final brine stream [T1/B] from the BME first train [T1/BME] flows down to the first effect [E1] through the nozzles [N1] and sprays on the outer surface of the evaporating tubes [H1] in the first effect of the vertically arranged FME, wherein the first effect [E1] is operated at the highest temperature of the FME second train [T2/FME]. The brine stream [B1] from the first effect [E1] flows by gravity to the subsequent effect through the nozzles and sprays on the outer surface of the evaporating tubes (not shown in FIG. 20H). A brine stream then flows in a similar manner to the subsequent effects until the last effect [Em], wherein the final brine stream [T2/B] is discharged from the FME second train at the lowest temperature and highest TDS level. As such, the transfer pumps along with their power requirements to transfer a brine stream from effect to effect are also eliminated. The final brine stream [T2/B] from the FME second train is then fed to the last effect of the BME third train of the MBF desalination system (not shown in FIG. 20H). On the vapor side, steam [T2/S] is fed into the evaporating tubes [H1] of the first effect [E1], wherein steam gives up its latent heat to the sprayed final brine stream [T1/B] from the BME first train on the outer surface of the evaporating tubes [H1] of the first effect, and the condensed steam is discharged as a return condensate stream [T2/RC] to its source (e.g., a power cycle, etc.). The FME second train as shown in FIG. 20H is operated at successively higher pressure and temperature from the first effect [E1] (the top one) to the last effect [Em] (the bottom effect). Due to gravity, pressure differentials, temperature differentials, and high vacuum in going down the effects (from the first top effect [E1] to the last bottom effect [Em]), vapor from the first effect [V1] is fed into the evaporating tubes of the second effect (not shown in FIG. 20H), wherein it gives up its latent heat to the brine stream being sprayed on the surface of the evaporating tubes in the second effect, thereby condensing the vapor [V1] from the first effect in the second effect to become the distillate stream of the second effect. Similarly, vapor from the second effect is fed to the evaporating tubes of the third effect and so on. The condensate from each effect flows under gravity from effect to effect, except the last effect. The vapor stream [Vm] from the last effect [Em] is condensed [Dm] in the heat rejection condenser [T2/HRC], which is described above in Paragraph [0128]. It follows that the same arrangement can be made for each set of subsequent alternating pair of trains (a vertically arranged BME train and a vertically arranged FME train) in the MBF desalination system, which is not shown in FIG. 20H. However, the MBF desalination system may be limited to just two alternating trains as shown in FIG. 20H.

Figure 20I:
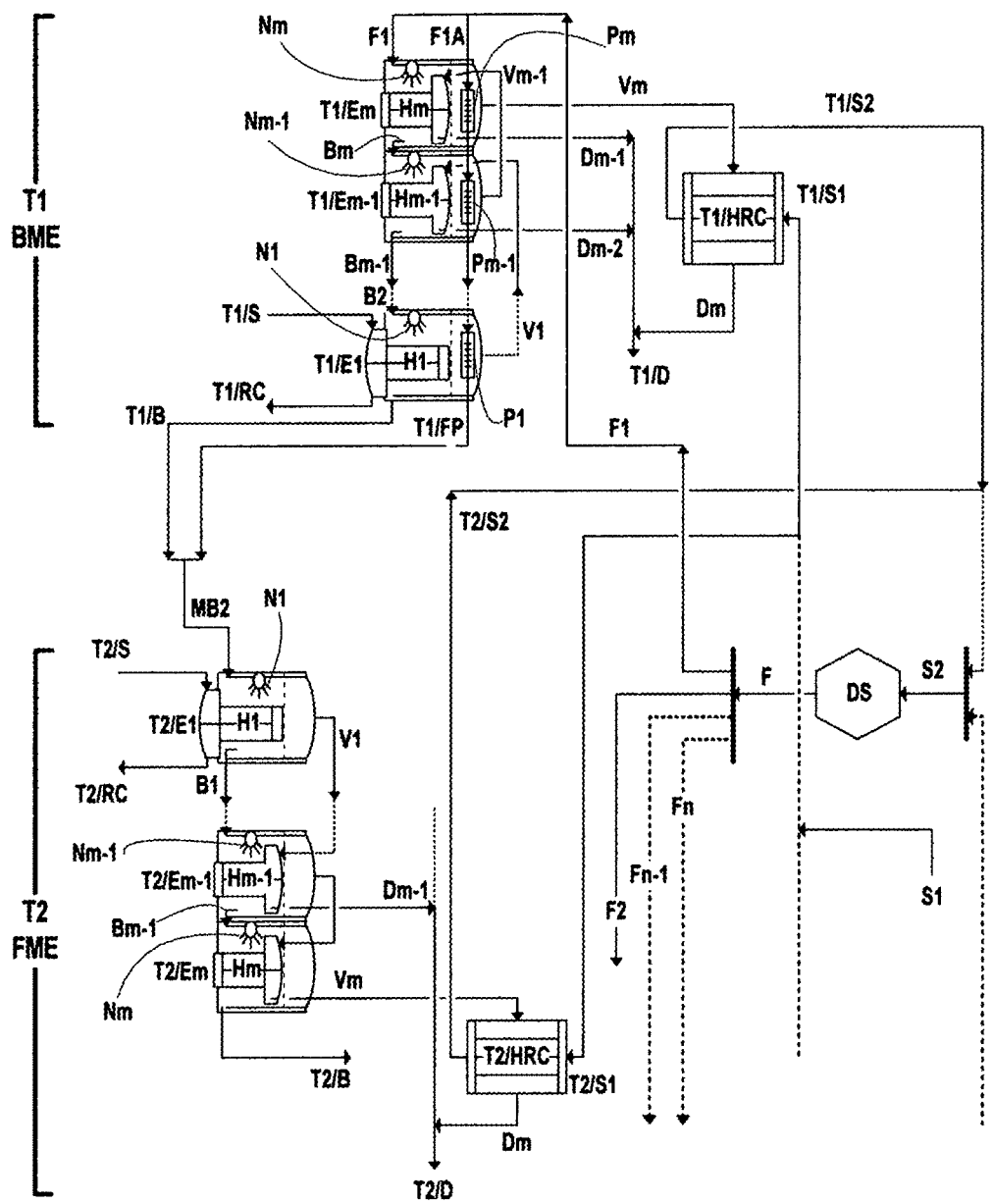
FIG. 20I illustrates yet a further possible flow diagram for the inventive MBF desalination system.

It should be noted that the vertically arranged FME second train as shown in FIG. 20H does not include feed pre-heaters as conventionally done in any standalone FME train, but rather, the vertically arranged FME second train is fed directly by the final brine stream [T1/B] from the BME first train [T1/BME]. In yet a further embodiment to maximize distillate output, as shown in FIG. 20I, the vertically arranged BME first train comprises a separate set of pre-heaters [P1, . . . , Pm–1, and Pm]; wherein this set of the pre-heaters carries separately a portion [F1A] of the feed stream [F1] to the BME first train [T1/BME]. The essential purpose of the pre-heaters in the vertically arranged BME first train is to provide an additional amount of a heated feed stream [T1/FP] at a temperature about the temperature of the final brine streams [T1/B] from the vertically arranged BME first train, whereby they are mixed as they exit the first effect of the vertically arranged BME train [T1/BME] to form a mixed brine stream [MB2], and the latter [MB2] is fed to the first effect of the vertically arranged FME second train [T2/FME]. Yet, a further advantage is that the separately heated feed streams by the pre-heaters in the vertically arranged BME first train also flows downward by gravity.

In yet a further embodiment to maximize distillate output; wherein the vertically arranged FME second train may comprise a separate set of pre-heaters (not shown in FIG. 20I); wherein this set of the pre-heaters carries separately a second feed stream [F2]; wherein the second feed stream [F2] is pumped upward, from the bottom effect [Em] to the top effect [E1] of the vertically arranged FME second train [T2/FME]. As it exits the first effect of the vertically arranged FME second train, it then mixed with the final brine stream [T1/B] (e.g., FIG. 20H), or additionally mixed with separately heated feed stream [T1/FP] (e.g., FIG. 20I).

Figure 10:
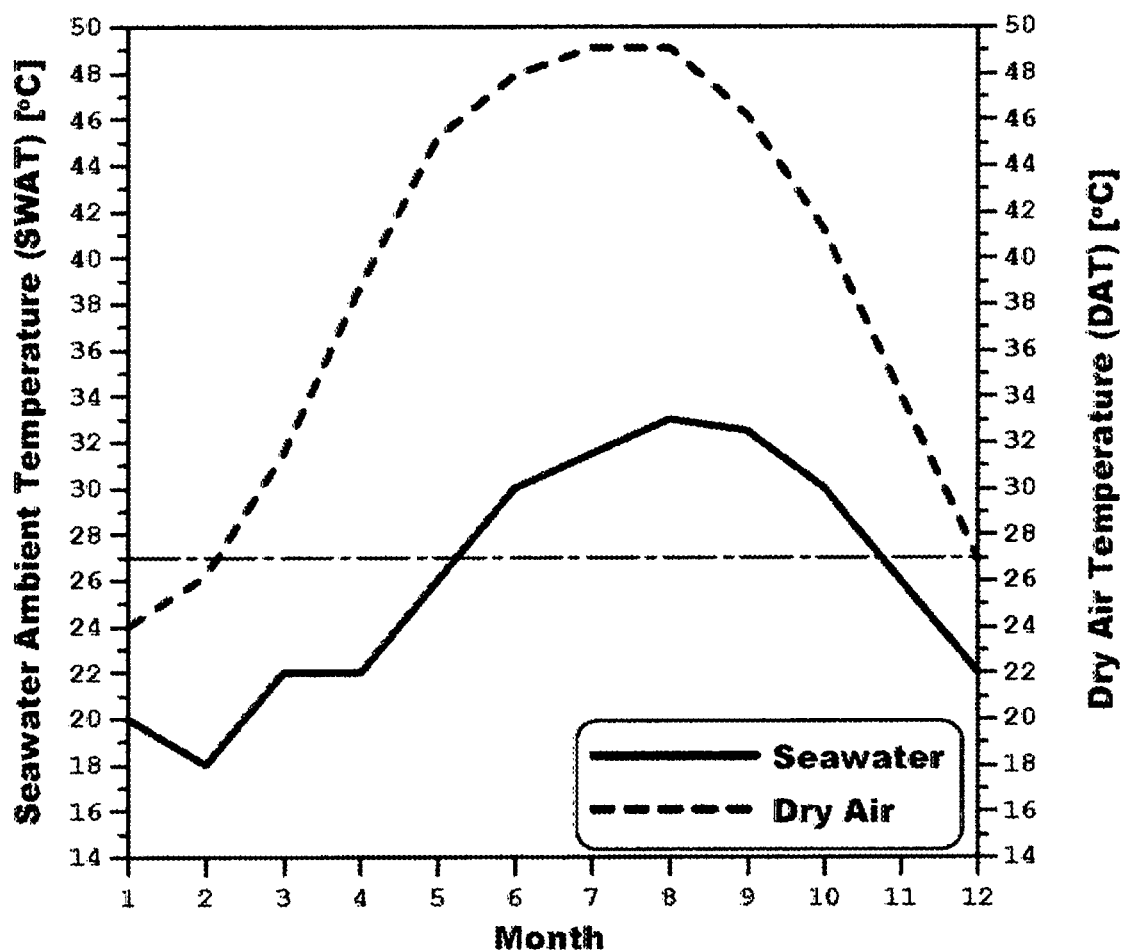
FIG. 10 illustrates the average monthly variations in SWAT and DAT.
Figure 11:
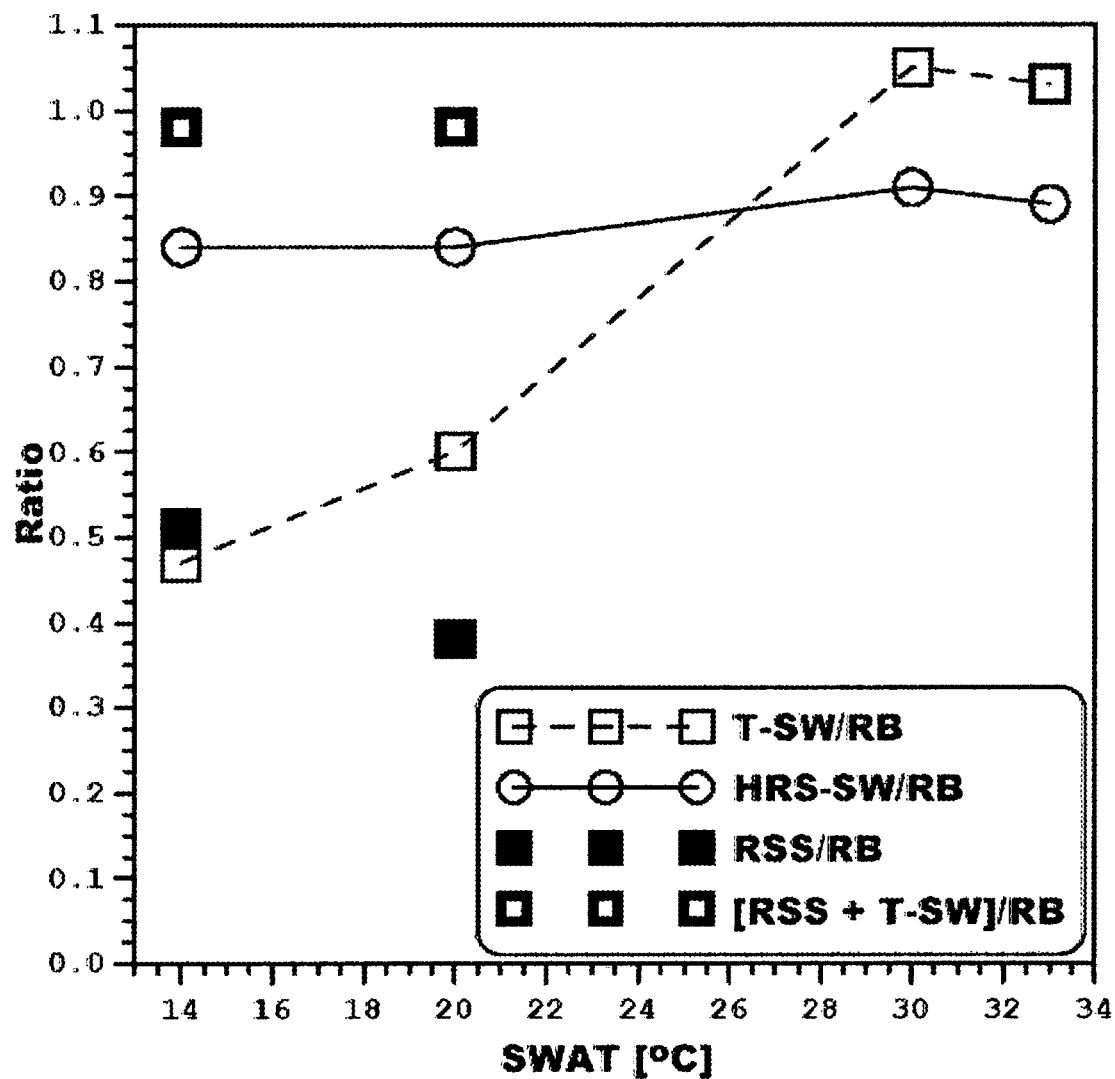
FIG. 11 illustrates the relation among a seawater feed stream, recycle brine and recycle supplement stream in a heat rejection section of a RB-MSF train.
Figure 12:
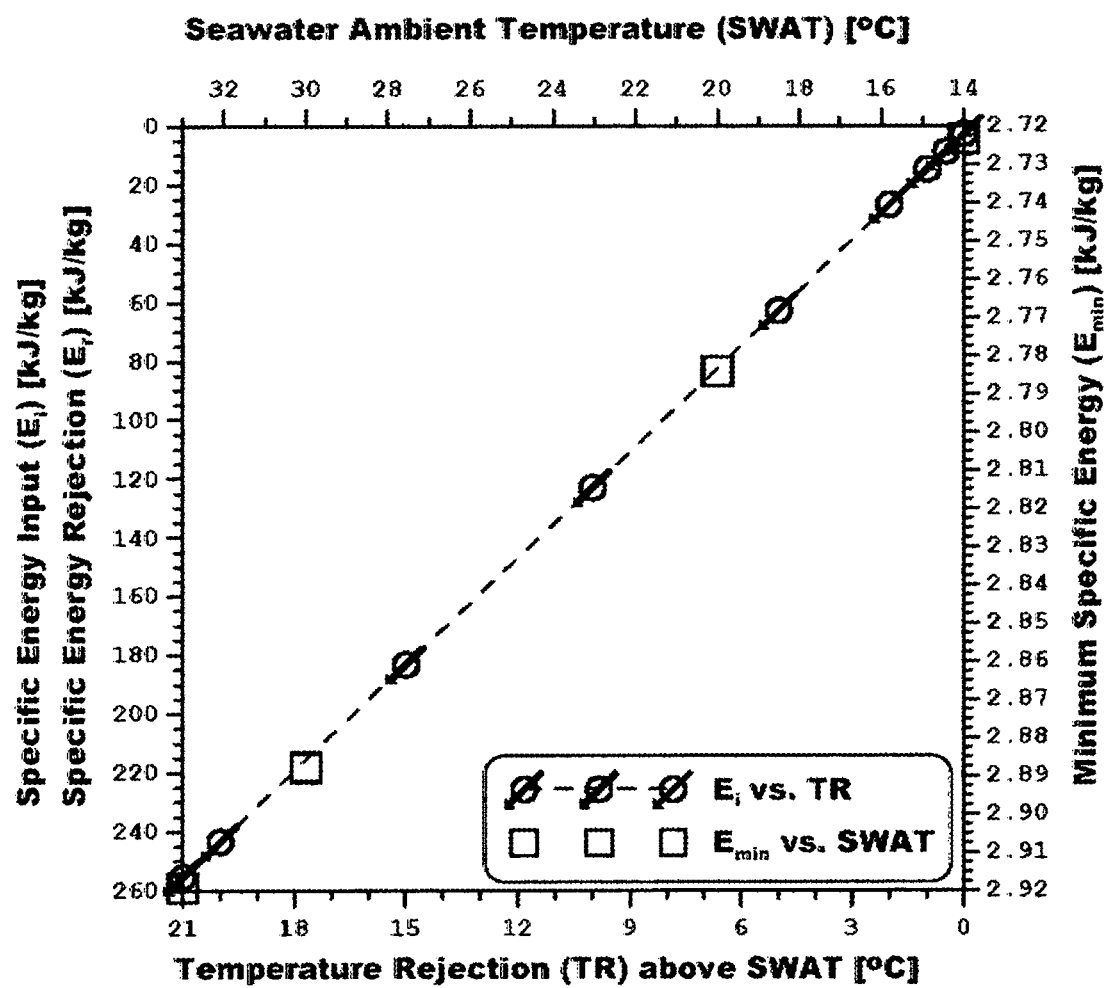
FIG. 12 illustrates the minimum specific energy at different SWAT and the specific energy rejection of a RB-MSF train at 14° C. of SWAT.
Figure 13:
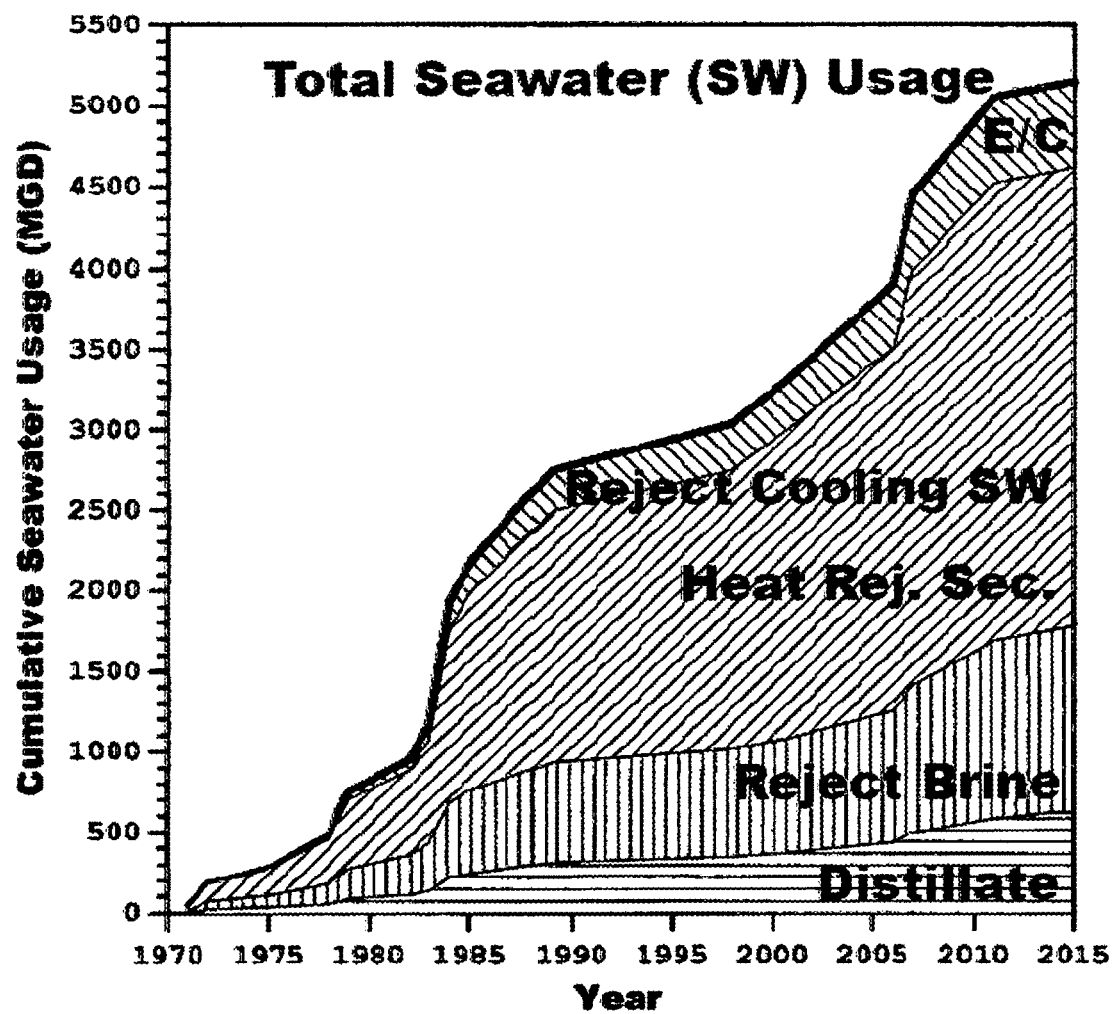
FIG. 13 illustrates the cumulative seawater usage in desalination plants.
Figure 14:
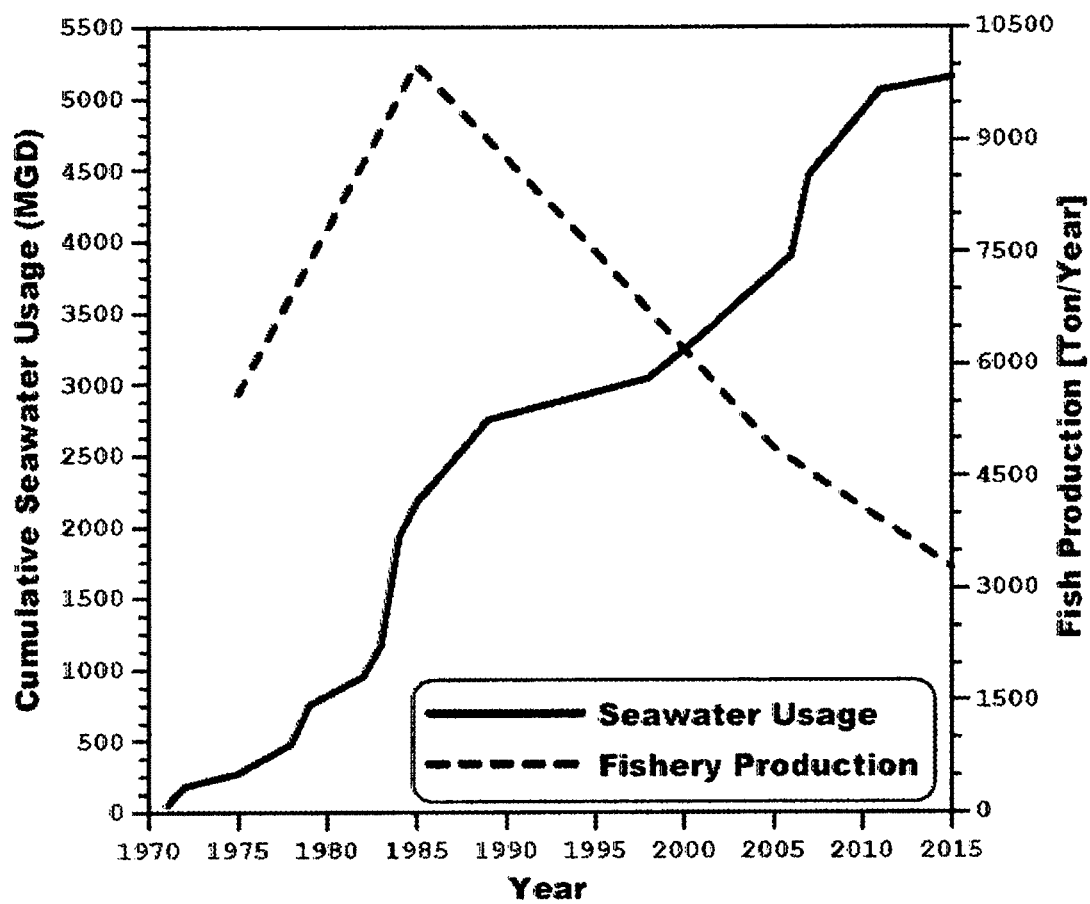
FIG. 14 illustrates the impact of excessive seawater usage in desalination plants on fish production.
Figure 15:
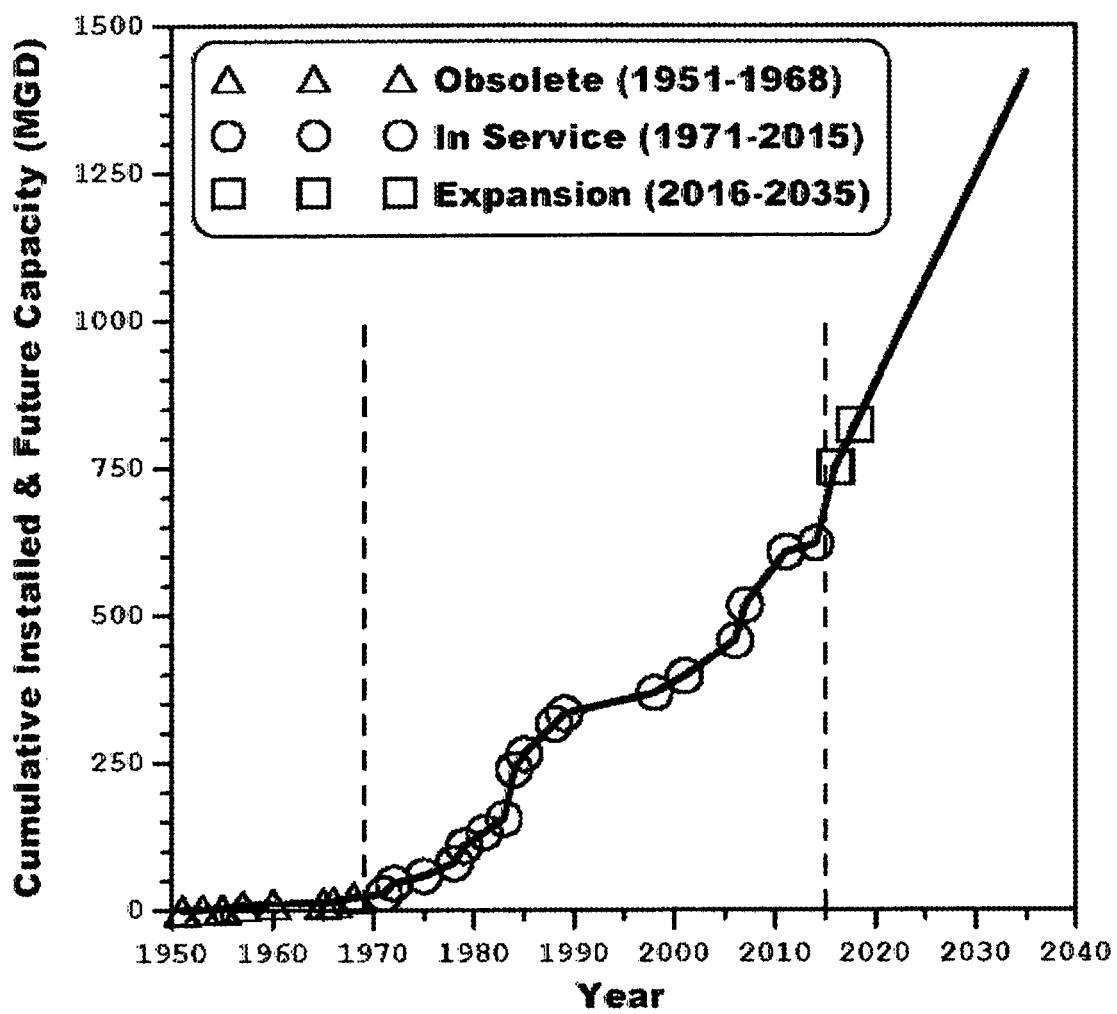
FIG. 15 illustrates past, current and future water demands in Kuwait.

It should also be noted that the once-through heat rejection condenser [T2/HRC] of the vertically arranged FME second train [T2/FME] as shown in FIGS. 20H and 20I, may be replaced with an enhanced type air cooled condenser in order to eliminate or at least minimize rejection of a cooling stream back to the sea. While a conventional air-cooled condenser would have the obvious disadvantage, as shown in FIG. 10, wherein the dry air ambient temperature is much higher than the seawater ambient temperature, an enhanced type may be justifiable since the hot summer extends for about 7 months, thereby it may be able to provide a solution to solve otherwise intractable rejection of a cooling stream.

A vapor compressor (thermally or mechanically driven), if desired, can be integrated with any train in the MBF systems (FIGS. 20A through 20I), for the purposes of getting more heat to cause evaporation, getting enough heat to cause evaporation, getting heat at a temperature suitable for heat exchange on an evaporation surface, and combinations thereof.

De-Scaling of a Source of Water

The de-scaling step [DS] is the key step in the MBF desalination systems as shown in FIGS. 20A through 20I, and described hereinabove. The de-scaling step opens the doors to almost limitless arrangements of the MBF desalination system. The de-scaling step is aimed at removing scale prone species, wherein the scale prone species comprise magnesium, calcium, carbonates (carbonate, bicarbonate, carbonic acid and carbon dioxide), sulfate, strontium, barium, radium, naturally occurring radioactive materials (NORM; radium's decay series), silica, transition metals, and combinations thereof.

Table 1 indicates that the ratio of calcium to magnesium in a source of water (e.g., seawater) is low (about 0.2). On the other hand, the ratio of magnesium to sulfate is about 2. Since the magnesium concentration is nearly double the sulfate concentration in such a source of water, magnesium would be a sufficient and appropriate precipitation sink for sulfate to be precipitated as a useful layered double hydroxides inorganic compound if it was supplemented with an appropriate trivalent cation and a hydroxide source. The structure of such a compound would then stem from the basic structure of magnesium hydroxide, which is the octahedral of magnesium (six-fold coordinated to hydroxyl groups) that share edges to form stacked layers held together by hydrogen bonding. When some of the magnesium is replaced by a trivalent cation with nearly an equivalent ionic radius (e.g., $Al^{+3}$ or $Fe^{+3}$), a net positive charge is permanently generated in the hydroxyl layers. This net positive charge is balanced by an interlayer of negatively charged anions that lies between the magnesium hydroxide-like layers. The free space of the interlayer is filled with water molecules. The structural features of such layered double hydroxides based-compound are thus dictated by the: (1) nature of the magnesium hydroxide-like layer; (2) identity of anions in the interlayer (e.g., sulfate, carbonate, hydroxyl, and chloride); and (3) manner of the magnesium hydroxide-like layers are stacked.

Calcium, as a relatively minor divalent cation in a source of water (e.g., Table 1), may be combined within the structure of the close packed configuration of the hydroxyl groups in the magnesium hydroxide-like layers. However, calcium has a larger ionic radius (0.98 Å) than magnesium (0.65 Å). In order to homogenously fit calcium within the octahedral structure of magnesium hydroxide-like layers, the ratio of calcium to magnesium in a source of water should be relatively low (e.g., about 0.2, Table 1). When a source of water is mixed with an appropriate amount of dolime (MgO—CaO), which is calcined dolomite that may nearly contain equal amounts of magnesia and lime, dolime would contribute nearly equivalent amounts of magnesium and calcium to the source of water. Thus, the ratio of calcium to magnesium in the source of water remains relatively low upon mixing with dolime (e.g., about 0.28).

The de-scaling of a source of water (e.g., Table 1) can thus be conducted in a single precipitation stage, wherein sulfate along with the minor carbonate are precipitated in the form of magnesium as layered double hydroxides, upon the addition of appropriate amounts of a hydroxide source, and an aluminum source or an iron source. The precipitated layered double hydroxides based-compound would thus contain magnesium as the dominant divalent cation, and a trivalent cation (either aluminum or iron) in the outside layers, while their interlayer mainly contains sulfate and water molecules. Within the outside layers, a fraction of the magnesium hydroxide sheets are substituted with either aluminum or iron, which provides permanent positive charge on the hydroxide layers. The positively charged hydroxide layers are counter-balanced by the negatively charged anions (e.g., sulfate, carbonate and hydroxyl) interlayers.

In this invention, there are several industrial advantages for precipitating such layered double hydroxides inorganic compounds from a water source water feed stream (e.g., Table 1). First, their interlayers are highly exchangeable. Second, their exchanged interlayers can be re-activated or re-substituted for reuse. Third, they are valuable precipitating additives since each compound, in itself, constitutes a complete source for a divalent cation (e.g., magnesium), a trivalent cation (aluminum or iron) and hydroxides.

Figure 21A:
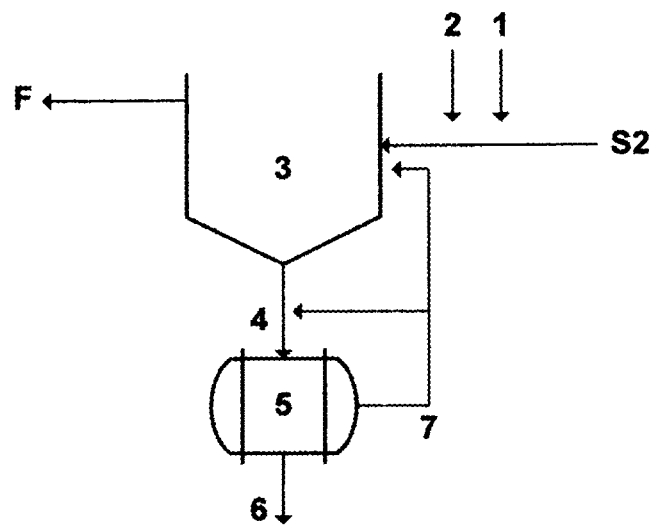
FIG. 21A illustrates a possible flow diagram for the inventive de-scaling method.

Thus, in one embodiment of the de-scaling step, sulfate can be precipitated from a source of water in a single precipitation stage upon mixing with dolime, and aluminum hydroxide or iron hydroxide. Here, the naturally present carbonates (carbon dioxide, carbonic acid, bicarbonate and carbonate) in the source of water are also converted to carbonate ions and precipitated as such. As depicted in FIG. 21A, the combined pre-heated source of water [S2] from each of the heat rejection condensers of each of the MBE trains [T1/TRC, . . . , Tn–1/TRC] and the heat rejection of the MSF last train [Tn/HRS] of the MBF desalination systems (FIGS. 20A through 20I) is mixed with dolime [1], and either aluminum hydroxide or iron hydroxide [2] to form precipitates comprising either magnesium sulfoaluminate (upon mixing with aluminum hydroxide) or magnesium sulfoferrate (upon mixing with iron hydroxide) in a precipitator unit [3]. Dolime [1] is used, as needed, for the essential purpose of adjusting the pH and balance magnesium concentration in the pre-heated source of water [S2] to form the precipitates. The under flow stream [4] of the precipitator unit [3] is directed to a filter [5] to remove the precipitates [6], and the filter's decanted stream [7] is recycled back to the precipitator unit [3], the under flow stream [4] of the precipitator unit, and combinations thereof. The over flow stream [F] from the precipitator unit [3] may be subjected to further filtering and then de-aeration (not shown in FIG. 21A) before it is fed to the trains of the MBF desalination systems (FIGS. 20A through 20I). If desired, the precipitates [6] may be broken down by acid or acid gas to separate aluminum hydroxide or iron hydroxide, thereby recycling such additives for reuse in the de-scaling step.

The precipitation of magnesium sulfoaluminate or magnesium sulfoferrate takes place based on the conditions under which it is effectively precipitated. Based on the inventor's testing, the removal of sulfate from the source of water in the form of either magnesium sulfoaluminate or magnesium sulfoferrate, whether the source of water is pre-heated or at ambient temperature, is consistently about 98%. One structural formula that may generally describe certain embodiments of magnesium sulfoaluminate or magnesium sulfoferrate, which also incorporates the minor divalent anion (carbonate), is as follows:

$$[Mg^{+2}]_A[SO_4^{-2}]_B[M^{+3}]_C[xH_2O]$$

where A is the stoichiometric amount of magnesium ($Mg^{+2}$), B is the stoichiometric amount of sulfate ($SO_4^{-2}$), C is the stoichiometric amount of the trivalent cation ($M^{+3}$; which is either aluminum: $Al^{+3}$ or iron: $Fe^{+3}$), and x is the hydration content. Depending on the amount of sulfate in the source of water, the chemistry of the source of water, and the basicity condition under which sulfate is precipitated in the form of either magnesium sulfoaluminate or magnesium sulfoferrate, the stoichiometric ratio (meq./L) of sulfate to magnesium (B/A) may be in the order of 0.1 to 0.6, the stoichiometric ratio (meq./L) of sulfate to the trivalent cation (B/C) may be in the order of 0.4 to 1.1, and the hydration content (x) may be in the order of 1.0 to 1.5.

Figure 21B:
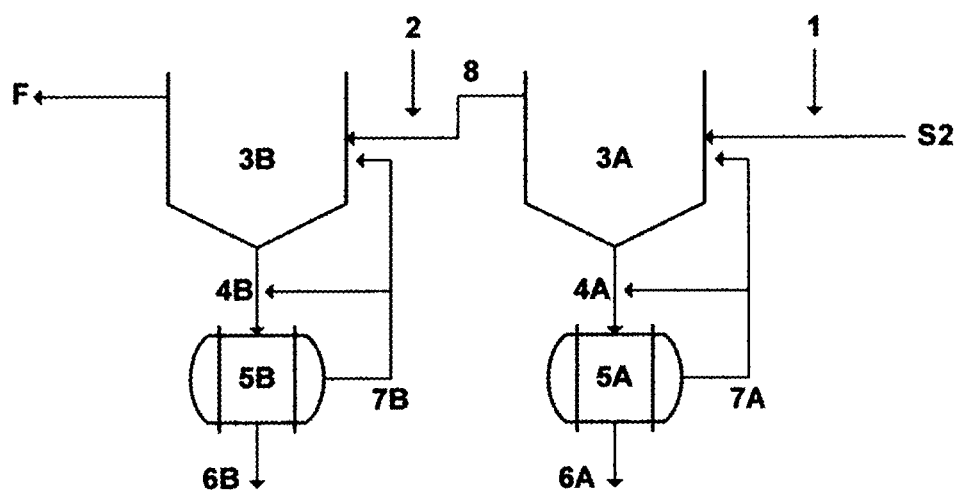
FIG. 21B illustrates another possible flow diagram for the inventive de-scaling method.

In another embodiment, magnesium and sulfate can be precipitated from a source of water in dual precipitation stages, wherein magnesium is precipitated in the first stage upon mixing with dolime, and then sulfate is precipitated in the second stage upon mixing either aluminum hydroxide or iron hydroxide. As shown in FIG. 21B, the combined pre-heated source of water [S2] from each of the heat rejection condensers of each of the MBE trains [T1/TRC, . . . , Tn−1/TRC] and the heat rejection of the MSF last train [Tn/HRS] of the MBF desalination systems (FIGS. 20A through 20I) is mixed with dolime [1] to form first precipitates comprising magnesium hydroxide in a first precipitator unit [3A]. Dolime [1] is used, to a needed extent, for the essential purpose of precipitating at least a portion of magnesium (e.g., may be 50-70%) from the pre-heated source of water [S2] in the form of hydroxide, and along with it precipitating an equivalent amount of magnesium hydroxide from the added dolime [1] itself. The under flow stream [4A] of the first precipitator unit [3A] is directed to a first filter [5A] to remove the first precipitates [6A] comprising magnesium hydroxide, and the first filter's decanted stream [7A] is recycled back to the first precipitator unit [3A], the under flow stream [4A] of the first precipitator unit, and combinations thereof. The over flow stream [8] from the first precipitator unit [3A] is then mixed with either aluminum hydroxide or iron hydroxide [2] to form second precipitates comprising either calcium sulfoaluminate (upon mixing with aluminum hydroxide) or calcium sulfoferrate (upon mixing with iron hydroxide) in a second precipitator unit [3B]. Dolime [1] may be added, as needed, to the over flow stream [8] from the first precipitator unit [3A] (not shown in FIG. 21B) for the purpose of adjusting the pH and balancing the calcium concentration to form the second precipitates. The under flow stream [4B] of the second precipitator unit [3B] is directed to a second filter [5B] to remove the second precipitates [6B], and the second filter's decanted stream [7B] is recycled back to the second precipitator unit [3B], the under flow stream [4B] of the second precipitator unit, and combinations thereof. The over flow stream [F] from the second precipitator unit [3B] may be subjected to further fine filtering and then de-aeration (not shown in FIG. 21B) before it is fed to the trains of the MBF desalination systems (FIGS. 20A through 20I). If desired, the second precipitates [6A] may be broken down by acid or acid gas to separate aluminum hydroxide or iron hydroxide, thereby recycling such additives for reuse in the second precipitator unit [3B].

The precipitation of calcium sulfoaluminate or calcium sulfoferrate takes place based on the conditions under which it is effectively precipitated. Based on the inventor's testing, the removal of sulfate from the source of water in the form of either calcium sulfoaluminate or calcium sulfoferrate, whether the source of water is pre-heated or at ambient temperature, is consistently over 97%. One structural formula that may generally describe certain embodiments of calcium sulfoaluminate or calcium sulfoferrate, which also incorporates the minor divalent anion (carbonate), is as follows:

$$[Ca^{+2}]_A[SO_4^{-2}]_B[M^{+3}]_C[xH_2O]$$

where A is the stoichiometric amount of calcium ($Ca^{+2}$), B is the stoichiometric amount of sulfate ($SO_4^{-2}$), C is the stoichiometric amount of the trivalent cation ($M^{+3}$; which is either aluminum: $Al^{+3}$ or iron: $Fe^{+3}$), and x is the hydration content. Depending on the amount of sulfate in a source of water, the chemistry of the source of water, and the basicity condition under which sulfate is precipitated in the form of either calcium sulfoaluminate or calcium sulfoferrate, the stoichiometric ratio (meq./L) of sulfate to calcium (B/A) may be in the order of 0.2 to 0.5, the stoichiometric ratio (meq./L) of sulfate to the trivalent cation (B/C) may be in the order of 0.5 to 1.5, and the hydration content (x) may be in the order of 24 to 32.

The net charge of a NF membrane surface is characterized by the iso-electric point (IEP), wherein the IEP is a function of a source water pH. The net charge of a NF membrane surface is zero at the IEP, thereby the NF membrane surface is positively charged below the IEP, and negatively charged above the IEP. At a lower pH range (e.g., 2.5 to 5.5), depending of the type of a NF membrane surface, the rejection of positively charged divalent and trivalent cations can be maximized since the NF membrane surface is positively charged, which repels such cations, thereby their rejection is nearly approaching (96-98%) the rejection of negatively charged divalent and trivalent anions. However, this demands reducing the recovery ratio (RR) below the maximum possible (e.g., 75% in treating seawater by NF) in order to avoid sulfate scale build-up at the NF membrane surface.

Thus, in a further embodiment, a source of water is acidified by using either an aluminum source or an iron source to reduce the pH of the source of water, thereby maximizing the rejection of divalent and trivalent cations by a NF membrane. Since a standalone NF system requires de-aeration as a must pre-treatment step to remove residual chlorine (to prevent membranes' oxidation) and oxygen (to prevent biological growth within the membranes), an additional benefit of using the aluminum source or the iron source as an acidic additive is to convert the naturally present carbonates in the source of water to carbon dioxide prior to de-aeration, thereby carbon dioxide can be removed by the de-aerator of the NF system. Yet, a further mutual benefit is that by using the aluminum source or the iron source, the carried over trivalent cation (either aluminum or iron) with the de-carbonated source water to NF would be equally highly rejected by NF, thereby it is equally concentrated in the NF reject stream, wherein the concentrated trivalent cation is further utilized to de-scale the NF reject stream.

Figure 21C:
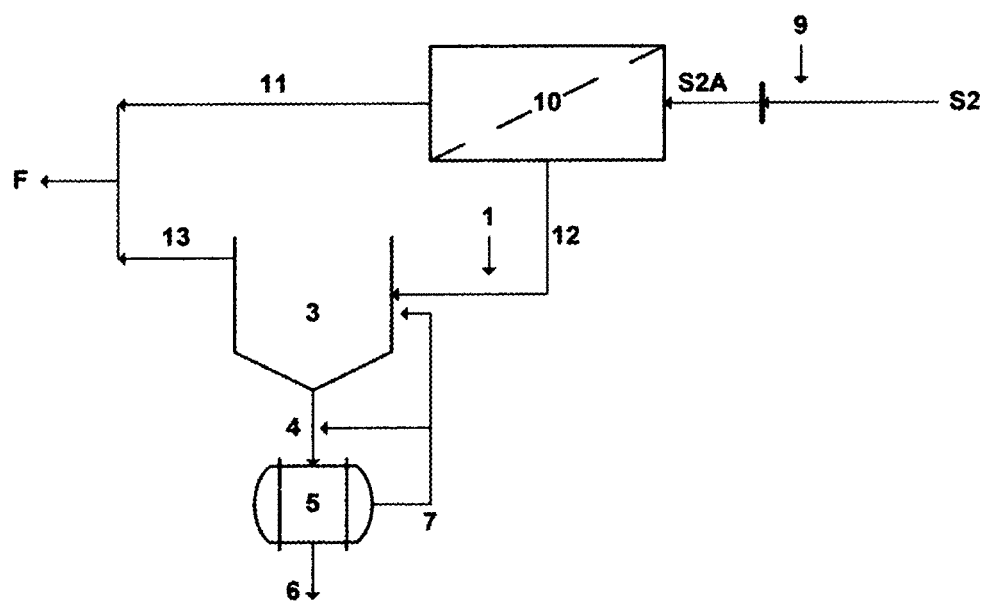
FIG. 21C illustrates a further possible flow diagram for the inventive de-scaling method.

As such, FIG. 21C depicts this embodiment, wherein NF is enabled and converted to a zero-liquid discharge (ZLD) system. Here, the combined pre-heated source of water [S2] from each of the heat rejection condensers of each of the MBE trains [T1/TRC, . . . , Tn−1/TRC] and the heat rejection of the MSF last train [Tn/HRS] of the MBF desalination systems (FIGS. 20A through 20I) is mixed with either an aluminum source or an iron source [9] to convert at least a portion of the naturally present carbonates in the pre-heated source of water [S2] to carbon dioxide, and to remove carbon dioxide by a de-aerator (not shown in FIG. 21C). The aluminum source is selected from the group consisting of aluminum chloride, aluminum chlorohydrate, aluminum nitrate, aluminum sulfate, aluminum acetate, aluminum formate, and combinations thereof. The iron source is selected from the group consisting of iron chloride, iron chlorohydrate, iron nitrate, iron sulfate, iron acetate, iron formate, and combinations thereof. Other aluminum sources or iron sources may also be used in this invention. The de-carbonated source of water [2SA] is then fed to the NF unit [10], wherein the NF unit is operated at a pre-selected RR, to produce a NF product stream [11] and a NF reject stream [12]. The NF reject stream [12], which carries the nearly equally highly rejected magnesium, calcium, sulfate, and the trivalent cation (carried over aluminum from the aluminum source, or carried over iron from the iron source), is mixed with dolime [1] to form precipitates comprising either magnesium calcium sulfoaluminate (upon mixing with the aluminum source) or magnesium calcium sulfoferrate (upon mixing with the iron source) in a precipitator unit [3]. Other hydroxide sources such as sodium hydroxide, potassium hydroxide, and the like may also be used in the invention. The under flow stream [4] of the precipitator unit [3] is directed to a filter [5] to remove the precipitates [6], and the filter's decanted stream [7] is recycled back to the precipitator unit [3], the under flow stream [4] of the precipitator unit, and combinations thereof. The over flow stream [13] from the precipitator unit [3] may be subjected to further filtering (not shown in FIG. 21C) before it is merged with the NF product stream [11] to form the feed stream [F]. The feed stream [F] may be subjected to further de-aeration (not shown in FIG. 21C) before it is fed to the trains of the MBF desalination systems (FIGS. 20A through 20I).

Acids may also replace aluminum sources or iron sources in this invention, and a NF reject brine stream will be subjected to the same de-scaling method as described in Paragraph [0153].

The de-scaling methods, as shown in FIGS. 21A through 21C and described above, can also be used to provide feed streams for hydrocarbons recovery (e.g., oil-wells water injection operations, heavy oil steam injection operations, and the like).

As a result of the de-scaling methods (FIGS. 21A through 21C), the discharged brine stream [Tn/B] from the MBF desalination systems (FIGS. 20A through 20I) is subsequently depleted of scale prone species as well as oxygen. Such a reject brine stream can be readily used as a stream in applications comprising hydrocarbons recovery, chlor-alkali industries, road de-icing salts, and the like.

Since the feed stream [F] from the de-scaling methods (FIGS. 21A through 21C) is mildly basic, a slip stream of this feed stream can be used to scrub flue from a power-water co-generation plant as described, for example, in the inventor's U.S. patent application Ser. Nos. 15/731,626 and 14/544,835.

The inventive de-scaling methods (FIGS. 21A through 21C) can also be used in conjunction with any standalone desalination method and combinations of desalination methods in any arrangement. The desalination method is selected from the group consisting of recycle-brine multi-stage flash (RB-MSF) desalination, once-through multi-stage flash (OT-MSF) desalination, multi-effect distillation, thermal vapor compression, mechanical vapor compression, vacuum membrane distillation, membrane distillation, osmotic membrane distillation, reverse osmosis, forward osmosis, pervaporation, electrodialysis, and combinations thereof.

TABLE 1

Natural Composition and Altered Composition of Seawater.

| | Seawater (SW) Natural Composition | | | | | SW Altered Composition | |
| --- | --- | --- | --- | --- | --- | --- | --- |
| Ion | mg/L | wt % | mol/kg ($m_{ion}$) | $m_{ion}/m_{Cl}$ | meq/L | meq/L* (mg/L) | meq/L** (mg/L) |
| $Na^+$ | 12,173 | 1.2173 | 0.5169 | 0.8690 | 529.5 | 592.6 | 631.7 |
| $K^+$ | 423 | 0.0423 | 0.0106 | 0.0178 | 10.8 | 13.4 | 15.6 |
| $Mg^{+2}$ | 1,529 | 0.1529 | 0.0614 | 0.1032 | 125.8 | 155.2 | 176.5 |
| $Ca^{+2}$ | 530 | 0.0530 | 0.0129 | 0.0217 | 26.5 | 33.4 | 35.0 |
| $Sr^{+2}$ | 5 | 0.0005 | 0.0006 | 0.0010 | 0.11 | 0.16 | 0.18 |
| $Cl^-$ | 21,600 | 2.1600 | 0.5948 | 1.0000 | 609.3 | 720.7 | 781.6 |
| $HCO_3^-$ | 140 | 0.0140 | 0.0022 | 0.0037 | 2.3 | 2.4 | 2.4 |
| $SO_4^{-2}$ | 3,100 | 0.3100 | 0.0315 | 0.0530 | 64.5 | 78.5 | 85.4 |
| TDS | 39,500 | 3.9500 | 1.2310 | | 1,368.8 | 1,596.4 (46,200) | 1,728.4 (49,950) |
| pH | 7.9-8.1 | | | | | | |
| $MgCl_2/\Sigma Mg$ | | | | | | 0.68 | 0.69 | 0.70 |
| $Ca^{+2}/SO_4^{-2}$ | | | | | | 0.41 | 0.43 | 0.41 |
| $Ca^{+2}/Mg^{+2}$ | | | | | | 0.21 | 0.21 | 0.20 |
| $Mg^{+2}/SO_4^{-2}$ | | | | | | 1.95 | 2.00 | 2.07 |

*after 3 years of operating a RB-MSF plant;
**after 7 years of operating the same plant.

TABLE 2

Performance Simulation of Flash Stages in a RB-MSF Train.

| # | A | B | C | D | E | F | G | H | I | J | K |
| --- | --- | --- | --- | --- | --- | --- | --- | --- | --- | --- | --- |
| 0 | 5,937.3 | 0 | 0 | 0 | 1.90 | 110.0 | | | | | 56,100 |
| S1 | 5,903.2 | 33.6 | 0.566 | 33.0 | 1.24 | 106.8 | 0.99 | 0.132 | 105.6 | 103.5 | 56,424 |

TABLE 2-continued

Performance Simulation of Flash Stages in a RB-MSF Train.

| # | A | B | C | D | E | F | G | H | I | J | K |
|---|---|---|---|---|---|---|---|---|---|---|---|
| S2 | 5,869.3 | 33.5 | 0.567 | 66.3 | 1.10 | 103.5 | 0.98 | 0.152 | 102.4 | 100.3 | 56,749 |
| S3 | 5,835.8 | 33.1 | 0.564 | 99.6 | 0.98 | 100.3 | 0.97 | 0.162 | 99.2 | 97.0 | 57,075 |
| S4 | 5,802.5 | 32.8 | 0.562 | 132.3 | 0.87 | 97.0 | 0.95 | 0.173 | 95.9 | 93.8 | 57,401 |
| S5 | 5,769.5 | 32.4 | 0.559 | 164.8 | 0.77 | 93.8 | 0.94 | 0.174 | 92.6 | 90.5 | 57,726 |
| S6 | 5,737.0 | 32.1 | 0.556 | 196.7 | 0.68 | 90.5 | 0.93 | 0.194 | 89.4 | 87.3 | 58,052 |
| S7 | 5,704.8 | 31.7 | 0.553 | 227.8 | 0.60 | 87.3 | 0.92 | 0.215 | 86.1 | 84.0 | 58,379 |
| S8 | 5,672.9 | 31.4 | 0.551 | 259.4 | 0.53 | 84.0 | 0.90 | 0.227 | 82.9 | 80.8 | 58,708 |
| S9 | 5,641.3 | 31.1 | 0.548 | 290.5 | 0.47 | 80.8 | 0.89 | 0.238 | 79.6 | 77.5 | 59,037 |
| S10 | 5,607.4 | 30.8 | 0.545 | 321.0 | 0.41 | 77.5 | 0.88 | 0.260 | 76.4 | 74.3 | 59,363 |
| S11 | 5,579.7 | 30.1 | 0.536 | 351.2 | 0.36 | 74.3 | 0.86 | 0.282 | 73.2 | 71.0 | 59,688 |
| S12 | 5,549.4 | 29.7 | 0.532 | 380.4 | 0.31 | 71.1 | 0.85 | 0.315 | 70.0 | 67.8 | 60,013 |
| S13 | 5,519.8 | 29.2 | 0.527 | 409.5 | 0.27 | 67.9 | 0.84 | 0.319 | 66.8 | 64.6 | 60,335 |
| S14 | 5,490.6 | 28.7 | 0.521 | 438.4 | 0.24 | 64.8 | 0.83 | 0.353 | 63.6 | 61.4 | 60,655 |
| S15 | 5,462.0 | 28.2 | 0.514 | 466.4 | 0.20 | 61.6 | 0.81 | 0.399 | 60.4 | 58.2 | 60,972 |
| S16 | 5,434.0 | 27.7 | 0.506 | 494.1 | 0.18 | 58.5 | 0.80 | 0.456 | 57.3 | 55.1 | 61,287 |
| S17 | 5,406.6 | 27.2 | 0.500 | 520.5 | 0.15 | 55.5 | 0.79 | 0.465 | 54.2 | 52.0 | 61,598 |
| S18 | 5,379.9 | 26.2 | 0.484 | 546.6 | 0.13 | 52.5 | 0.78 | 0.535 | 51.1 | 48.9 | 61,903 |
| S19 | 5,354.1 | 25.4 | 0.472 | 571.8 | 0.11 | 49.6 | 0.77 | 0.618 | 48.1 | 45.9 | 62,201 |
| S20 | 5,328.9 | 24.9 | 0.465 | 596.8 | 0.10 | 46.7 | 0.75 | 0.675 | 45.2 | 43.0 | 62,495 |
| S21 | 5,310.0 | 18.7 | 0.350 | 614.5 | 0.09 | 44.5 | 0.74 | 0.847 | 42.9 | 40.5 | 62,721 |
| S22 | 5,290.9 | 18.9 | 0.356 | 633.4 | 0.08 | 42.3 | 0.73 | 0.947 | 40.5 | 38.0 | 62,962 |
| S23 | 5,270.6 | 19.7 | 0.375 | 652.8 | 0.07 | 39.9 | 0.72 | 0.700 | 38.2 | 35.5 | 63,199 |

: Flash Stage Number; A: Flashing Brine Existing Stage (kg/s); B: Distillate per Stage (kg/s); C: Distillate Flash Fraction (%); D: Distillate Existing Stage (kg/s); E: Stage Pressure (bara); F: Flashing Brine Temperature (° C.); G: Boiling Point Elevation (° C.); H: Combined Losses (° C.) including Non-Equilibrium, Demister & Tube Bundle; I: Vapor Temperature (° C.); J: Brine Temperature Existing Stage (° C.); and K: TDS of Flashing Brine (mg/L).

TABLE 3

Simulation Results of a RB-MSF Train at 33° C. SWAT and 100% Load.

| Stream | Flow (kg/s) | TDS (mg/L) | T (° C.) | P (bara) | Specific Exergy (kJ/kg) | Total Exergy (kW) |
|---|---|---|---|---|---|---|
| 1 | 59.3 | 0 | 239.8 | 3.5 | 678.58 | 40,270.42 |
| 2 | 59.3 | 0 | 237.0 | 1.93 | 595.31 | 35,328.81 |
| 3 | 68.8 | 0 | 119.0 | 1.93 | 519.08 | 35,678.29 |
| 4 | 6.8 | 0 | 118.5 | 14.5 | 35.87 | 242.85 |
| 5 | 61.9 | 0 | 118.5 | 14.5 | 35.87 | 2,221.27 |
| 6 | 61.9 | 0 | 118.5 | 14.2 | 35.84 | 2,219.64 |
| 7 | 4.5 | 0 | 340.0 | 10-15 | 962.29 | 4,298.42 |
| 8 | 4.5 | 0 | 340.0 | 9.0 | 898.12 | 4,011.78 |
| 9 | 2.6 | 0 | 340.0 | 9.0 | 898.12 | 2,367.20 |
| 10 | 1.8 | 0 | 340.0 | 9.0 | 898.12 | 1,644.58 |
| 10A | 2.8 | 0 | 340.0 | 9.0 | 898.12 | 2,491.78 |
| 11A | 5,937.3 | 56,100 | 40.1 | 0.07 | 0.3755 | 2,229.63 |
| 11 | 5,937.3 | 56,100 | 40.1 | 9.5 | 1.2877 | 7,644.26 |
| 12 | 5,937.3 | 56,100 | 103.5 | 2.3 | 28.1303 | 167,018.2 |
| 13 | 5,937.3 | 56,100 | 110.0 | 1.9 | 33.0819 | 196,417.5 |
| 14A | 1,778.4 | 39,500 | 40.4 | 3.2 | 0.5671 | 1,008.51 |
| 14B | 1,778.4 | 39,500 | 40.4 | 1.5 | 0.4007 | 712.55 |
| 14 | 1,778.4 | 39,500 | 40.4 | 0.1 | 0.2636 | 468.81 |
| 15A | 1,111.7 | 63,199 | 39.9 | 0.07 | 0.4917 | 546.57 |
| 15 | 1,111.7 | 63,199 | 39.9 | 2.0 | 0.6773 | 752.98 |
| 16A | 652.0 | <25 | 38.2 | 0.07 | 1.7737 | 1,156.54 |
| 16 | 652.0 | <25 | 38.2 | 14.3 | 3.2069 | 2,091.09 |
| 17A | 6,103.8 | 39,500 | 33.0 | 1.013 | 0.0 | 0.0 |
| 17 | 6,103.8 | 39,500 | 33.0 | 3.4 | 0.2330 | 1,422.35 |
| 18 | 832.3 | 39,500 | 33.0 | 3.2 | 0.2135 | 177.71 |
| 19 | 832.3 | 39,500 | 41.0 | 3.2 | 0.6262 | 521.18 |
| 20 | 5,271.4 | 39,500 | 33.0 | 3.2 | 0.2135 | 1,125.47 |
| 21A | 3,493.0 | 39,500 | 40.4 | 3.2 | 0.5671 | 1,980.83 |
| 21 | 3,493.0 | 39,500 | 40.4 | 2.2 | 0.4692 | 1,638.89 |
| 22 | 2.7E-2 | 0.15 | Ambient | 4.0 | 0.3003 | 0.08 |
| 23 | 1.1E-1 | 3.0 | Ambient | 4.0 | 0.3003 | 0.03 |
| 24 | 5.3E-2 | 1.5 | Ambient | 4.0 | 0.3003 | 0.02 |
| 25 | 1.0E-1 | 0 | 119.0 | 1.9 | 516.9526 | 53.07 |
| 26 | 7.4E-1 | 0 | 105.6 | 1.2 | 449.2140 | 330.27 |
| 27 | 6.7E-1 | 0 | 86.1 | 0.6 | 347.2600 | 231.23 |
| 28 | 6.1E-1 | 0 | 70.0 | 0.3 | 246.7369 | 149.92 |
| 29 | 9.0E-1 | 0 | 42.9 | 0.1 | 57.4952 | 51.84 |
| 30 | 4.1E-1 | 0 | 38.2 | 0.1 | 16.7514 | 6.83 |
| 31 | 9.2E-1 | 0 | 42.5 | 0.1 | 57.4714 | 52.62 |
| 32 | 2.0 | 0 | 88.4 | 0.3 | 251.4563 | 505.79 |

TABLE 4

Exergy Analysis of a RB-MSF Train (Based on Table 3).

| Description | Specific Exergy (kJ/kg) | Total Exergy (kW) |
|---|---|---|
| A. Total Energy Input (Thermal & Work): | 1,645.8184 | 56,921.55 |
| Thermal Energy (Steam): | 1,640.89 | 44,568.83 |
| L.P. Steam | 678.59 | 40,270.42 |
| M.P. Steam | 962.29 | 4,298.41 |
| Work Energy (Pumps): | 4.94 | 12,352.72 |
| Irreversibility (65% Efficiency) | 1.73 | 4,323.46 |
| Pumps | 3.21 | 8,029.26 |
| Total Seawater Feed | 0.23 | 1,422.35 |
| Recycle Brine (RB) | 0.62 | 5,414.62 |
| Distillate (D) | 1.43 | 934.55 |
| Reject Brine (RJB) | 0.19 | 206.41 |
| Return Condensate (RC) | 0.75 | 51.33 |
| B. Total Energy Destruction: | 1,642.92 | 53,988.82 |
| Steam Destroyed in Letdown Valves | 147.44 | 5,228.24 |
| L.P. Steam Letdown Valve (SLV) | 83.27 | 4,941.61 |
| M.P. Steam Letdown Valve (SLV) | 64.17 | 286.63 |
| L.P./M.P. Steam Destroyed in De-Super. (DSH) | 1,010.22 | 2,251.57 |
| Energy Consumed in BH (—) | 73.84 | 3770.78 |
| Energy Destroyed in HGS (—) | 1,040.18 | 30,496.92 |
| Energy Destroyed in HRS (—) | 74.16 | 448.78 |
| Energy Destroyed in Vacuum De-aerator (VD) | 0.76 | 243.07 |
| Energy Destroyed in Ejectors/ Condensers (E/C) | 1,133.19 | 1,434.46 |
| Energy Destroyed in B (—) | 0.68 | 752.98 |

TABLE 4-continued

Exergy Analysis of a RB-MSF Train (Based on Table 3).

| Description | Specific Exergy (kJ/kg) | Total Exergy (kW) |
|---|---|---|
| Energy Destroyed in D (—) | 3.21 | 2,091.09 |
| Energy Destroyed in RCSW-HRS (—) | 0.47 | 1,638.89 |
| Energy Destroyed in RCSW-E/C (—) | 0.53 | 439.68 |
| Energy Destroyed in Combining Vents 26 & 27 | 545.02 | 55.71 |
| Energy Destroyed in Pumps' Irreversibility (—) | 1.73 | 4,323.46 |
| Energy Destroyed in Pumps' TV | 1.08 | 840.21 |
| C. Minimum Energy Requirement: | | 2,844.07 |
| D. Train's Efficiency: [C/A](%) | | 0.05 (5.0%) |

TABLE 5

Exergy Comparisons of TVC-MED Trains and a RB-MSF Train.

| | Total Exergy Input (kW) | | |
|---|---|---|---|
| Description | TVC-MED* | TVC-MED** | RB-MSF |
| Number of Effects or Stages | 2 × 6 | 2 × 4 | 20 + 3 |
| A. Thermal Energy Input (Steam) | 44,206.2 | 77,125.9 | 44,568.8 |
| L.P. Steam | 40,678.2 | | 40,270.4 |
| M.P. Steam | 3,528.0 | 77,125.9 | 4,298.4 |
| B. Work Energy Input (Pumps) | 4,819.4 | 4,819.4 | 12,352.7 |
| Irreversibility (65% Efficiency) | 1,249.5 | 1,249.5 | 4,323.5 |
| Pumps | 3,570.0 | 3,570.0 | 8,029.3 |
| Total Seawater Feed | 1,422.4 | 1,422.4 | 1,422.4 |
| Seawater Feed Makeup | 801.3 | 801.3 | None |
| Recycle Brine | None | None | 5,414.6 |
| Distillate | 934.6 | 934.6 | 934.6 |
| Reject Brine | 309.1 | 309.1 | 206.4 |
| Return Condensate | 51.3 | 51.3 | 51.3 |
| Return Condensate from ST | 41.5 | 41.5 | None |
| C. Total Energy Input (A + B) | 49,025.6 | 81,945.3 | 56,921.6 |

*L.P. Steam Input @ 2.7 bara & 164° C.;
**M.P. Steam Input @ 20 bara & 404° C.

What is claimed is:

1. A method for desalinating a feed stream of a water source to produce a cumulative distillate stream and a reject brine stream, said method comprising:

a Brine Forward (BF) desalination system, which comprises a plurality of trains arranged in series and alternated in pairs of opposing feed evaporation modes, wherein each pair comprises a leading backward fed multi-effect (BME) train and a following forward fed multi-effect (FME) train, wherein each of said trains comprises a heat rejection condenser and a number of effects, wherein said effects are serially connected and horizontally arranged, wherein each of said effects comprises a boiling zone, wherein said boiling zone comprises spray nozzles and boiling tubes, wherein a first effect in each of said trains is the highest temperature and pressure effect, wherein a last effect in each of said trains is the lowest temperature and pressure effect, wherein each of said trains produces a distillate stream and a brine stream, wherein said water source is pre-heated in each said heat rejection condenser to produce a pre-heated water source, wherein at least a portion of said pre-heated water source is de-scaled to produce said feed stream, and an input feed arrangement, which comprises flowing said feed stream to a boiling zone of only a BME first train, and thereafter applying a brine flow sequence, wherein a brine stream from a proceeding train flows as an input feed to a boiling zone of a next succeeding train;

thereby said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and total dissolved solids (TDS);

wherein the brine stream of said BME first train is supplied as said input feed to the boiling zone through the spray nozzles and sprayed onto the boiling tubes of the first effect of a FME second train, which is the highest temperature effect, and after partial evaporation, is pumped to the boiling zone of each lower temperature effect in turn, and is discharged as the brine stream from the boiling zone of the last effect of said FME second train at the lowest temperature and the highest TDS; and thereafter said brine flow sequence, which is flowing said brine stream from said proceeding train as said input feed to said boiling zone of said next succeeding train, is successively maintained through the remainder of the series to a FME last train, wherein the brine stream from said FME last train is discharged as said reject brine stream.

2. The method of claim 1, comprising the step of de-scaling at least a portion of said pre-heated water source by mixing said pre-heated water source with dolime, and aluminum hydroxide or iron hydroxide, to form a precipitate comprising magnesium sulfoaluminate or magnesium sulfoferrate in a precipitator unit; and filtering said precipitate by a filter to produce said feed stream.

3. The method of claim 1, further comprising the step of de-scaling at least a portion of said pre-heated water source by: (a) mixing said pre-heated water source with dolime to form a first precipitate comprising magnesium hydroxide in a first precipitator unit, and filtering said first precipitate by a first filter to produce a first feed stream; and (b) mixing said first feed stream with aluminum hydroxide or iron hydroxide to form a second precipitate comprising calcium sulfoaluminate or calcium sulfoferrate in a second precipitator unit, and filtering said second precipitate by a second filter to produce said feed stream.

4. The method of claim 1, further comprising the step of de-scaling at least a portion of said pre-heated water source by: (a) mixing said pre-heated water source with an aluminum source selected from the group consisting of aluminum chloride, aluminum chlorohydrate, aluminum nitrate, aluminum sulfate, aluminum acetate, aluminum formate, and combinations thereof; or an iron source selected from the group consisting of iron chloride, iron chlorohydrate, iron nitrate, iron sulfate, iron acetate, iron formate, and combinations thereof; to convert at least a portion of carbonates to carbon dioxide; (b) removing at least said carbon dioxide by a de-aerator to produce at least a de-carbonated water source; (c) feeding said de-carbonated water source to a nanofiltration (NF) unit to produce a NF product stream and a NF reject stream; (d) mixing said NF reject stream with dolime to form a precipitate comprising magnesium sulfoaluminate or magnesium sulfoferrate in a precipitator unit, and filtering said precipitate by a filter to produce a NF de-scaled reject stream; and (e) combining said NF product stream with said NF de-scaled reject stream to produce said feed stream.

5. The method of claim 1, further comprising the step of reducing the number of said trains to one pair.

6. The method of claim 1, further comprising the steps of: (a) replacing said heat rejection condenser with an enhanced-type air cooled condenser; and/or (b) integrating a compression device for the purpose of getting more heat to cause evaporation, getting enough heat to cause evaporation, getting heat at a temperature suitable to heat exchanging on said boiling tubes, and combinations thereof.

7. The method of claim 1, further comprising the steps of: (a) providing parallel heated feed through each of said BME trains; and (b) applying a Mixed Brine Forward (MBF) desalination system to produce said cumulative distillate stream and said reject brine stream, which comprises:

a plurality of said trains arranged in series and alternated in pairs of opposing feed evaporation modes, wherein each said pair comprises said leading BME train and said following FME train, wherein each of said trains comprises said heat rejection condenser and said number of effects, wherein said effects are serially connected and horizontally arranged, wherein each of said effects comprises said boiling zone, wherein said boiling zone comprises said spray nozzles and said boiling tubes, wherein each of said effects of each of said BME trains further comprises a heating zone, wherein said heating zone comprises heating tubes, wherein said first effect of each of said trains is the highest temperature and pressure effect, wherein said last effect of each of said trains is the lowest temperature and pressure effect, wherein each of said trains produces said distillate stream and said brine stream, wherein said water source is pre-heated in each said heat rejection condenser to produce said pre-heated water source, wherein at least a portion of said pre-heated water source is de-scaled to produce said feed stream, and said input feed arrangement, which comprises: (i) dividing said feed stream into a main portion and slip portions, wherein said main portion is only supplied to the boiling zone of the last effect of said BME first train, wherein each of said slip portions is supplied to the heating zone of the last effect of each of said BME trains; and (ii) applying: (a) a mixed brine flow sequence, wherein a mixed brine stream of a proceeding BME train flows as said input feed to a boiling zone of a first effect of a next succeeding FME train; and (b) a brine flow sequence, wherein a brine stream of a proceeding FME train flows as said input feed to a boiling zone of a last effect of a next succeeding BME train;

thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS;

wherein a slip portion of said feed stream is flown to the heating zone through the heating tubes of the last effect of said BME first train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said BME first train at the highest temperature;

wherein the brine stream and the parallel heated feed of said BME first train are mixed to form a mixed brine stream, wherein the mixed brine stream is supplied as said input feed to the boiling zone through the spray nozzles and sprayed onto the boiling tubes of the first effect of a FME second train, which is the highest temperature effect, and after partial evaporation, is pumped to the boiling zone of each lower temperature effect in turn, and is discharged as the brine stream from the boiling zone of the last effect of said FME second train at the lowest temperature and the highest TDS; and thereafter: (a) said mixed brine flow sequence, which is flowing said mixed brine stream of said proceeding BME train as said input feed to said boiling zone of said first effect of said next succeeding FME train; and (b) said brine flow sequence, which is flowing said brine stream of said proceeding FME train as said input feed to said boiling zone of said last effect of said next succeeding BME train; are successively maintained through the remainder of the series to said FME last train, wherein the brine stream from said FME last train is discharged as said reject brine stream.

8. The method of claim 1, further comprising the steps of: (a) providing parallel heated feed through each of said FME trains; and (b) applying a Mixed Brine Forward (MBF) desalination system to produce said cumulative distillate stream and said reject brine stream, which comprises:

a plurality of said trains arranged in series and alternated in pairs of opposing feed evaporation modes, wherein each said pair comprises said leading BME train and said following FME train, wherein each of said trains comprises said heat rejection condenser and said number of effects, wherein said effects are serially connected and horizontally arranged, wherein each of said effects comprises said boiling zone, wherein said boiling zone comprises said spray nozzles and said boiling tubes, wherein each of said effects of each of said FME trains further comprises a heating zone, wherein said heating zone comprises heating tubes, wherein said first effect of each of said trains is the highest temperature and pressure effect, wherein said last effect of each of said trains is the lowest temperature and pressure effect, wherein each of said trains produces said distillate stream and said brine stream, wherein said water source is pre-heated in each said heat rejection condenser to produce said pre-heated water source, wherein at least a portion of said pre-heated water source is de-scaled to produce said feed stream, and said input feed arrangement, which comprises: (i) dividing said feed stream into a main portion and slip portions, wherein said main portion is supplied to the boiling zone of the last effect of said BME first train, wherein each of said slip portions is supplied to the heating zone of the last effect of each of said FME trains; and (ii) applying: (a) a mixed brine flow sequence, wherein a mixed brine stream of a proceeding BME train flows as an input feed to a boiling zone of a first effect of a next succeeding FME train; and (b) a brine flow sequence, wherein a brine stream of a proceeding FME train flows as an input feed to a boiling zone of a last effect of a next succeeding BME train;

thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS;

wherein a slip portion of said feed stream is supplied to the heating zone through the heating tubes of the last effect of a FME second train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said FME second train at the highest temperature;

wherein the brine stream of said BME first train is mixed with the parallel heated feed of said FME second to form a mixed brine stream, wherein the mixed brine stream is supplied as said input feed to the boiling zone through the spray nozzles and sprayed onto the boiling tubes of the first effect of said FME second train, which is the highest temperature effect, and after partial evaporation, is pumped to the boiling zone of each lower temperature effect in turn, and is discharged as the brine stream from the boiling zone of the last effect of said FME second train at the lowest temperature and the highest TDS; and thereafter: (a) said mixed brine flow sequence, which is flowing said mixed brine stream of said proceeding BME train as said input feed to said boiling zone of said first effect of said next succeeding FME train; and (b) said brine flow sequence, which is flowing said brine stream of said proceeding FME train as said input feed to said boiling zone of said last effect of said next succeeding BME train; are successively maintained through the remainder of the series to said FME last train, wherein the brine stream from said FME last train is discharged as said reject brine stream.

9. The method of claim 1, further comprising the steps of: (a) providing parallel heated feed through each of said BME trains and through each of said FME trains; and (b) applying a Mixed Brine Forward (MBF) desalination system to produce said cumulative distillate stream and said reject brine stream, which comprises: a plurality of said trains arranged in series and alternated in pairs of opposing feed evaporation modes, wherein each said pair comprises said leading BME train and said following FME train, wherein each of said trains comprises said heat rejection condenser and said number of effects, wherein said effects are serially connected and horizontally arranged, wherein each of said effects comprises said boiling zone and a heating zone, wherein said boiling zone comprises said spray nozzles and said boiling tubes, wherein said heating zone comprises heating tubes, wherein said first effect of each of said trains is the highest temperature and pressure effect, wherein said last effect of each of said trains is the lowest temperature and pressure effect, wherein each of said trains produces said distillate stream and said brine stream, wherein said water source is pre-heated in each said heat rejection condenser to produce said pre-heated water source, wherein at least a portion of said pre-heated water source is de-scaled to produce said feed stream, and said input feed arrangement, which comprises: (i) dividing said feed stream into a main portion and slip portions, wherein said main portion is only supplied to the boiling zone of the last effect of said BME first train, wherein each of said slip portions supplied to the heating zone of the last effect of each of said BME trains and each of said FME trains; and (ii) applying: (a) a mixed brine flow sequence, wherein a mixed brine stream of a proceeding BME train flows as an input feed to a boiling zone of a first effect of a next succeeding FME train; and (b) a brine flow sequence, wherein a brine stream of a proceeding FME train flows as said input feed to a boiling zone of a last effect of a next succeeding BME train; thereby said main portion of said feed stream supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS; wherein a slip portion of said feed stream supplied to the heating zone through the heating tubes of the last effect of said BME first train, and after partial heating by a flashing fraction of vapor in the last effect, is passed to the heating zone of each higher temperature effect in turn to gain heat proportional to the temperature rise between the effects, and is discharged as the parallel heated feed from heating zone of the first effect of said BME first train at the highest temperature; wherein another slip portion of said feed stream supplied to the heating zone through the heating tubes of the last effect of a FME second train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said FME second train at the highest temperature; wherein the brine stream and the parallel heated feed of said BME first train are mixed with the parallel healed feed of said FME second train to form a mixed brine stream, wherein the mixed brine stream is supplied as said input feed to the boiling zone through the spray nozzles and sprayed onto the boiling tubes of the first effect of said FME second train, which is the highest temperature effect, and after partial evaporation, is pumped to the boiling zone of each lower temperature effect in turn, and is discharged as the brine stream from the boiling zone of the last effect of said FME second train at the lowest temperature and the highest TDS; and thereafter: (a) said mixed brine flow sequence, which is flowing said mixed brine stream of said proceeding BME train as said input feed to said boiling zone of said first effect of said next succeeding FME train; and (b) said brine flow sequence, which is flowing said brine stream of said proceeding FME train as said input feed to said boiling zone of said last effect of said next succeeding BME train; are successively maintained through the remainder of the series to said FME last train, wherein the brine stream from said FME last train is discharged as said reject brine stream.

10. The method of claim 1, further comprising the steps of: (a) replacing each of said FME trains by a multi-stage flash (MSF) train; and (b) applying a Mixed Brine Forward (MBF) desalination system to produce said cumulative distillate stream and said reject brine stream, which comprises: a plurality of said trains arranged in series and alternated in pairs of opposing feed evaporation modes, wherein each pair comprises said leading BME train and a following MSF train, wherein each of said BME trains comprises said heat rejection condenser and said number of effects, wherein said effects are serially connected and horizontally arranged, wherein each of said effects comprises a boiling zone, wherein said boiling zone comprises spray nozzles and boiling tubes, wherein a first effect in each of said BME trains is the highest temperature and pressure effect, wherein a last effect in each of said BME trains is the lowest temperature and pressure effect, wherein each said MSF train comprises a brine heater and a heat gain section, wherein said heat gain section comprises a number of flash stages, wherein each of said flash stages comprises a flashing zone and a heating zone, wherein said heating zone comprises internal heating tubes, wherein each of said trains produces said distillate stream and said brine stream, wherein said water source is pre-heated in each said heat rejection condenser to produce a pre-heated water source, wherein at least a portion of said pre-heated water source is de-scaled to produce said feed stream, and said input feed arrangement, which comprises: (i) dividing said feed stream into a main portion and slip portions, wherein said main portion is only supplied to the boiling zone of the last effect of said BME first train, wherein each of said slip portions is supplied to the heating zone of the last flash stage of each of said MSF trains; and (ii) applying: (a) a mixed brine flow sequence, wherein a mixed brine stream of a proceeding BME train flows as an input feed to a flashing zone of a first flash stage of a next succeeding MSF train; and (b) a brine flow sequence, wherein a brine stream of a proceeding MSF train flows as said input feed to a boiling zone of a last effect of a next succeeding BME train; thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS; wherein a slip portion of said feed stream is supplied to the heating zone through the internal heating tubes of the last flash stage of a MSF second train, and after partial heating from condensation of vapor in the last flash stage, is passed to the heating zone of each higher temperature flash stage in turn to gain heat proportional to the temperature rise between the flash stages, and is discharged as the heated feed from the heating zone of the first flash stage of said MSF second train at the highest temperature; wherein the brine stream of said BME first train is mixed the heated feed of said MSF second train to form a mixed brine stream, wherein the mixed brine stream, after passing through the brine heater of said MSF second train to gain further heat, is supplied as said input feed to the flashing zone of the first flash stage of said MSF second train, and after partial flashing, is supplied to the flashing zone of each lower temperature flash stage in turn, and is discharged as the brine stream from the flashing zone of the last flash stage of said MSF second train at the lowest temperature and the highest TDS; and thereafter: (a) said mixed brine flow sequence, which is flowing said mixed brine stream of said proceeding BME train as said input feed to said flashing zone of said first flash stage of said next succeeding MSF train; and (b) said brine flow sequence, which is flowing said brine stream of said proceeding MSF train as said input feed to said boiling zone of said last effect of said next succeeding BME train; are successively maintained through the remainder of the series to a MSF last train, wherein the brine stream from said MSF last train is discharged as said reject brine stream.

11. The method of claim 1, further comprising the steps of: (a) replacing each of said FME trains by a multi-stage flash (MSF) train, wherein each said MSF train further comprises a degassing vessel; and (b) applying a Mixed Brine Forward (MBF) desalination system to produce said cumulative distillate stream and said reject brine stream, which comprises:

a plurality of said trains arranged in series and alternated in pairs of opposing feed evaporation modes, wherein each pair comprises said leading BME train and a following MSF train, wherein each of said BME trains comprises said heat rejection condenser and said number of effects, wherein said effects are serially connected and horizontally arranged, wherein each of said effects comprises a boiling zone, wherein said boiling zone comprises spray nozzles and boiling tubes, wherein a first effect in each of said BME trains is the highest temperature and pressure effect, wherein a last effect in each of said BME trains is the lowest temperature and pressure effect, wherein each said MSF train comprises a brine heater, said de-gassing vessel, and a heat gain section, wherein said heat gain section comprises a number of flash stages, wherein each of said flash stages comprises a flashing zone and a heating zone, wherein said heating zone comprises internal heating tubes, wherein each of said trains produces said distillate stream and said brine stream, wherein said water source is pre-heated in each heat rejection condenser to produce a pre-heated water source, wherein at least a portion of said pre-heated water source is de-scaled to produce said feed stream, and said input feed arrangement, which comprises: (i) dividing said feed stream into a main portion and slip portions, wherein said main portion is supplied to the boiling zone of the last effect of said BME first train, wherein each of said slip portions is supplied to the heating zone of the last flash stage of each of said MSF trains; and (ii) applying: (a) a mixed brine flow sequence, wherein a mixed brine stream of a proceeding BME train flows as an input feed to a flashing zone of a first flash stage of a next succeeding MSF train; and (b) a brine flow sequence, wherein a brine stream of a proceeding MSF train flows as said input feed to a boiling zone of a last effect of a next succeeding BME train;

thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS;

wherein a slip portion of said feed stream is supplied the heating zone through the internal heating tubes of the last flash stage of a MSF second train, and after partial heating from condensation of vapor in the last flash stage, is passed to the heating zone of each higher temperature flash stage in turn to gain heat proportional to the temperature rise between the flash stages, and is discharged as the heated feed from the heating zone of the first flash stage of said MSF second train at the highest temperature;

wherein the brine stream from said BME first train, after passing through the brine heater of said second MSF train to gain further heat, is mixed with the heated feed of said MSF second train in the degassing vessel of said MSF second train to form a mixed brine stream, wherein the mixed brine stream is supplied as said input feed to the flashing zone of the first flash stage of said MSF second train, and after partial flashing, is supplied to the flashing zone of each lower temperature flash stage in turn, and is discharged as the brine stream from the flashing zone of the last flash stage of said MSF second train at the lowest temperature and the highest TDS; and thereafter: (a) said mixed brine flow sequence, which is flowing said mixed brine stream of said proceeding BME train as said input feed to said flashing zone of said first flash stage of said next succeeding MSF train; and (b) said brine flow sequence, which is flowing said brine stream of said proceeding MSF train as said input feed to said boiling zone of said last effect of said next succeeding BME train; are successively maintained through the remainder of the series to a MSF last train, wherein the brine stream from said MSF last train is discharged as said reject brine stream.

12. The method of claim 1, further comprising the steps of: (a) providing parallel heated feed through each of said BME trains; (b) replacing each of said FME trains by a multi-stage flash (MSF) train; and (c) applying a Mixed Brine Forward (MBF) desalination system to produce said cumulative distillate stream and said reject brine stream, which comprises:

a plurality of said trains arranged in series and alternated in pairs of opposing feed evaporation modes, wherein each pair comprises said leading BME train and a following MSF train, wherein each of said BME trains comprises said heat rejection condenser and said number of effects, wherein said effects are serially connected and horizontally arranged, wherein each of said effects comprises a boiling zone, wherein said boiling zone comprises spray nozzles and boiling tubes, wherein each of said effects further comprises a heating zone, wherein said heating zone comprises heating tubes, wherein a first effect in each of said BME trains is the highest temperature and pressure effect, wherein a last effect in each of said BME trains is the lowest temperature and pressure effect, wherein each said MSF train comprises a brine heater and a heat gain section, wherein said heat gain section comprises a number of flash stages, wherein each of said flash stages comprises a flashing zone and a heating zone, wherein said heating zone comprises internal heating tubes, wherein each of said trains produces said distillate stream and said brine stream, wherein said water source is pre-heated in each heat rejection condenser to produce a pre-heated water source, wherein at least a portion of said pre-heated water source is de-scaled to produce said feed stream, and said input feed arrangement, which comprises: (i) dividing said feed stream into a main portion and slip portions, wherein said main portion is only supplied to the boiling zone of the last effect of said BME first train, wherein each of said slip portions is supplied to the heating zone of the last effect of each of said BME trains and to the heating zone of the last flash stage of each of said MSF trains; and (ii) applying: (a) a mixed brine flow sequence, wherein a mixed brine stream of a proceeding BME train flows as an input feed to a flashing zone of a first flash of a next succeeding MSF train; and (b) a brine flow sequence, wherein a brine stream of a proceeding MSF train flows as said input feed to a boiling zone of a last effect of a next succeeding BME train;

thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS;

wherein a slip portion of said feed stream is supplied to the heating zone through the heating tubes of the last effect of said BME first train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said BME first train at the highest temperature;

wherein another slip portion of said feed stream is supplied to the heating zone through the internal heating tubes of the last flash stage of a MSF second train, and after partial heating from condensation of vapor in the last flash stage, is passed to the heating zone of each higher temperature flash stage in turn to gain heat proportional to the temperature rise between the flash stages, and is discharged as the heated feed from the heating zone of the first flash stage of said MSF second train at the highest temperature;

wherein the brine stream and the parallel heated feed of said BME first train are mixed with the heated feed of said MSF second train to form a mixed brine stream, wherein the mixed brine stream, after passing through the brine heater of said MSF second train to gain further heat, is supplied said input feed to the flashing zone of the first flash stage of said MSF second train, and after partial flashing, is supplied to the flashing zone of each lower temperature flash stage in turn, and is discharged as the brine stream from the flashing zone of the last flash stage of said MSF second train at the lowest temperature and the highest TDS; and thereafter: (a) said mixed brine flow sequence, which is flowing said mixed brine stream of said proceeding BME train as said input feed to said flashing zone of said first flash stage of said next succeeding MSF train; and (b) said brine flow sequence, which is flowing said brine stream of said proceeding MSF train as said input feed to said boiling zone of said last effect of said next succeeding BME train; are successively maintained through the remainder of the series to a MSF last train, wherein the brine stream from said MSF last train is discharged as said reject brine stream.

13. The method of claim 1, further comprising the steps oft: (a) providing parallel heated feed through each of said BME trains; (b) replacing each of said FME trains by a multi-stage flash (MSF) train, wherein each said MSF train further comprises a degassing vessel; and (c) applying a Mixed Brine Forward (MBF) desalination system to produce said cumulative distillate stream and said reject brine stream, which comprises: a plurality of said trains arranged in series and alternated in pairs of opposing feed evaporation modes, wherein each pair comprises said leading BME train and a following MSF train, wherein each of said BME trains comprises said heat rejection condenser and said number of effects, wherein said effects are serially connected and horizontally arranged, wherein each of said effects comprises a boiling zone, wherein said boiling zone comprises spray nozzles and boiling tubes, wherein each of said effects further comprises a heating zone, wherein said heating zone comprises heating tubes, wherein a first effect in each of said BME trains is the highest temperature and pressure effect, wherein a last effect in each of said BME trains is the lowest temperature and pressure effect, wherein each said MSF train comprises a brine heater, said de-gassing vessel, and a heat gain section, wherein said heat gain section comprises a number of flash stages, wherein each of said flash stages comprises a flashing zone and a heating zone, wherein said heating zone comprises internal heating tubes, wherein each of said trains produces said distillate stream and said brine stream, wherein said water source is pre-heated in each heat rejection condenser to produce a pre-heated water source, wherein at least a portion of said pre-heated water source is de-scaled to produce said feed stream, and said input feed arrangement, which comprises: (i) dividing said feed stream into a main portion and slip portions, wherein said main portion is only supplied to the boiling zone of the last effect of said BME first train, wherein each of said slip portions is supplied to the heating zone of the last effect of each of said BME trains and to the heating zone of the last flash stage of each of said MSF trains; and (ii) applying: (a) a mixed brine flow sequence, wherein a mixed brine stream of a proceeding BME train flows as an input feed to a flashing zone of a first flash stage of a next succeeding MSF train; and (b) a brine flow sequence, wherein a brine stream of a proceeding MSF train flows as said input feed to a boiling zone of a last effect of a next succeeding BME train; thereby said main portion of said feed stream is supplied to the boiling zone through the spray nozzles and sprayed onto the boiling tubes of the last effect of said BME first train, which is the lowest temperature effect, and after partial evaporation, is pumped to the boiling zone of each higher temperature effect in turn, and is discharged as the brine stream from the boiling zone of the first effect of said BME first train at the highest temperature and TDS; wherein a slip portion of said feed stream is supplied to the heating zone through the heating tubes of the last effect of said BME first train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said BME first train at the highest temperature; wherein another slip portion of said feed stream is supplied to the heating zone through the internal heating tubes of the last flash stage of a MSF second train, and after partial heating from condensation of vapor in the last flash stage, is passed to the heating zone of each higher temperature flash stage in turn to gain heat proportional to the temperature rise between the flash stages, and is discharged as the heated feed from the heating zone of the first flash stage of the heat gain section of said MSF second train at the highest temperature; wherein the brine stream from said BME first train, after passing through the brine heater of said second MSF train to gain further heat, is mixed with the parallel heated feed from said BME first train and the heated feed of said MSF second train in the degassing vessel of said MSF second train to form a mixed brine stream, wherein the mixed brine stream is supplied as said input feed to the flashing zone of the first flash stage of said MSF second train, and after partial flashing, is supplied to the flashing zone of each lower temperature flash stage in turn, and is discharged as the brine stream from the flashing zone of the last flash stage of said MSF second train at the lowest temperature and the highest TDS; and thereafter: (a) said mixed brine flow sequence, which is flowing said mixed brine stream of said proceeding BME train as said input feed to said flashing zone of said first flash stage of said next succeeding MSF train; and (b) said brine flow sequence, which is flowing said brine stream of said proceeding MSF train as said input feed to said boiling zone of said last effect of said next succeeding BME train; are successively maintained through the remainder of the series to a MSF last train, wherein the brine stream from said MSF last train is discharged as said reject brine stream.

14. The method of claim 1, further comprising the step of vertically arranging said effects.

15. A method for desalinating or concentrating a feed stream, said method comprising a vertical backward fed multi-effect (VBME) train, which comprises:

a heat rejection condenser and a number of effects serially connected and vertically arranged, wherein each of said effects comprises a boiling zone and a heating zone, wherein said boiling zone comprises spray nozzles and boiling tubes, wherein said heating zone comprises heating tubes, wherein a first effect, which is the highest temperature and pressure effect, is positioned at the bottom of said VBME train, wherein a last effect, which is the lowest temperature and pressure effect, is positioned at the top of said VBME train;

wherein said feed stream is supplied to the boiling zone through the spray nozzles and sprayed onto B the boiling tubes of said last effect, and after partial evaporation in said last effect, is supplied downward by gravity as an input feed to the boiling zone of each higher temperature effect in turn, and is discharged as a brine stream from the boiling zone of said first effect at the bottom of said VBME at the highest temperature and total dissolved solids (TDS);

wherein a slip portion of said feed stream is supplied to the heating zone through the heating tubes of said last effect, and after partial heating by a flashing fraction of vapor in said last effect, is supplied downward to the heating zone of each higher temperature effect in turn to gain heat proportional to the temperature rise between the effects, and is discharged as a parallel heated feed from the heating zone of said first effect at the bottom of said VBME at the highest temperature;

wherein steam from an external source is fed into the boiling tubes of said first effect, wherein is condensed inside the boiling tubes of said first effect by being used to evaporate vapor from an input feed outside the boiling tubes of said first effect, and is returned after condensation to said external source;

wherein the vapor produced in said first effect is supplied upward via an orifice into the boiling tubes of a second effect, wherein is condensed inside the boiling tubes of said second effect by being used to evaporate vapor from an input feed outside the boiling tubes of said second effect, and thereafter the vapor flow sequence, which is flowing vapor from a proceeding higher temperature and pressure effect as an input heat to a next succeeding lower temperature and pressure effect, is continued in series up the chain of said effects to said last effect, wherein the vapor produced from said last effect is condensed in said heat rejection condenser.

16. The method of claim 15, further comprising the step of eliminating said parallel heated feed, thereby eliminating said heating tubes of said heating zone in each of said effects.

17. The method of claim 15, further comprising the steps of: (a) replacing said heat rejection condenser with an enhanced-type air cooled condenser; and/or (b) integrating a compression device for the purpose of getting more heat to cause evaporation, getting enough heat to cause evaporation, getting heat at a temperature suitable to heat exchange on said evaporating tubes, and combinations thereof.

18. A method for de-scaling a water source to produce a feed stream depleted of scale prone species, said method comprising: (a) mixing said water source with an aluminum source or an iron source to convert at least a portion of carbonates to carbon dioxide, wherein said carbonates comprise carbon dioxide, carbonic acid, bicarbonate, carbonate, and combinations thereof; (b) removing at least said carbon dioxide by a de-aerator to produce at least a de-carbonated water source; (c) feeding said de-carbonated water source to a nanofiltration (NF) unit to produce a NF product stream and a NF reject stream; (d) mixing said NF reject stream with dolime to form a precipitate comprising magnesium sulfoaluminate or magnesium sulfoferrate in a precipitator unit, and filtering said precipitate by a filter to produce a NF de-scaled reject stream; and (e) combining said NF product stream with said NF de-scaled reject stream to produce said feed stream.

19. The method of claim 18, further comprising the step of pre-heating said water source prior to conducting step (a).

20. The method of claim 18, wherein said aluminum source is selected from the group consisting of aluminum chloride, aluminum chlorohydrate, aluminum nitrate, aluminum sulfate, aluminum acetate, aluminum formate, and combinations thereof; and wherein said iron source is selected from the group consisting of iron chloride, iron chlorohydrate, iron nitrate, iron sulfate, iron acetate, iron formate, and combinations thereof.

* * * * *